US012115921B1

(12) United States Patent
Saweris et al.

(10) Patent No.: US 12,115,921 B1
(45) Date of Patent: Oct. 15, 2024

(54) T-HARNESS FOR A TELEMATICS DEVICE

(71) Applicant: Geotab Inc., Oakville (CA)

(72) Inventors: David Bassem G E Saweris, Milton (CA); Sajjad Karimi, Mississauga (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/588,145

(22) Filed: Feb. 27, 2024

Related U.S. Application Data

(60) Provisional application No. 63/552,342, filed on Feb. 12, 2024.

(51) Int. Cl.
| | |
|---|---|
| *B60R 16/02* | (2006.01) |
| *B60R 16/023* | (2006.01) |
| *H01R 13/642* | (2006.01) |
| *H01R 13/73* | (2006.01) |
| *H01R 27/02* | (2006.01) |
| *H01R 31/06* | (2006.01) |

(52) U.S. Cl.
CPC ...... *B60R 16/0207* (2013.01); *B60R 16/0234* (2013.01); *H01R 13/642* (2013.01); *H01R 13/73* (2013.01); *H01R 27/02* (2013.01); *H01R 31/06* (2013.01); *H01R 2201/26* (2013.01)

(58) Field of Classification Search
CPC ............ B60R 16/0207; B60R 16/0234; H01R 13/642; H01R 13/73; H01R 27/02; H01R 31/06; H01R 2201/26
See application file for complete search history.

(56) References Cited

U.S. PATENT DOCUMENTS

| | | | | | |
|---|---|---|---|---|---|
| 4,822,956 | A | * | 4/1989 | Sepe ................... | H01B 11/125 174/74 A |
| 5,184,960 | A | * | 2/1993 | Hopkins ............... | H01R 29/00 439/639 |
| 5,954,538 | A | * | 9/1999 | Huang .................. | H01R 31/02 439/502 |
| 5,971,799 | A | * | 10/1999 | Swade .................. | H01R 27/02 439/502 |
| 6,621,688 | B1 | * | 9/2003 | Burdick ............. | B60R 16/0238 361/627 |
| 6,702,607 | B2 | * | 3/2004 | Kondo .................. | H05K 1/118 174/72 A |
| 8,249,759 | B2 | * | 8/2012 | Lazzara ............... | B60R 25/045 307/10.6 |
| 8,298,003 | B2 | * | 10/2012 | Wu ....................... | H01R 27/02 439/501 |

(Continued)

*Primary Examiner* — Thanh Tam T Le
(74) *Attorney, Agent, or Firm* — Sherif A. Abdel-Kader

(57) ABSTRACT

A T-harness for use in vehicles is provided. The T-harness has a main harness portion and a removable harness portion. The main harness portion has a vehicle OBD harness connector including a splitter, a telematics device harness connector, a telematics device harness segment connecting the vehicle OBD connector to the telematics device harness connector, a receptacle connector, and an auxiliary harness segment connecting the vehicle OBD connector to the receptacle connector. The removable harness portion has an auxiliary OBD harness connector, a plug connector configured for mating with the receptacle connector, and a multi-wire cable connecting the plug connector to the auxiliary OBD harness connector. A method of installing the T-harness in the vehicle is also provided.

19 Claims, 60 Drawing Sheets

(56) References Cited

U.S. PATENT DOCUMENTS

| | | | | |
|---|---|---|---|---|
| 8,308,507 B2* | 11/2012 | Lin | ........................ | H01R 27/02 |
| | | | | 439/502 |
| 8,517,772 B2* | 8/2013 | Wu | ........................ | H01R 24/62 |
| | | | | 439/501 |
| 8,608,505 B2* | 12/2013 | Mantay | ................... | H01R 31/02 |
| | | | | 439/505 |
| 9,581,270 B2* | 2/2017 | Peterson | .............. | B60R 16/0207 |
| 10,974,668 B2* | 4/2021 | Murata | ............... | B60R 16/0215 |

\* cited by examiner

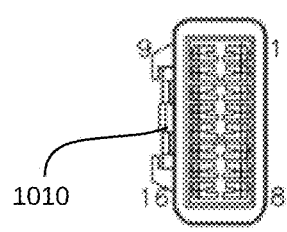
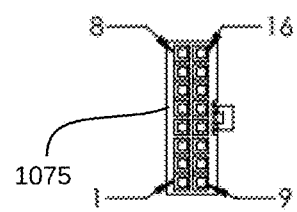
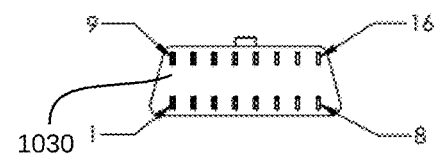
FIG. 11A     FIG. 11B     FIG. 11C
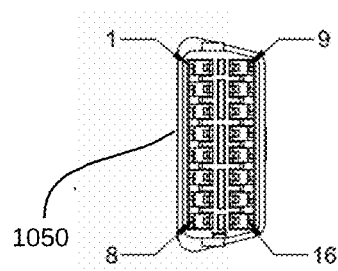
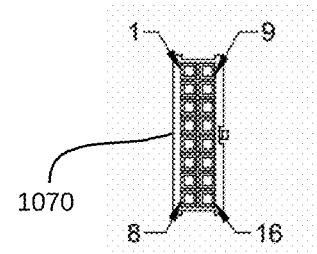
FIG. 11D     FIG. 11E

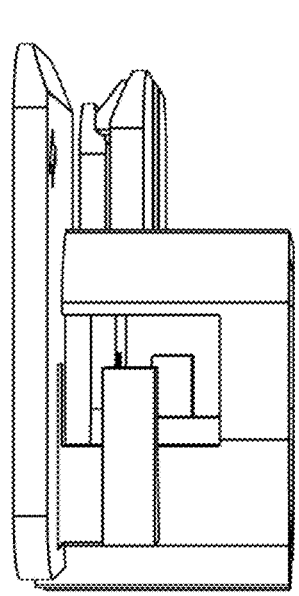
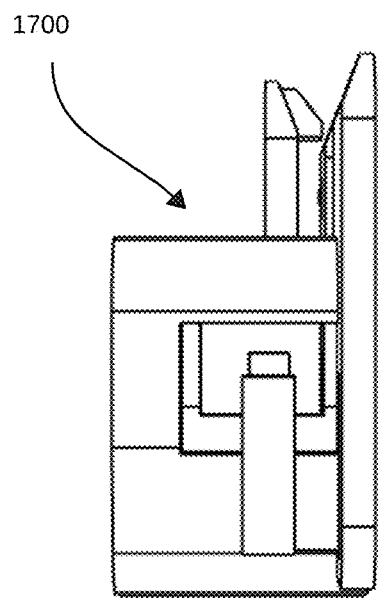
FIG. 17D    FIG. 17C
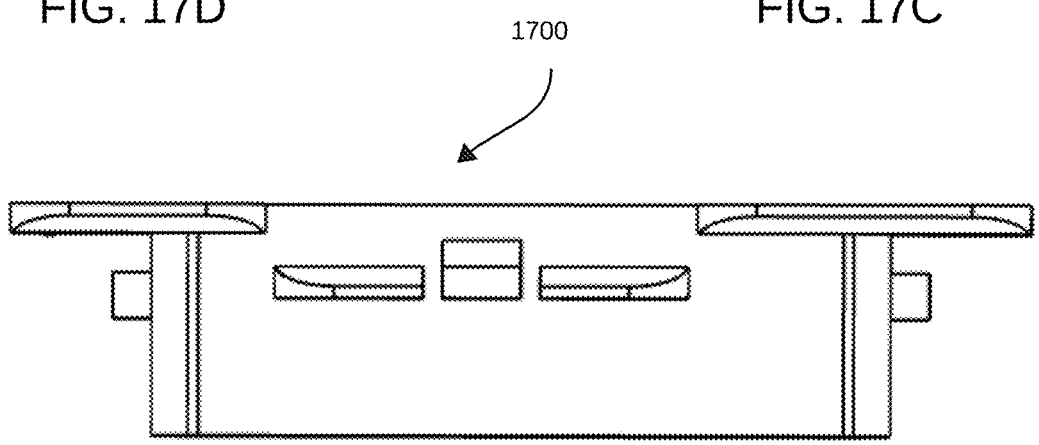
FIG. 17E
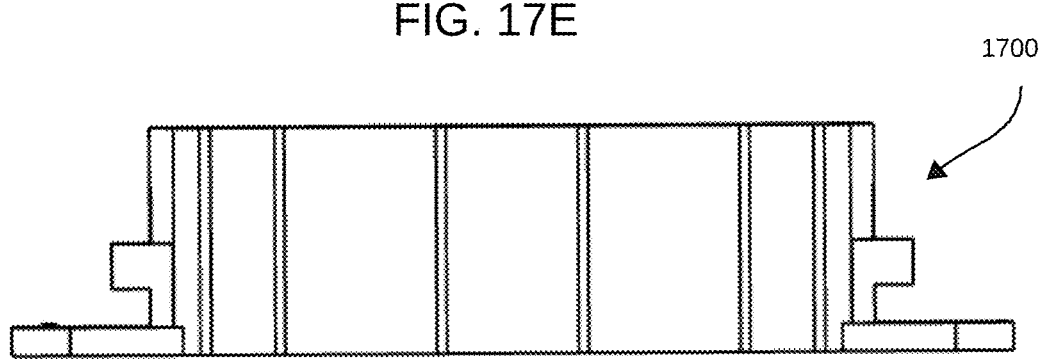
FIG. 17F

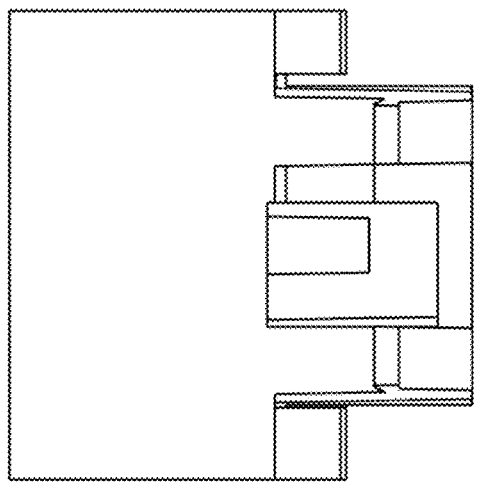
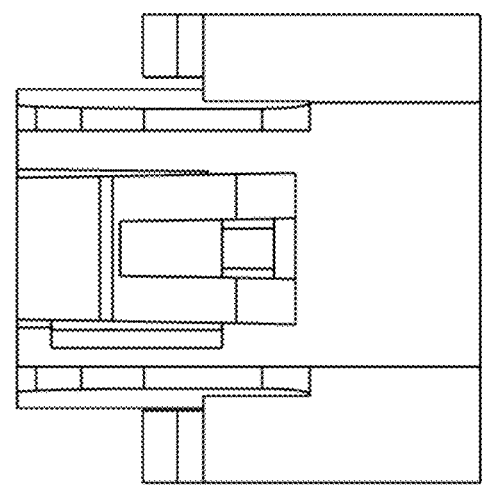
FIG. 20D        FIG. 20C
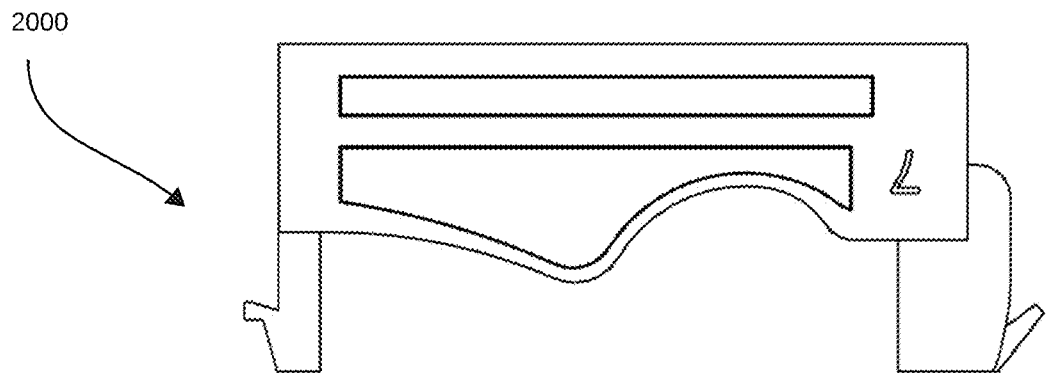
FIG. 20E
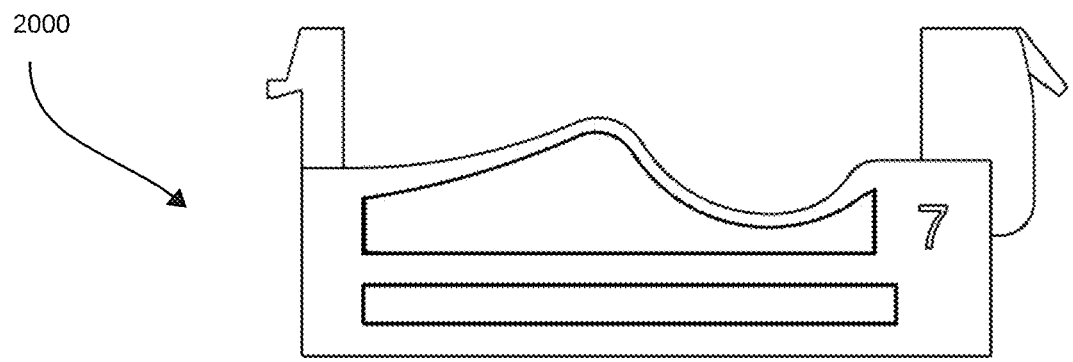
FIG. 20F

2500

2500

2500

T-HARNESS FOR A TELEMATICS DEVICE

FIELD

The present disclosure generally relates to vehicle telematics, and more specifically to a T-Harness for a telematics device.

BACKGROUND

A telematics system may gather asset data using a telematics device. The telematics device may be integrated into or located onboard the asset. The asset may be a vehicle ("vehicular asset") or some other stationary equipment. The telematics device may collect the asset data from the asset through a data connection with the asset. In the case of a vehicular asset, the telematics device gathers the asset data via an interface port, such as an onboard diagnostic port (OBD). Additionally, the telematics device may gather sensor data pertaining to the asset via sensors on the telematics device. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a T-harness for use in vehicles having an On-Board Diagnostic (OBD) port. The T-harness comprises a main harness portion and a removable harness portion. The main harness portion includes a vehicle OBD harness connector including a splitter, a telematics device harness connector, a telematics device harness segment connecting the vehicle OBD connector to the telematics device harness connector, a first multi-signal connector, and an auxiliary harness segment connecting the vehicle OBD connector to the first multi-signal connector. The removable harness portion includes an auxiliary OBD harness connector, a second multi-signal connector configured for mating with the first multi-signal connector, and a multi-wire cable connecting the second multi-signal connector to the auxiliary OBD harness connector.

The first multi-signal connector may comprise a multi-signal receptacle connector and the second multi-signal connector may comprise a multi-signal plug connector.

The first multi-signal connector may comprise a multi-signal plug connector and the second multi-signal connector may comprise a multi-signal receptacle connector.

The auxiliary OBD harness connector may comprise an auxiliary OBD harness connector front portion and an auxiliary OBD harness connector rear portion.

The auxiliary OBD harness connector front portion may be trapezoidal in shape thus preventing connecting a device connector to the auxiliary OBD harness connector except in one correct orientation.

The auxiliary OBD harness connector rear portion may have a smaller width than a width of the auxiliary OBD harness connector front portion thus permitting insertion of the auxiliary OBD harness connector rear portion in a vehicle mount aperture.

The splitter may split signals of the vehicle OBD harness connector into a first plurality of signal lines routed to the telematics device harness connector via the telematics device harness segment and a second plurality of signal lines routed to the first multi-signal connector via the auxiliary harness segment.

The T-harness may further comprise a third multi-signal connector connected to a first plurality of signal lines in the vehicle OBD harness connector and a fourth multi-signal connector suitable for mating with the third multi-signal connector the second multi-signal connector connected to a second plurality of signal lines in the telematics device harness segment.

The first plurality of signal lines in the vehicle OBD harness connector may correspond to networking signal lines.

The third multi-signal connector may comprise a multi-signal plug connector and the fourth multi-signal connector may comprise a multi-signal receptacle connector.

The third multi-signal connector comprises a multi-signal receptacle connector and the fourth multi-signal connector comprises a multi-signal plug connector.

In another aspect of the present disclosure, there is provided a method of installing a T-harness in a vehicle having an OBD port including a vehicle OBD connector connected to a vehicle mount. The method comprises disconnecting the vehicle OBD connector from the vehicle mount, connecting a mounting adapter to an auxiliary OBD harness connector of the T-harness at an auxiliary OBD harness connector rear portion, connecting the auxiliary OBD harness connector to the vehicle mount at the auxiliary OBD harness connector rear portion, connecting a removable harness portion of the T-harness to a main harness portion of the T-harness, and connecting the vehicle OBD connector to a vehicle OBD harness connector of the T-harness.

Connecting the mounting adapter to the auxiliary OBD harness connector at the auxiliary OBD harness connector rear portion may comprise sliding the mounting adapter over the auxiliary OBD harness connector until at least one locking member of the auxiliary OBD harness connector mates with at least one locking structure of the mounting adapter.

The at least one locking member may comprise at least one snap formed on at least one sidewall of the auxiliary OBD harness connector and the at least one locking structure of the mounting adapter may comprise at least one cutout on at least one sidewall of the mounting adapter, the at least one cutout sized and shaped for receiving the at least one snap in a locking arrangement.

Connecting the removable harness portion to the main harness portion may comprise connecting a first multi-signal connector of the main harness portion to a second multi-signal connector of the removable harness portion.

The first multi-signal connector may comprise a multi-signal plug connector and the second multi-signal connector may comprise a multi-signal receptacle connector.

The second multi-signal connector may comprise a multi-signal plug connector and the first multi-signal connector may comprise a multi-signal receptacle connector.

The method may further comprise disconnecting a third multi-signal connector connected to a telematics device harness segment of the T-harness from a fourth multi-signal connector connected to the vehicle OBD connector of the T-harness.

The method may further comprise connecting a telematics device to a telematics device harness connector of the T-harness.

BRIEF DESCRIPTION OF THE DRAWINGS

Exemplary non-limiting embodiments of the present invention are described with reference to the accompanying drawings in which:

FIG. 11A is a front elevation view of the vehicle OBD connector of the T-Harness of FIG. 10;

FIG. 11B is a front elevation view of a ribbon connector of the T-Harness for mating with the removable harness portion's ribbon connector;

FIG. 11C is a front elevation of the telematics device connector of the T-Harness for receiving a telematics device;

FIG. 11D is a front elevation view of the auxiliary OBD connector of the T-Harness of FIG. 10;

FIG. 11E is a front elevation view of the removable harness portion's ribbon connector;

FIG. 17C is a right side elevation view of the adapter of FIG. 17A;

FIG. 17D is a left side elevation view of the adapter of FIG. 17A;

FIG. 17E is a top plan view of the adapter of FIG. 17A;

FIG. 17F is a bottom plan view of the adapter of FIG. 17A;

FIG. 20C is a right side elevation view of the first adapter portion of FIG. 20A;

FIG. 20D is a left side elevation view of the first adapter portion of FIG. 20A;

FIG. 20E is a top plan view of the first adapter portion of FIG. 20A;

FIG. 20F is a bottom plan view of the first adapter portion of FIG. 20A;

FIG. 25C is a right side elevation view of the adapter of FIG. 25A;

FIG. 25D is a left side elevation view of the adapter of FIG. 25A;

FIG. 25E is a top plan view of the adapter of FIG. 25A;

FIG. 25F is a bottom plan view of the adapter of FIG. 25A;

FIG. 25G is a front elevation view of the adapter of FIG. 25A;

FIG. 25H is a rear elevation view of the adapter of FIG. 25A;

FIG. 25I is a top front left perspective view of the adapter of FIGS. 25A-25H coupled to the auxiliary OBD connector of FIGS. 12A-12H;

FIG. 26A is a top, front, right side perspective view of a Volvo™ slide mount adapter, typically used by Volvo™ vehicles for coupling to the auxiliary OBD connector of FIGS. 12A-12H;

FIG. 26B is a bottom, rear, left perspective view of the adapter of FIG. 26A;

FIG. 26C is a right side elevation view of the adapter of FIG. 26A;

FIG. 26D is a left side elevation view of the adapter of FIG. 26A;

FIG. 26E is a top plan view of the adapter of FIG. 26A;

Figure 26A:
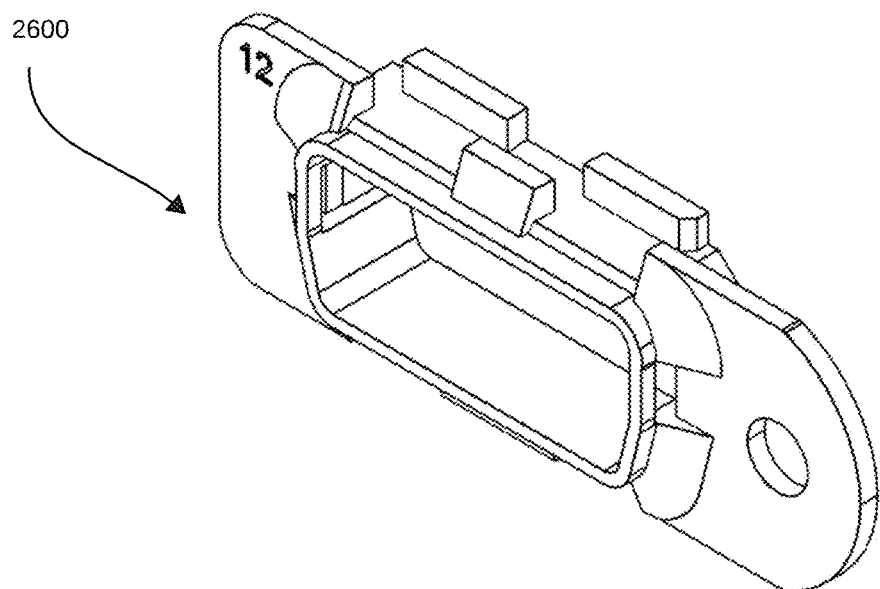
Figure 26B:
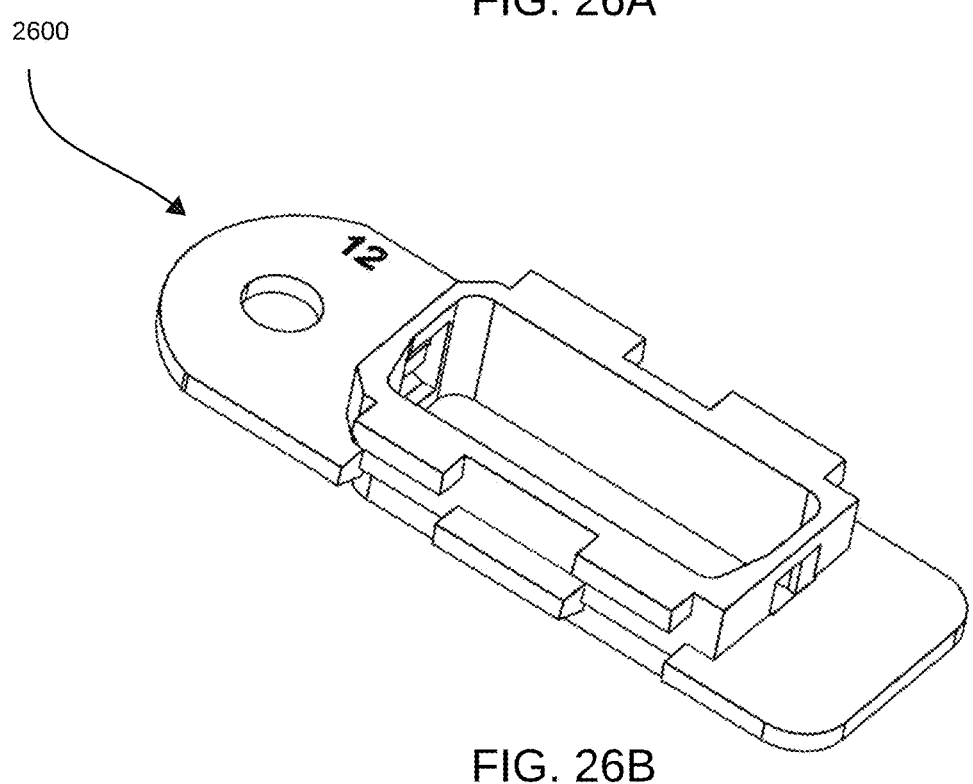
Figure 26D:
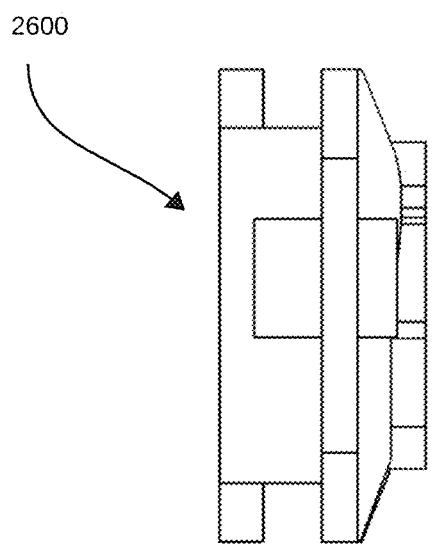
Figure 26C:
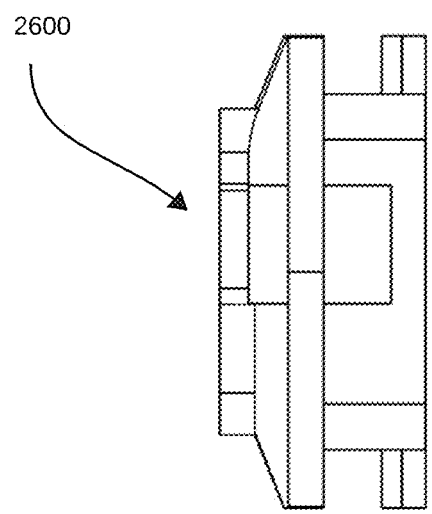
Figure 26E:
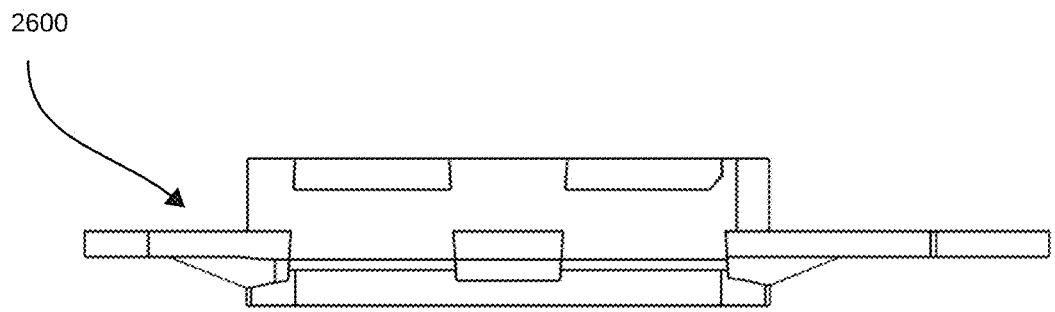
Figure 26F:
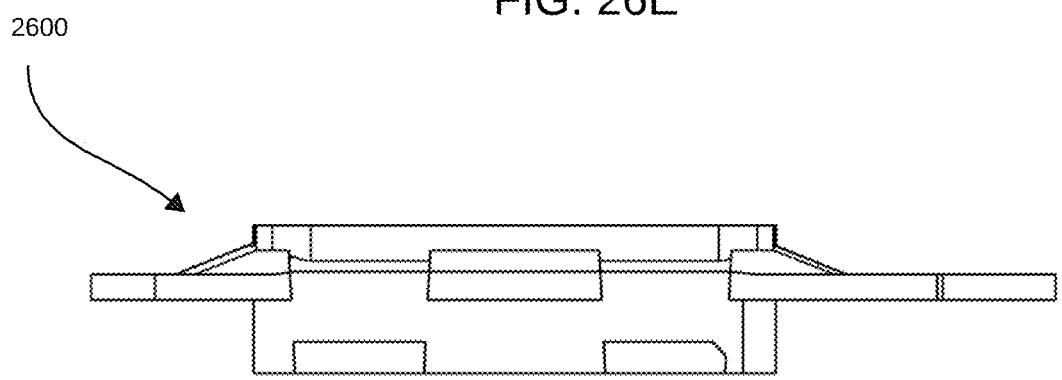
Figure 26G:
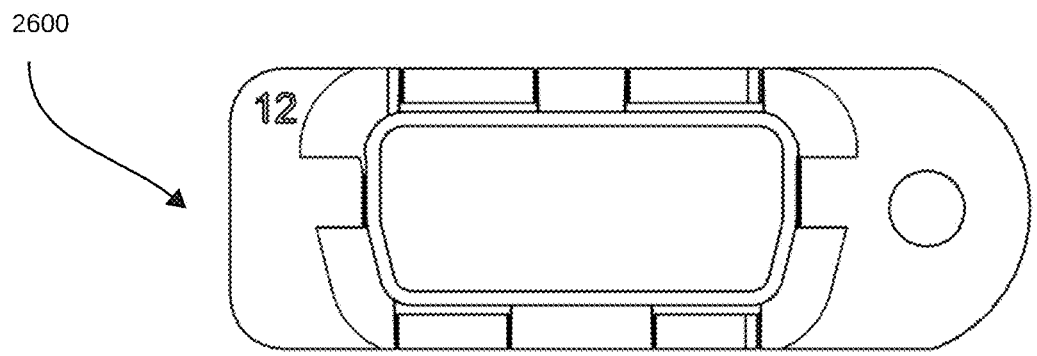
Figure 26H:
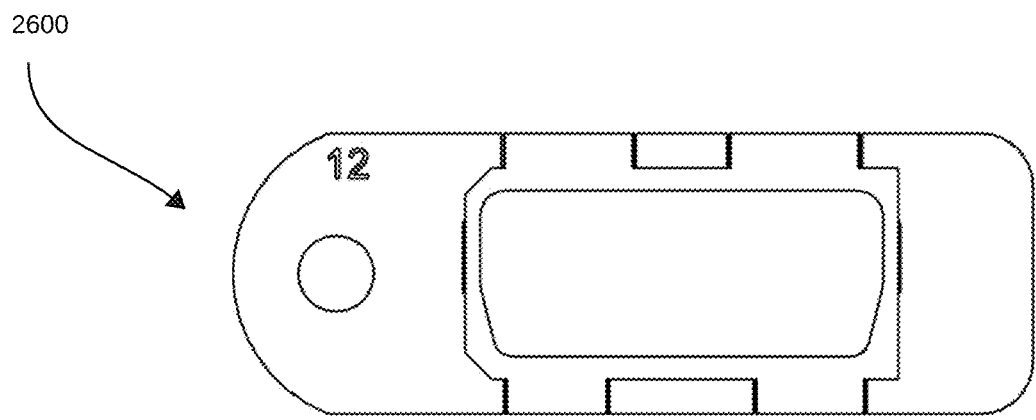
Figure 26I:
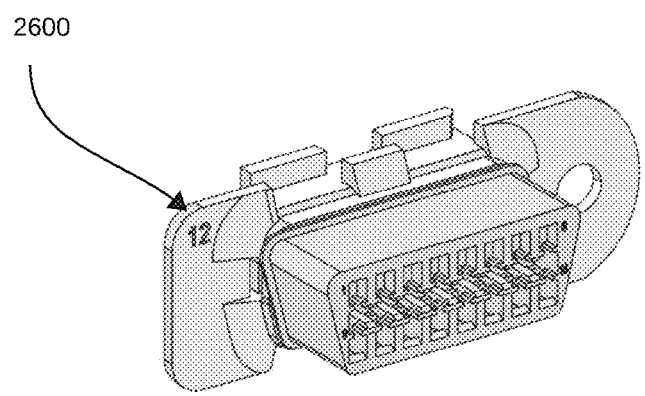
Figure 27A:
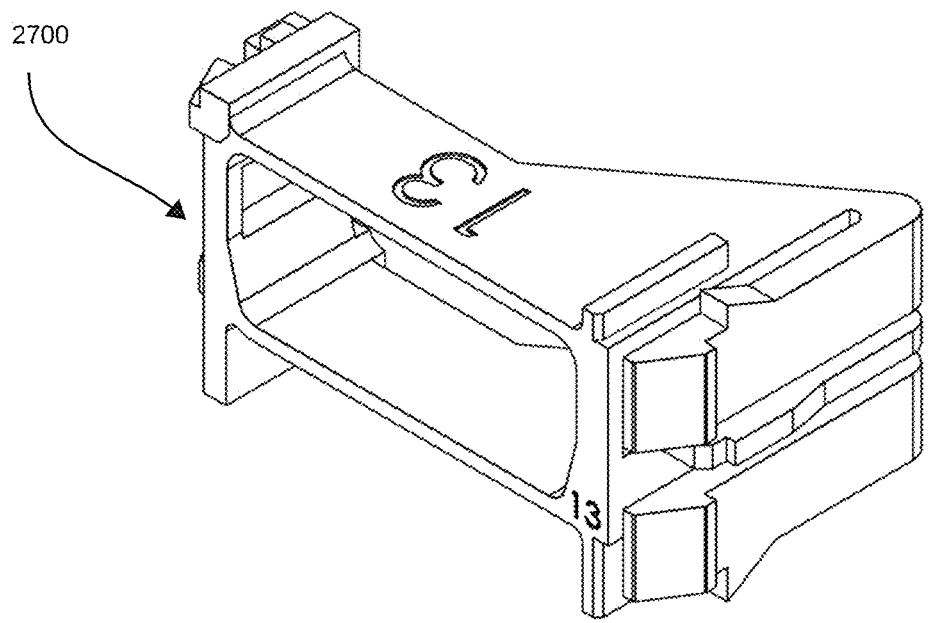
Figure 27B:
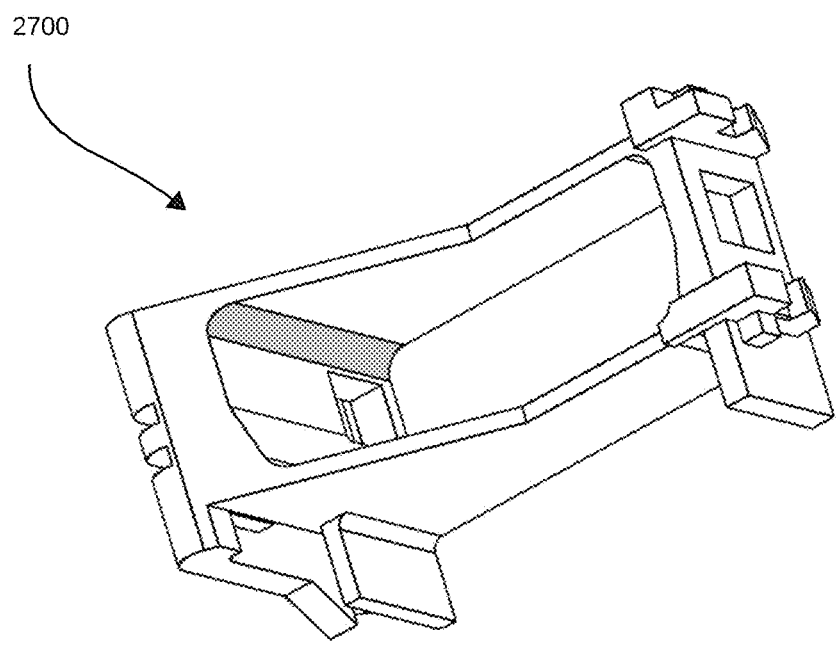
Figure 27D:
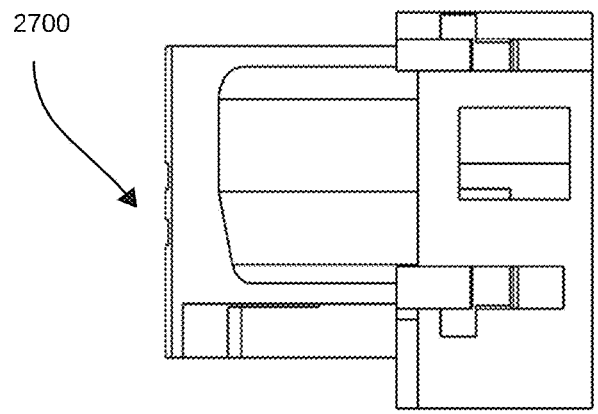
Figure 27C:
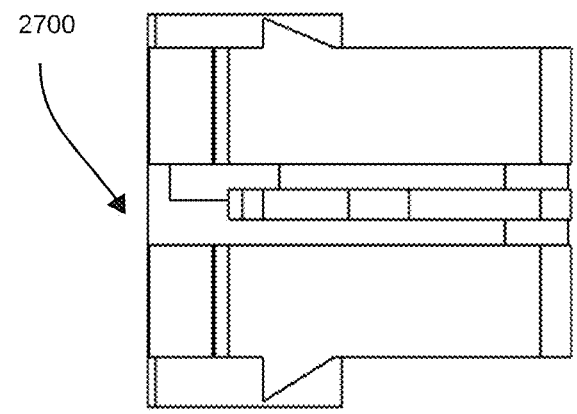
Figure 27E:
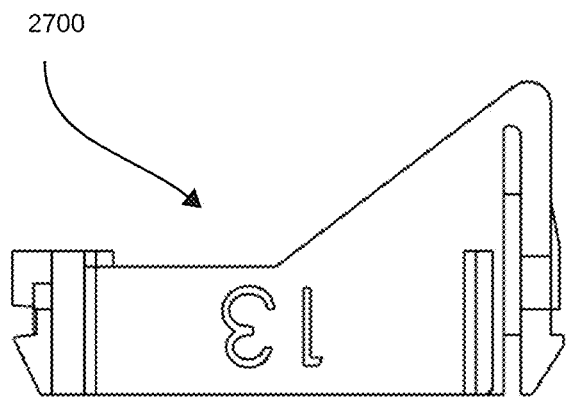
Figure 27F:
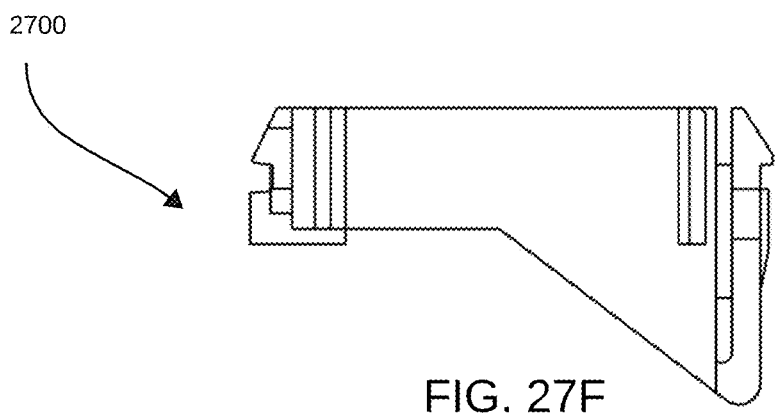
Figure 27G:
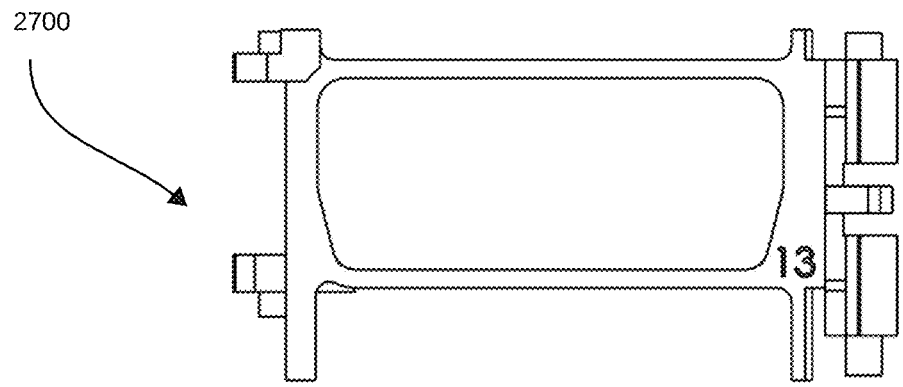
Figure 27H:
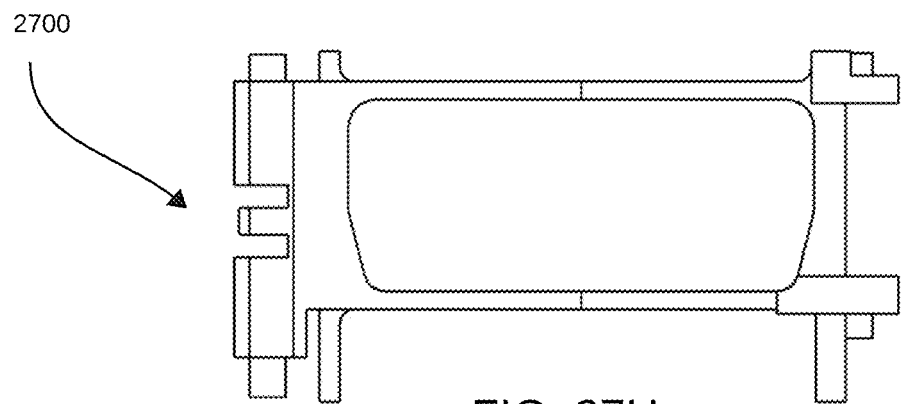

FIG. 26F is a bottom plan view of the adapter of FIG. 26A;

FIG. 26G is a front elevation view of the adapter of FIG. 26A;

FIG. 26H is a rear elevation view of the adapter of FIG. 26A;

FIG. 26I is a top front left perspective view of the adapter of FIGS. 26A-26H coupled to the auxiliary OBD connector of FIGS. 12A-12H;

FIG. 27A is a top, front, right side perspective view of a heavy-duty Volvo™ slide mount adapter, typically used by Volvo™ heavy duty vehicles for coupling to the auxiliary OBD connector of FIGS. 12A-12H;

FIG. 27B is a bottom, rear, left perspective view of the adapter of FIG. 26A;

FIG. 27C is a right side elevation view of the adapter of FIG. 27A;

FIG. 27D is a left side elevation view of the adapter of FIG. 27A;

FIG. 27E is a top plan view of the adapter of FIG. 27A;

FIG. 27F is a bottom plan view of the adapter of FIG. 27A;

FIG. 27G is a front elevation view of the adapter of FIG. 27A;

FIG. 27H is a rear elevation view of the adapter of FIG. 27A; and

Figure 27I:
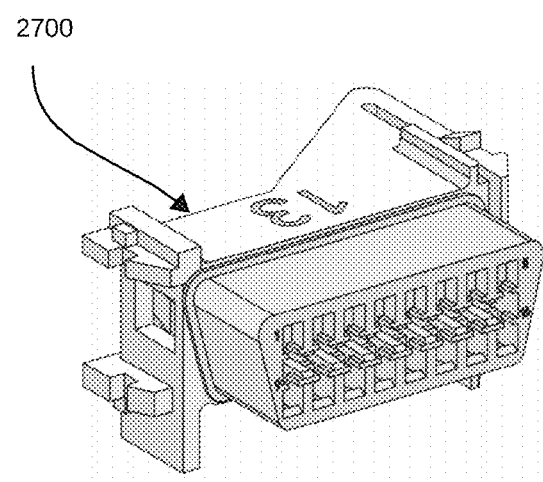

FIG. 27I is a top front left perspective view of the adapter of FIGS. 27A-27H coupled to the auxiliary OBD connector of FIGS. 12A-12H.

DETAILED DESCRIPTION

Telematics System

Figure 1:
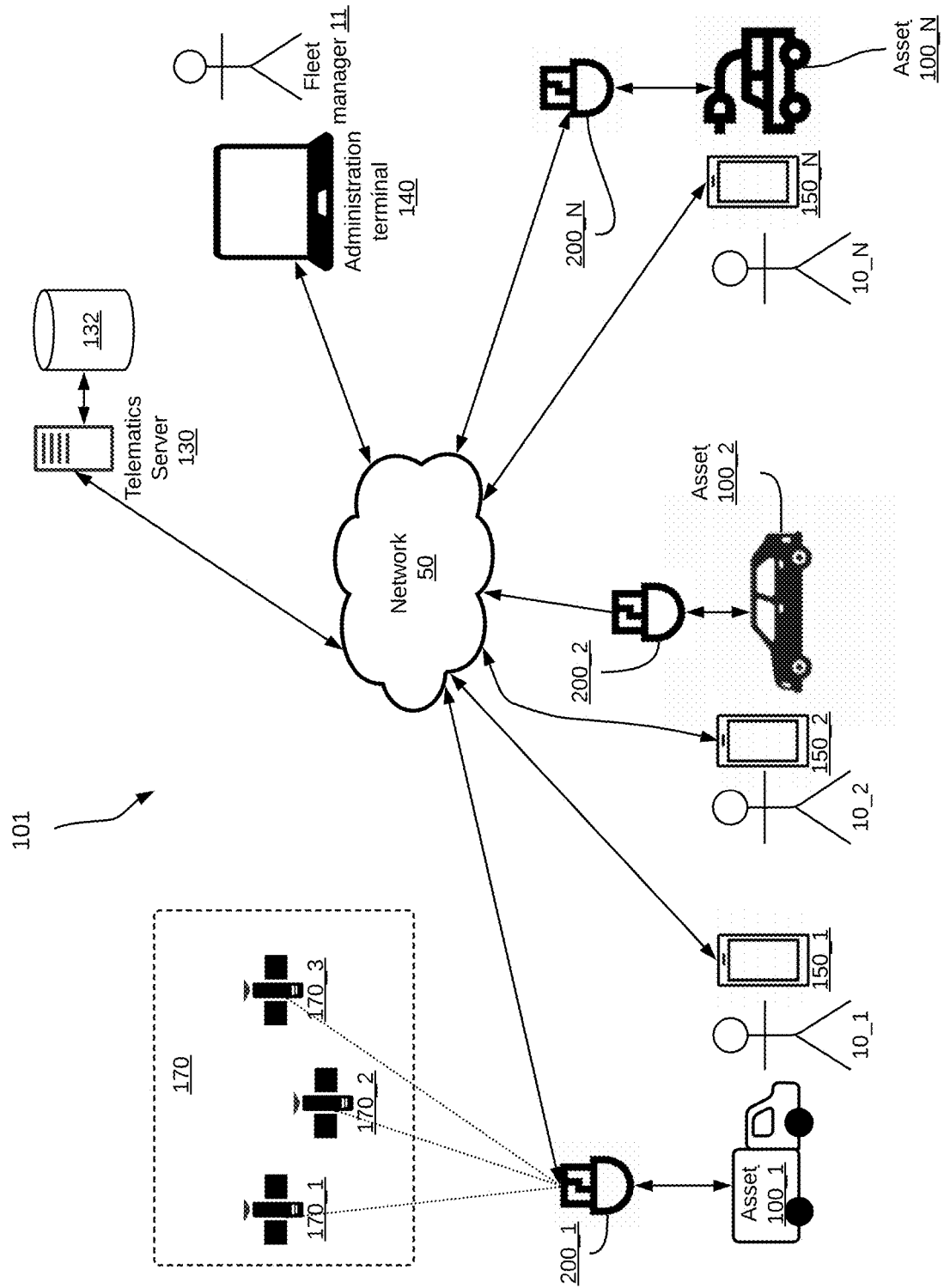
FIG. 1 is a schematic diagram of an exemplary telematics system including a plurality of telematics devices coupled to a plurality of vehicular assets.

FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car. The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

While the assets shown in FIG. 1 are all land vehicles, this is not always the case. In some implementations, the asset is a marine vehicle or an airborne vehicle employing an ICE, an electric motor, or any other engine such as a jet engine, a rocket propulsion engine, and so on. In some cases, the asset is a piece of equipment such as a generator, a concrete mixer, a compressor, and the like.

The telematics devices 200 are coupled to assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3.

The network 50 may be a single network or a combination of networks such as a data cellular network, the Internet, and other network technologies. The network 50 provides connectivity between the different components of the system, such as between the telematics devices 200 and the telematics server 130, between the administration terminal 140 and the telematics server 130, and between the operator terminals 150 and the telematics server 130.

In some implementations of the telematics system 101, the network 50 is a cellular network utilizing cellular technology. In some implementations of the telematics system 101, the network 50 comprises a Wide Area Network (WAN) using non-cellular WAN technologies. In some implementations, the network 50 is a combination of cellular and non-cellular technologies.

The telematics server 130 is an electronic device executing machine-executable programming instructions which enable the telematics server 130 to store and analyze telematics data 212. The telematics server 130 may be a single computer system or a cluster of computers.

The satellites 170 are part of a global navigation satellite system (GNSS) which is a satellite-based navigation system that provides positioning, navigation, and timing services worldwide. The location information may be processed by a location module on the telematics device 200 to provide location data indicating the location of the telematics device 200 (and hence the location of the asset 100 coupled thereto).

The administration terminal 140 is an electronic device capable of connecting to the telematics server 130, over the network 50. The administration terminal 140 can be configured to retrieve data and analytics related to one or more assets 100; to receive alerts from the telematics server 130 in respect of one or more conditions on the telematics device 200; and/or to issue commands to one or more telematics device 200 via the telematics server 130. In some implementations, an administrator 11 communicates with the telematics server 130 using the administration terminal 140. In addition to retrieving data and analytics, the administration terminal 140 allows the administrator 11 to set alerts and geofences for keeping track of the assets 100, receiving notifications of deliveries, receiving notifications of vehicle conditions, and receiving alerts pertaining to driver behavior.

The operator terminals 150 are electronic devices, similar to the administration terminals 140. The operator terminals 150 are shown as smartphones, however, this is not necessarily the case. An administration terminal is any one of: a desktop computer, an industrial human-machine interface (HMI), a touch screen panel, a table, a smartphone, an Augmented Reality (AR) headset, and a Network Operations Center (NOC). The operator terminals 150 are used by operators 10 (for example, vehicle drivers) of the assets 100 to both track and configure the usage of the assets 100. For example, as shown in FIG. 1, the operator 10_1 has the operator terminal 150_1, the operator 10_2 has the operator terminal 150_2, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 150 are in communication with the telematics server 130 over the network 50.

In operation, a telematics device 200 is coupled to an asset 100 to capture asset data. In some implementations, the asset data is combined with location data obtained by the telematics device 200 from a location module in communication with the satellites 170 and/or sensor data gathered from sensors in the telematics device 200 or another device coupled to the telematics device 200. The combined asset data, location data, and sensor data are termed "telematics data." The telematics device 200 sends the telematics data to the telematics server 130 over the network 50. The telematics server 130 processes, aggregates, and/or analyzes the telematics data 212 to generate asset information pertaining to the assets 100 or to a fleet of assets. In some implementations, the telematics server 130 stores the telematics data and/or the generated asset information in the telematics database 132. In some implementations, the administration terminal 140 connects to the telematics server 130, over the network 50, to access the generated asset information. In other implementations, the telematics server 130 pushes the generated asset information to the administration terminal 140. In some implementations, the operators 10 use the operator terminals 150 to indicate to the telematics server 130 which assets 100 they are associated with. In response, the telematics server 130 updates the telematics database 132 to associate an operator 10 with an asset 100. In some implementations, the telematics server 130 provides additional analytics related to the operators 10 including work time, location, and operating parameters. For example, for vehicle assets, the telematics data may include turning, speeding, and braking information. The telematics server 130 can correlate the telematics data 212 to the vehicle's driver by querying the telematics database 132 for a particular vehicle and retrieving the associated driver information. In some implementations, an administrator 11 uses the administration terminal 140 to set alerts for certain activities pertaining to the assets 100. When criteria for an alert is met, the telematics server 130 sends a message to the administration terminal 140 to notify an administrator 11. In some implementations, the telematics server 130 sends alerts to the operator terminal 150 to notify an operator 10 of the alert. In some implementations, the telematics server 130 sends alerts to the telematics device 200 to generate an alert to the driver such as a beep, a displayed message, or an audio message.

Figure 2:
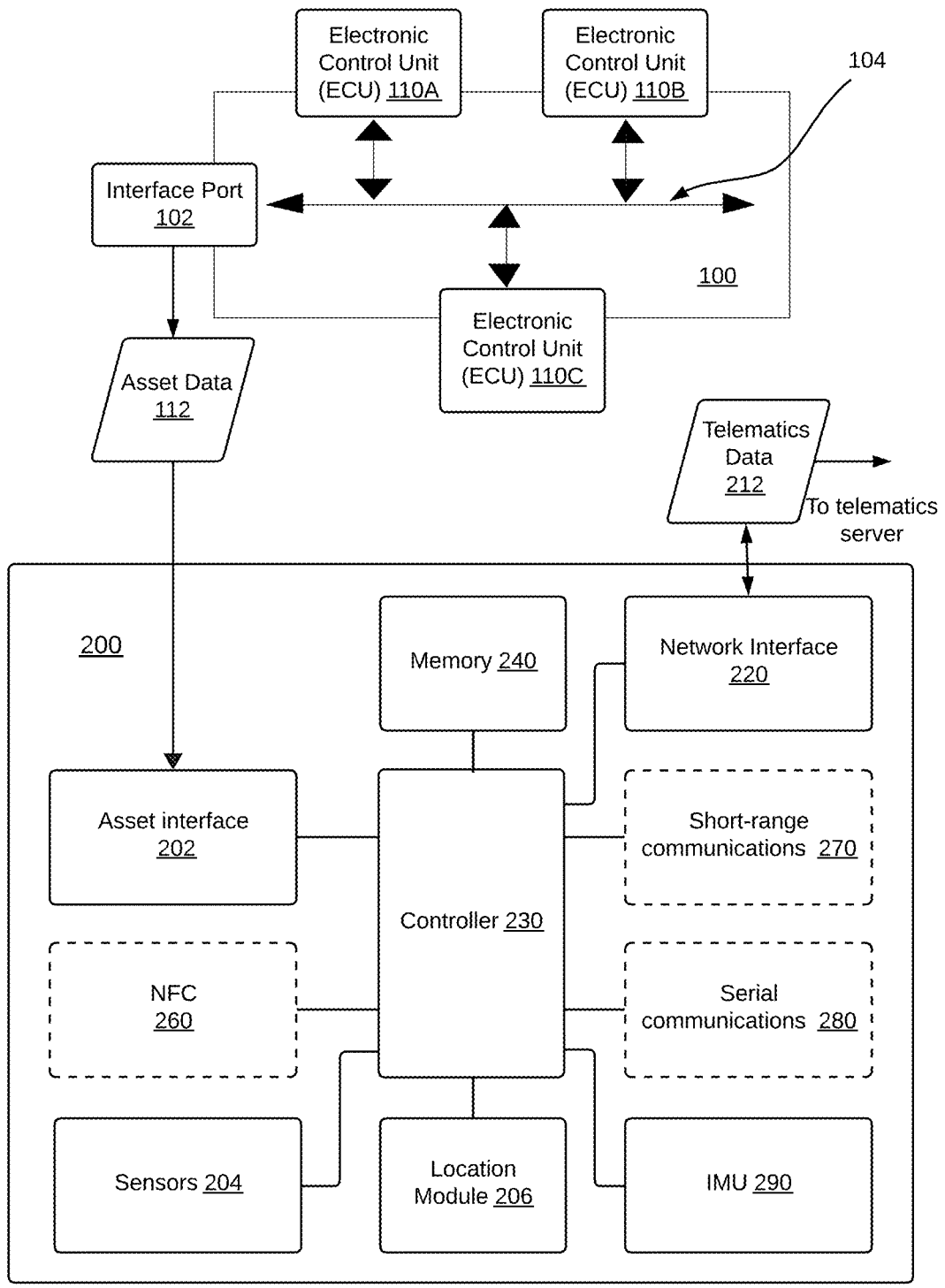
FIG. 2 is a block diagram showing a telematics device coupled to an asset's communications bus via an interface port.

The asset 100 may have a plurality of electronic control units (ECUs) of the above-mentioned types. A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 110B, and the ECU 110C ("the ECUs 110"). The ECU 110A, the ECU 110B, and the ECU 110C are shown to be interconnected via an asset communications bus.

The most commonly used type of asset communications bus is the Controller Area Network (CAN) bus. CAN is a robust and standardized communication protocol designed for real-time control applications. The CAN bus is a physical bus used to connect various ECUs and sensors, allowing them to exchange data and commands. CAN ensures that different vehicle systems can work together seamlessly. ECUs are connected to the CAN bus using dedicated CAN transceivers and connectors.

For example, in FIG. 2 the ECUs 110 are interconnected using the CAN bus 104. The ECUs 110 send and receive information to one another in CAN data frames by placing the information on the CAN bus 104. When an ECU 110 places information on the CAN bus 104, other ECUs 110 receive the information and may or may not consume or use that information.

Different protocols may be used to exchange information between the ECUs over a CAN bus. For example, ECUs 110 in trucks and heavy vehicles use the Society of Automotive Engineering (SAE) J1939 protocol to exchange information over a CAN bus 104. J1939 is based on CAN and is used for diagnostic and communication purposes. Most passenger vehicles use the SAE J1979 protocol, which is commonly known as On-Board Diagnostic II (OBD-II) protocol to exchange information between ECUs 110 on their CAN bus 104. OBD-II is a standardized diagnostic protocol used in most vehicles manufactured since the late 1990s. OBD-II provides a common interface for diagnostic tools to communicate with a wide range of ECUs in the vehicle, including the engine control module (ECM), transmission control module (TCM), and more. OBD-II allows for reading diagnostic trouble codes (DTCs), live data, and performing various diagnostic tests.

An asset 100 may allow access to information exchanged over the CAN bus 104 via an interface port 102. For example, if the asset 100 is a passenger car, then the interface port 102 is most likely an OBD-II port. Data accessible through the interface port 102 is termed the asset data 112. In some implementations, the interface port 102 includes a power interface for providing electric power to a telematics device 200 connected thereto.

Telematics Device

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The telematics device 200 includes a controller 230 coupled to a memory 240, an asset interface 202 and a network interface 220. The telematics device 200 also includes one or more sensors 204 and a location module 206. In some implementations, the telematics device 200 contains an inertial measurement unit, shown as the IMU 290. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data. Some telematics devices may not have any sensors 204 and may rely on external sensors for obtaining sensor data.

Interface Port

Figure 3:
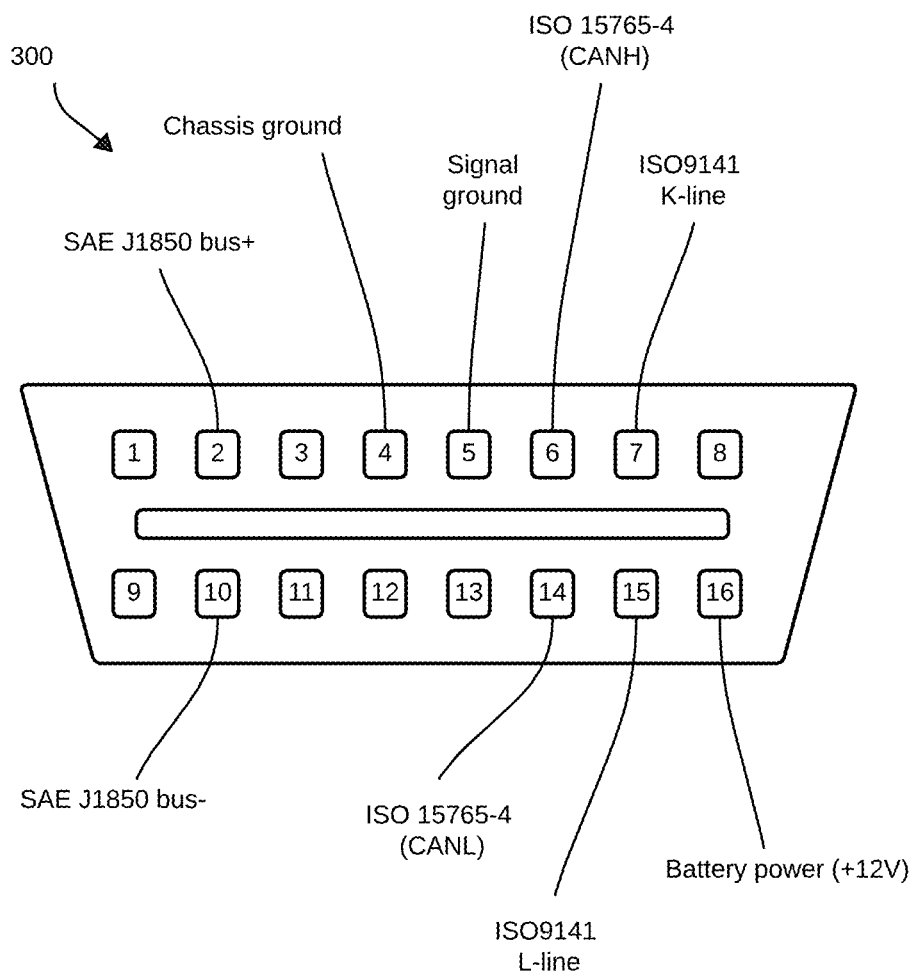
FIG. 3 depicts the pinout of a J1962 connector, also known as an On Board Diagnostics (OBD) connector.

FIG. 3 depicts the pinout of a vehicle J1962 16-pin connector, also referred to as an OBD connector 300. As shown in FIG. 3, the OBD connector 300 has different signal lines which may be used by different protocols. Signal line 1 is known as the SAE J1850 bus+ ("J1850+") signal line and signal line 2 is known as the SAE J1850 bus– ("J1850–") signal. The J1850+/J1850– signal lines are used by the Variable Pulse Width (VPW) protocol and the Pulse Width Modulation (PWM) protocol. Signal line 7 is known as the ISO9141 K-line ("K-line") signal line while signal line 15 is known as the ISO9141 L-line ("L-line") signal line. The K-line and L-line are used by the ISO9141 protocol and the ISO14230 protocol. Signal line 6 is the ISO 15765-4 CAN High ("CANH") signal line while signal line 14 is the ISO 15765-4 CAN Low ("CANL") signal line. The CANH and CANL signal lines are used by the CAN protocol.

Figure 4:
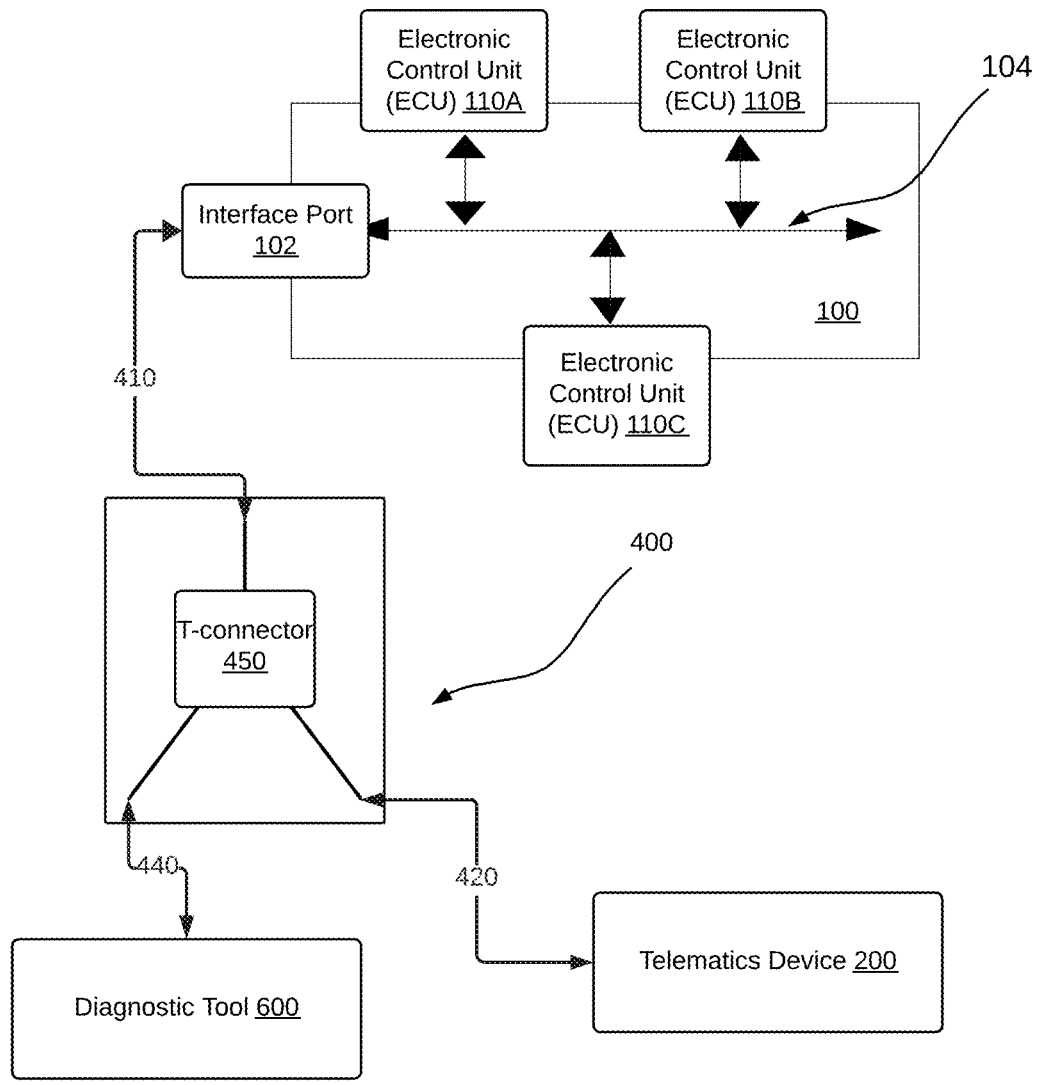
FIG. 4 depicts a telematics device and a diagnostic tool both connected to an asset's communications bus via a T-Harness.

A vehicle asset may be connected to a diagnostic tool, such as an OBD-II reader or an emissions testing device, in addition to having a telematics device 200 connected therewith. FIG. 4 depicts the asset 100 of FIG. 2 shown connected to both a telematics device 200 and a diagnostic tool 600 via a splitter harness, commonly referred to as a T-harness 400.

In this disclosure a "diagnostic tool" is an electronic device that may be used to read asset data 112 for the purpose of diagnosing problems, for the purpose of conducting performance testing such as emission testing, or for the purpose of ECU programming and/or firmware update. A diagnostic tool may also clear some engine error codes, typically known as Diagnostic Trouble Codes (DTCs). A diagnostic tool may also be referred to as a "scan tool" or a "testing tool". In the depicted embodiment of FIG. 4, the diagnostic tool 600 may be an OBD-II reader or any other diagnostic tool for use with a vehicle asset. The diagnostic tool 600 may be a stationary diagnostic tool installed in a workshop, or a portable diagnostic tool. The diagnostic tool 600 can obtain asset information by listening for broadcast data frames sent by the ECUs 110 over the CAN bus 104, or by sending request frames to at least some of the ECUs 110 of the asset 100 requesting certain information.

A wire harness is a specially designed system that keeps numerous wires organized. In this disclosure, a "splitter harness" refers to a harness device that splits a group of signals into multiple groups of signals. As a non-limiting embodiment, a "T-harness" splits a group of signals into two groups of signals thus allowing two electrical devices to connect to the same interface. In the context of a vehicle a T-harness can be used to connect multiple devices to the interface port 102 of a vehicle. Logically, a splitter harness consists of a splitter connector and a plurality of cables or harness segments each ending in a connector for interfacing to a device. The splitter connector depicted in FIG. 4 comprises a T-connector 450, a first harness segment 410, a second harness segment 420, and a third harness segment 440. The T-connector 450 splits the group of signals provided by the interface port 102 over the first harness segment 410, such as the signals of the OBD connector 300, into two groups of signals sent over the second harness segment 420 and the third harness segment 440. For example, a telematics device 200 may connect to the second harness segment 420 and a diagnostic tool 600 may connect to the third harness segment 440. Accordingly, both the telematics device 200 and the diagnostic tool 600 have access to the interface port 102 and the CAN bus 104.

Figure 5:
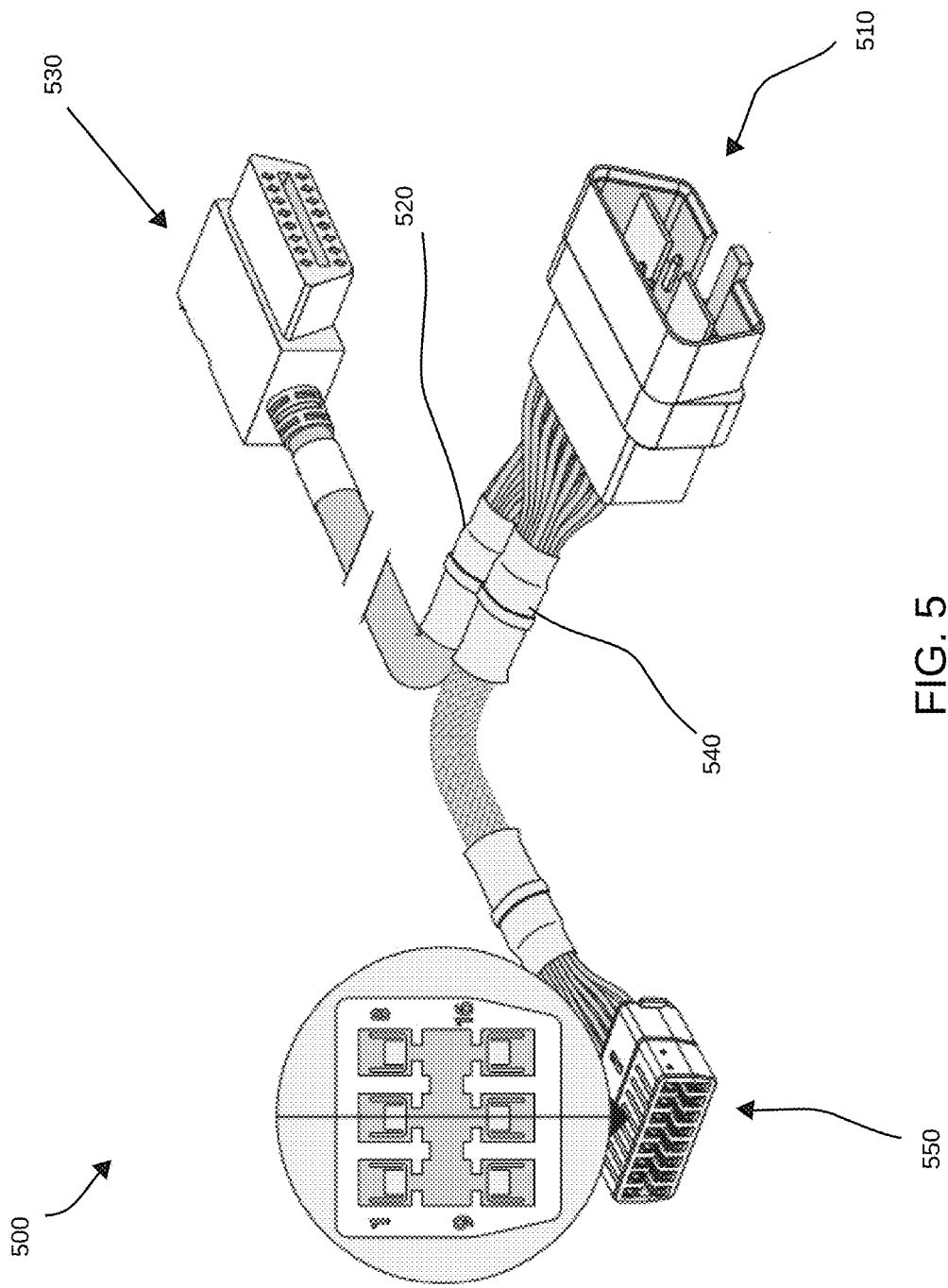
FIG. 5 is a perspective view of an exemplary T-Harness.

FIG. 5 depicts a T-harness 500. The T-harness 500 has a vehicle OBD harness connector 510, a telematics device harness segment 520, a telematics device harness connector 530, an auxiliary OBD harness segment 540, and an auxiliary OBD harness connector 550. The vehicle OBD harness connector 510 connects the T-harness 500 to the vehicle's own OBD connector. The vehicle OBD harness connector 510 also serves as a splitter connector which splits the group of signals of the OBD connector into two identical groups of signals. A first group of signals goes into the telematics device harness segment 520, and a second group of signals goes into the auxiliary OBD harness segment 540. In other words, every signal of the OBD port is replicated in each of the telematics device harness segment 520 and the auxiliary OBD harness segment 540. The telematics device harness connector 530 is shaped for receiving a telematics device 200 having a mating OBD connector. The auxiliary OBD harness connector 550 is intended to replace the vehicle's OBD connector as will be described below as we discuss installation of T-harnesses.

Many regulatory bodies, such as the California Air Resources Board (CARB) require that a vehicle's OBD port not be moved from its original location. As such, a harness such as the T-harness 500 has to be installed such that the auxiliary OBD harness connector 550 is installed in the exact same position as the vehicle's OBD connector. The installation steps of the T-harness 500 in a vehicle are explained with reference to FIG. 6A to FIG. 6F.

Figure 6A:
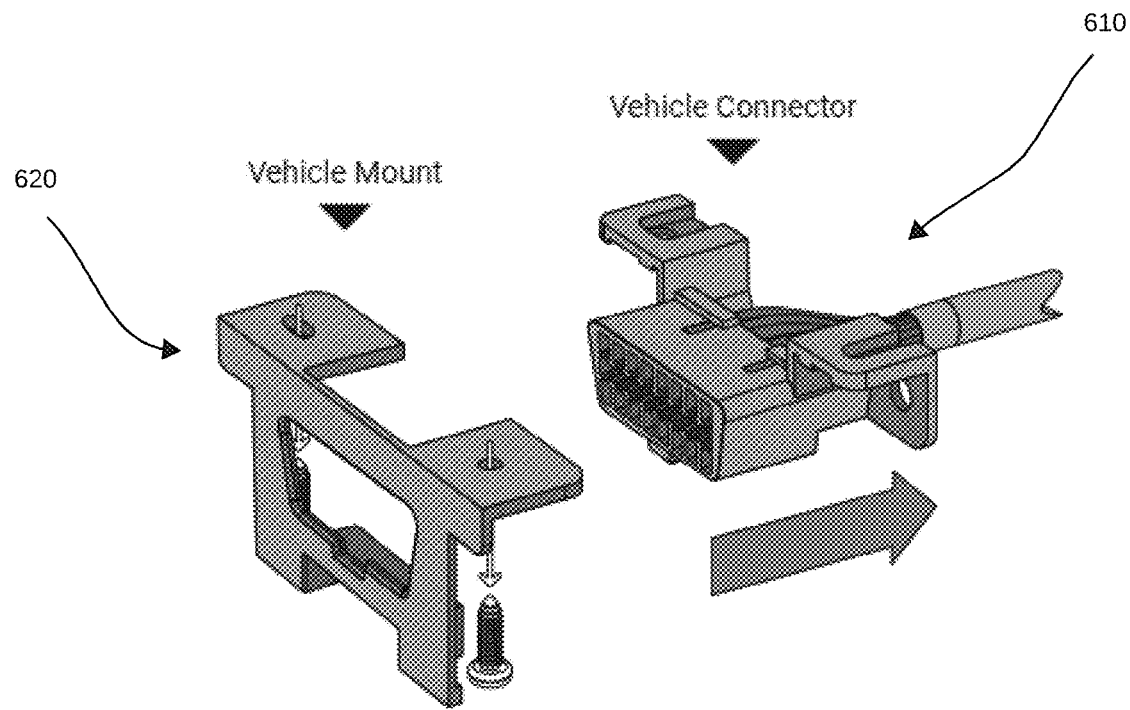
FIG. 6A depicts a first step of installing the T-Harness of FIG. 5 wherein a vehicle OBD connector is removed from the vehicle mount.
Figure 6B:
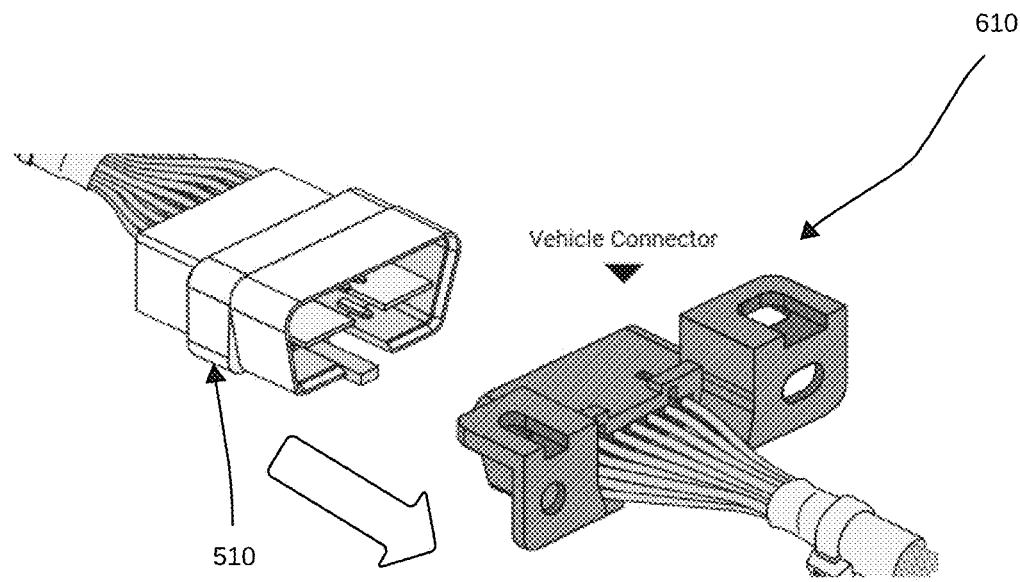
FIG. 6B depicts the second step of installing the T-Harness of FIG. 5 wherein a vehicle-side connector of the T-Harness is connected to the vehicle connector.
Figure 6C:
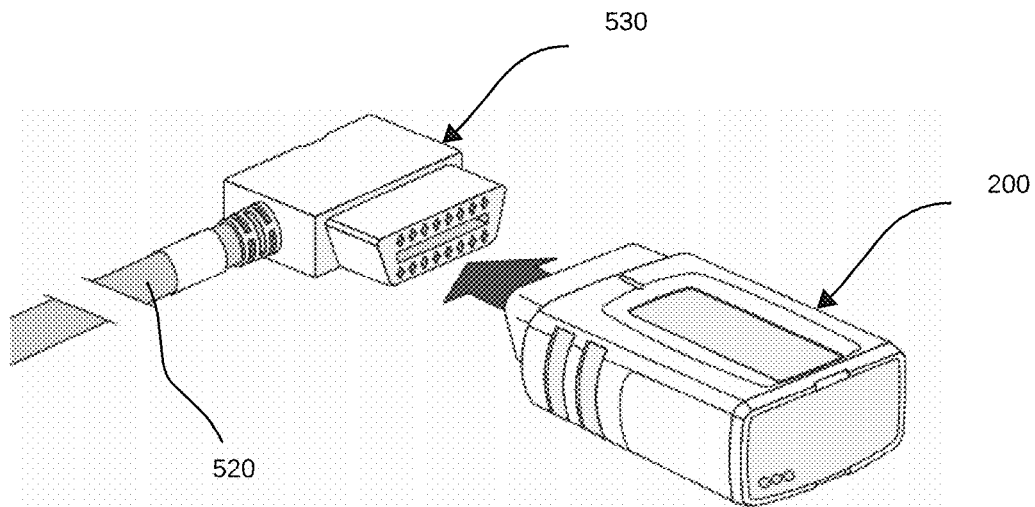
FIG. 6C depicts the third step of installing the T-Harness of FIG. 5 wherein a telematics device is connected to the telematics device connector of the T-Harness.

In FIG. 6A, the vehicle OBD connector 610 is removed from the vehicle mount 620. In FIG. 6B, the vehicle OBD harness connector 510 is connected to the vehicle OBD connector 610. In FIG. 6C, the telematics device 200 is connected to the telematics device harness connector 530.

Figure 6D:
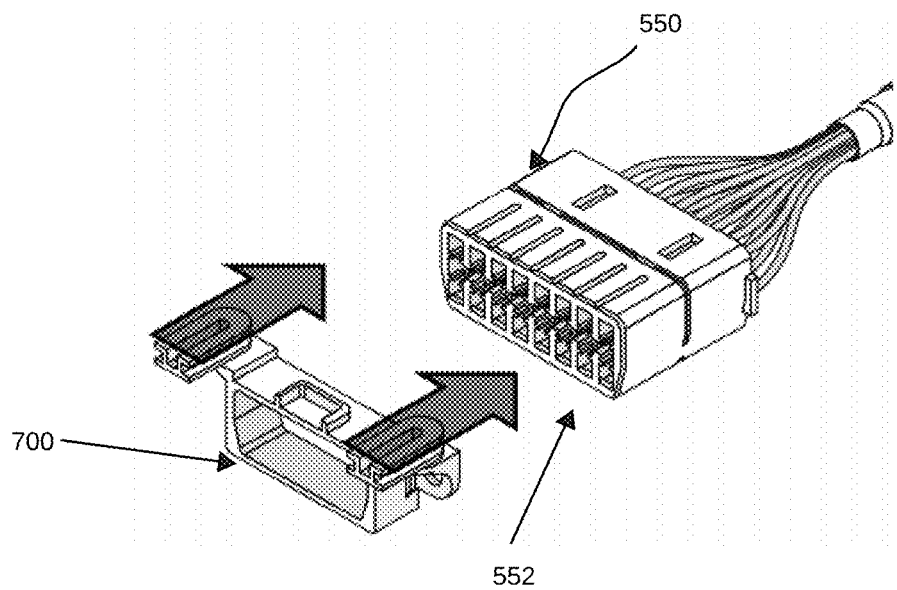
FIG. 6D depicts the fourth step of installing the T-Harness of FIG. 5 wherein a vehicle-specific adapter is connected to the auxiliary OBD port connector of the T-Harness.
Figure 6E:
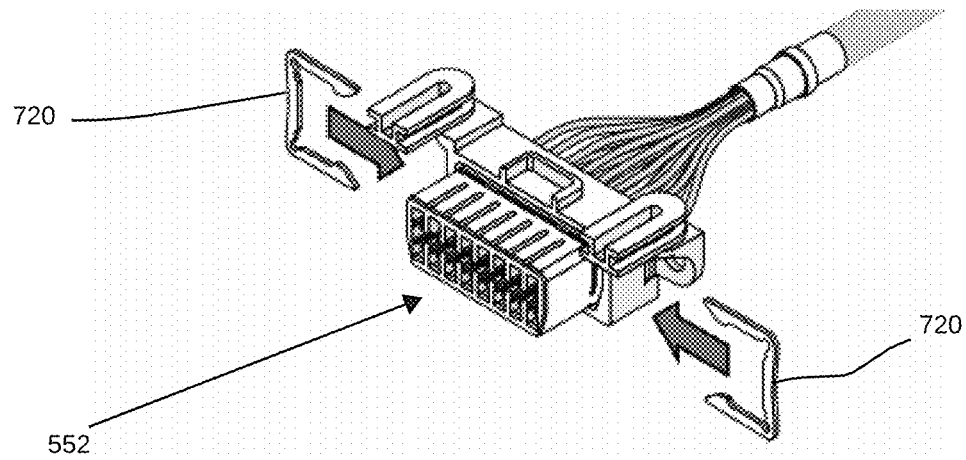
FIG. 6E depicts the fifth step of installing the T-Harness of FIG. 5 wherein the vehicle-specific adapter of FIG. 6D is held in place by metal clips.
Figure 6F:
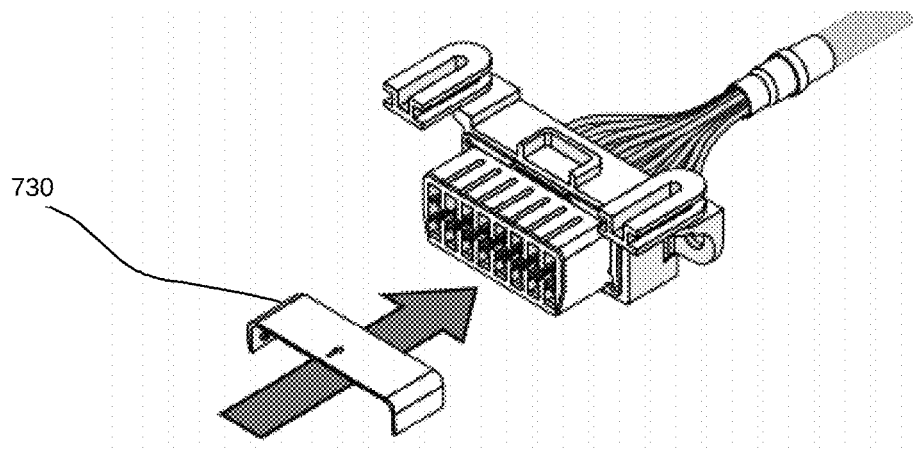
FIG. 6F depicts the sixth step of installing the T-Harness of FIG. 5 wherein a cover plate is slid onto the vehicle-specific adapter of FIG. 6D.
Figure 6G:
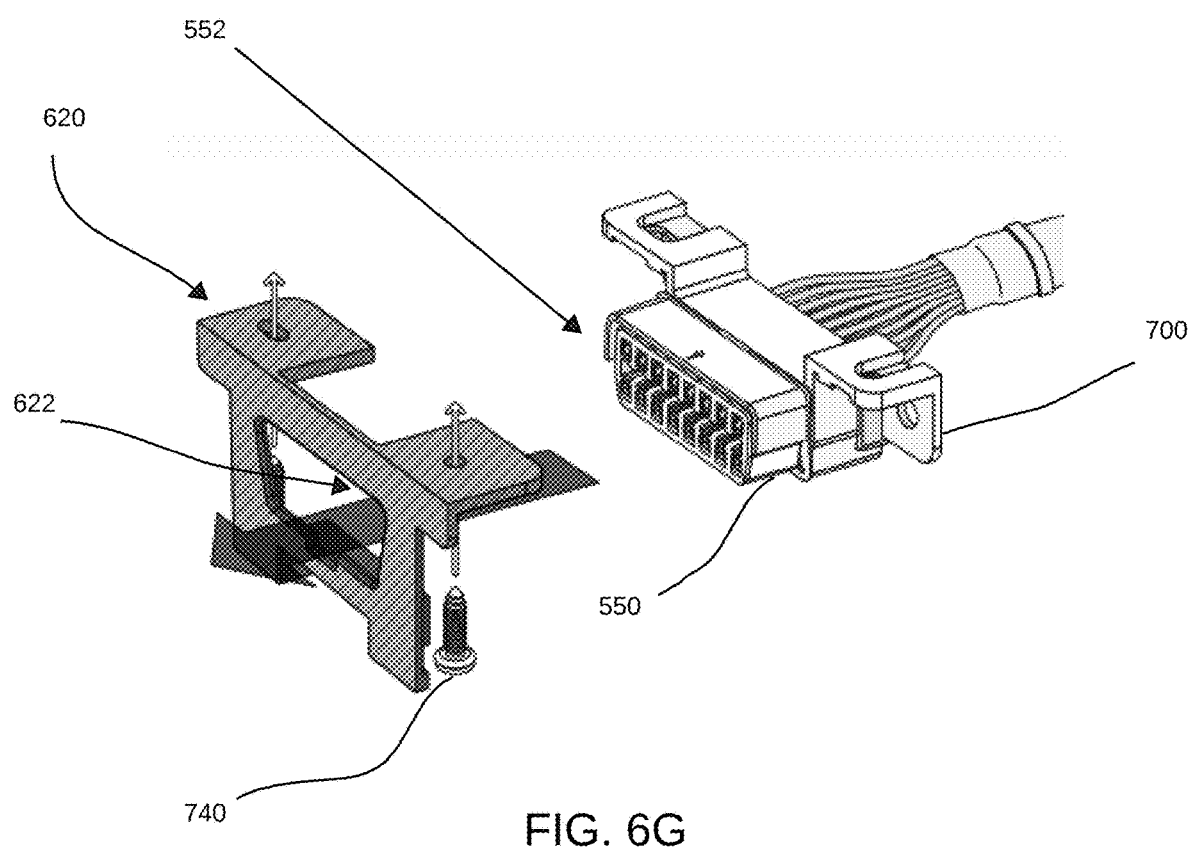
FIG. 6G depicts the seventh step of installing the T-Harness of FIG. 5 wherein the auxiliary OBD port connector is installed in the vehicle mount to replace the vehicle OBD vehicle connector.

In order to connect the auxiliary OBD harness connector 550 to the vehicle mount 620 so that it replaces the vehicle OBD connector 610, a special adapter needs to be coupled to the auxiliary OBD harness connector 550. This is because different vehicles have diverse types of vehicle mount 620. Different adapters exist for different car manufacturers and/or vehicle types. The various adapters are shown in the figures and described further below. In FIG. 6D an exemplary adapter in the form of a flange mount adapter 700 for North American vehicles is to be coupled to the auxiliary OBD harness connector 550 for allowing the auxiliary OBD harness connector 550 to fit in the vehicle mount 620 of some North American vehicles. As shown in FIG. 6D, the flange mount adapter 700 is slid onto the auxiliary OBD harness connector front portion 552. In FIG. 6E, two metal clips 720 are inserted on both sides of the auxiliary OBD harness connector front portion 552 for retaining the flange mount adapter 700 in place thereon. In FIG. 6F a connector cover 730 is slid onto the auxiliary OBD harness connector front portion 552. In FIG. 6G, the auxiliary OBD harness connector 550 is inserted into the vehicle mount aperture 622. Additionally, the flange mount adapter 700 is fastened to the vehicle mount 620, for example by a couple of screws 740 as shown. It is to be noted that other types of mounting adapters other than the flange mount adapter 700 may have different installation procedures.

Figure 7:
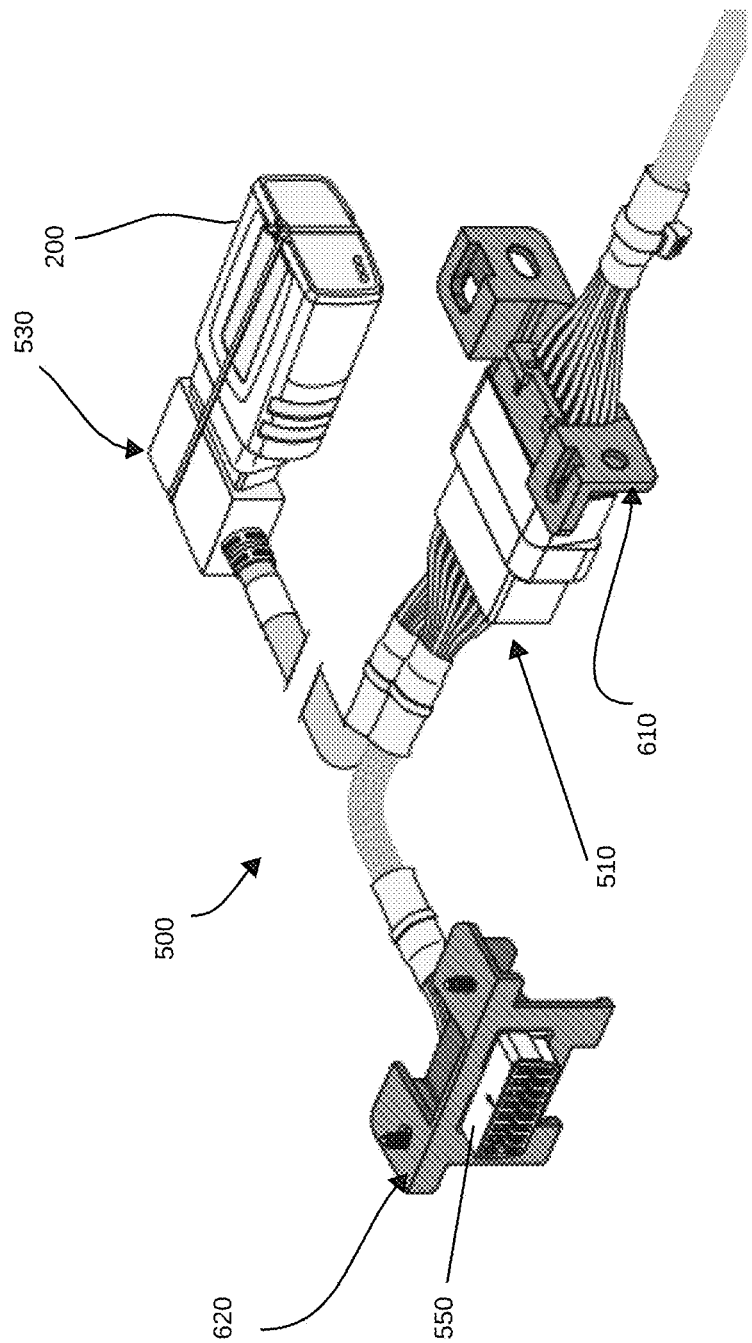
FIG. 7 depicts the T-Harness of FIG. 5 connected to the OBD vehicle connector, the vehicle mount, and the telematics device.

FIG. 7 shows the T-harness 500 connected to the vehicle OBD connector 610, a telematics device 200, and a vehicle mount 620 of a vehicle. A diagnostic tool can connect to the auxiliary OBD harness connector 550.

Figure 8:
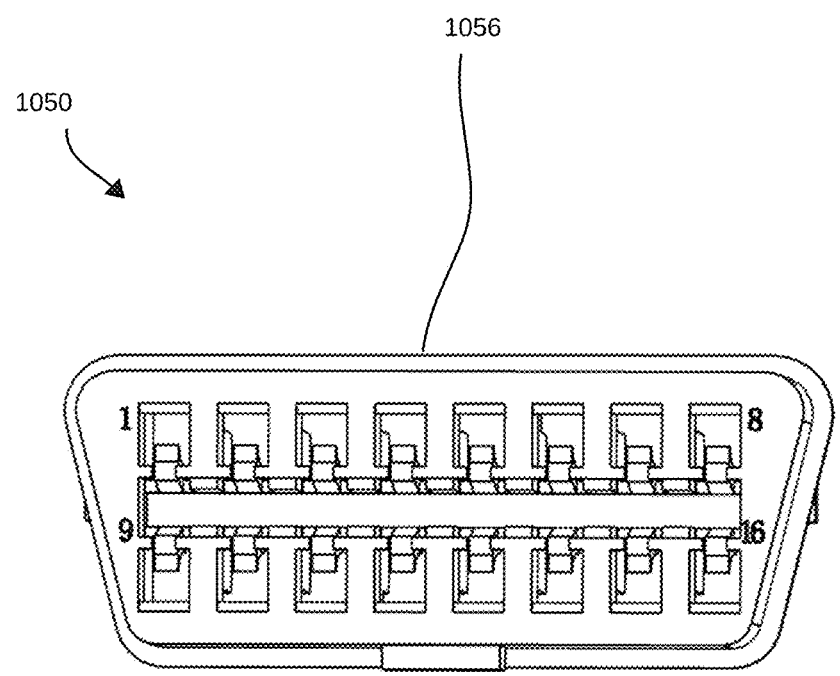
FIG. 8 depicts a trapezoidal OBD connector for use as the auxiliary OBD port connector of the T-Harness, in accordance with embodiments of the present disclosure.

A problem arises from the shape of the auxiliary OBD harness connector 550. A connector of a diagnostic tool or other similar tool may, albeit with difficulty, connect to the auxiliary OBD harness connector 550 in the wrong orientation. This is owing to the shape of the auxiliary OBD harness connector front portion 552 being substantially rectangular in shape. In some jurisdictions, an OBD connector must not be allowed to be used in a vehicle if there is even a remote chance that a diagnostic tool or similar tool may be connected backwards. In order to overcome this problem, the inventors have designed an auxiliary OBD harness connector 1050 that has an auxiliary OBD harness connector front portion 1056 that is trapezoidal in shape, as shown in FIG. 8. The trapezoidal shape of the auxiliary OBD harness connector front portion 1056 prevents the insertion of a mating OBD connector (e.g., of a diagnostic tool) in the wrong orientation and only allows connecting a device connector to the auxiliary OBD harness connector 1050 in one correct orientation.

Figure 9:
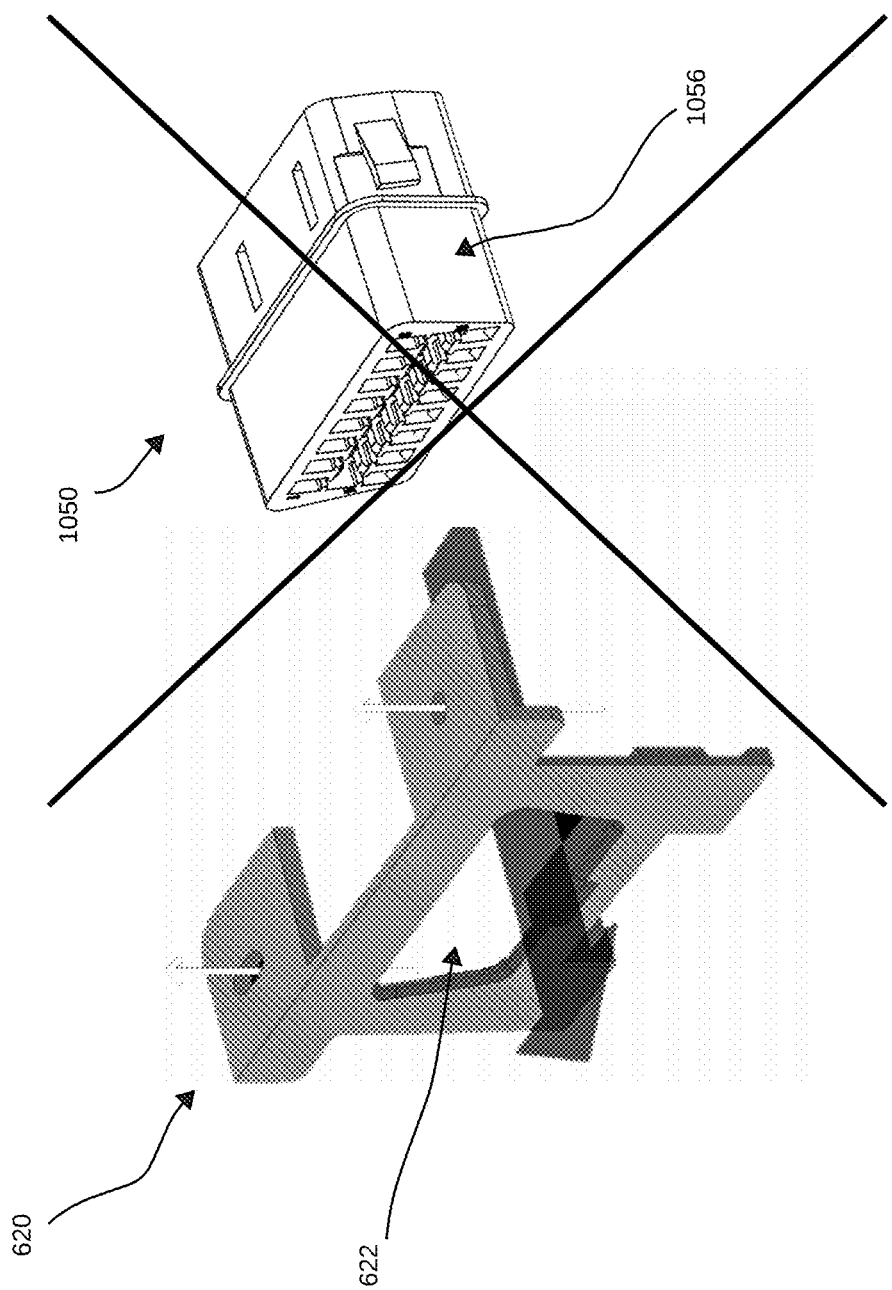
FIG. 9 depicts an attempt to fit the trapezoidal OBD connector of FIG. 8 into a vehicle mount from the front side thereof.

While the trapezoidal shape of the auxiliary OBD harness connector front portion 1056 prevents the insertion of a mating connector therein in the wrong orientation, the trapezoidal shape makes the auxiliary OBD harness connector front portion 1056 larger. In many cases, the auxiliary OBD harness connector 1050 cannot fit in the vehicle mount aperture 622 of the vehicle mount 620, as illustrated in FIG. 9.

The inventors have invented a modified T-harness design and an auxiliary OBD harness connector 1050 which does not allow the insertion of a corresponding connector in the wrong orientation but also fits in the vehicle mount aperture 622 of the vehicle mount 620. The modified T-harness 1000, for use in vehicles having an OBD port, is depicted in FIG. 10.

Figure 10:
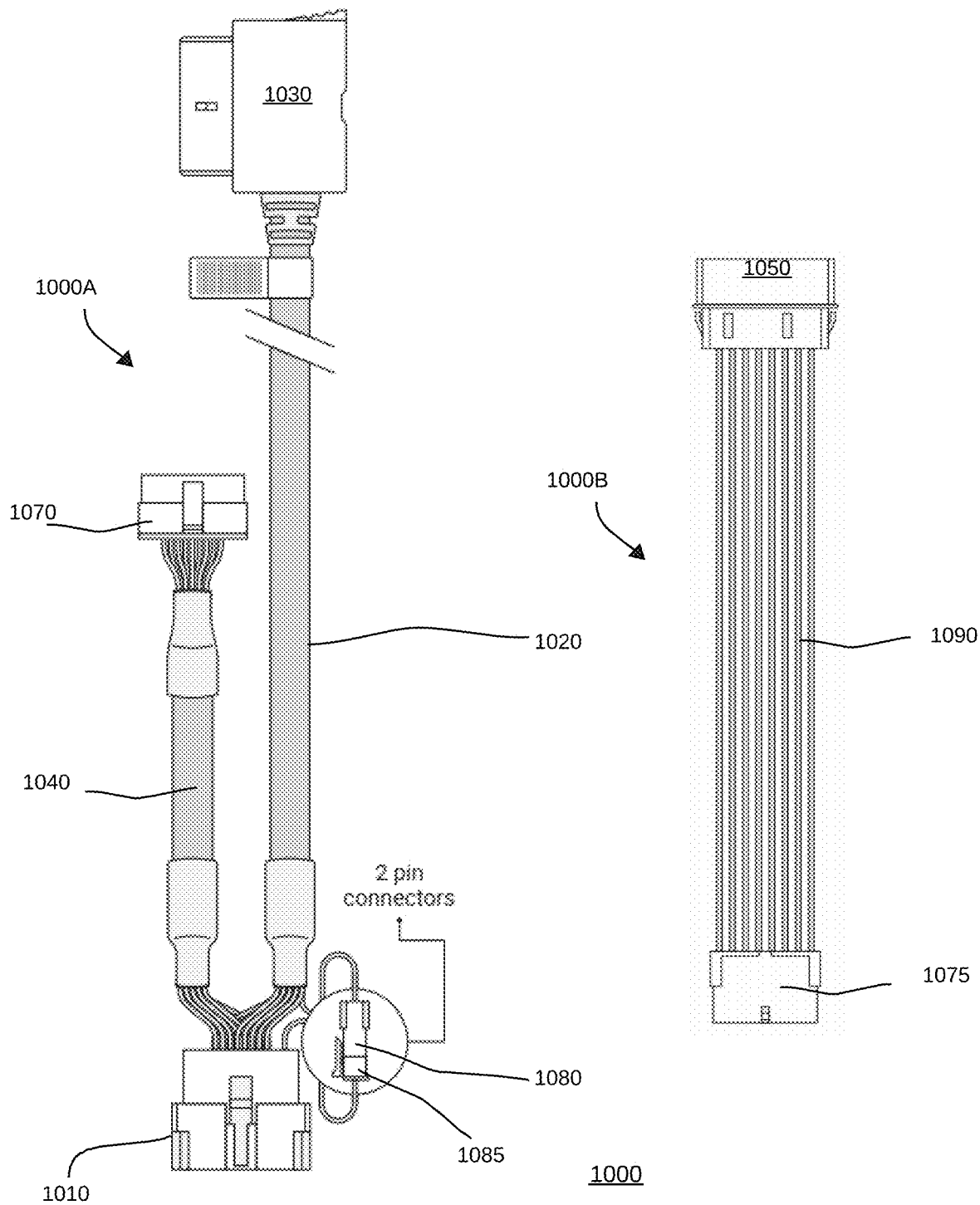
FIG. 10 depicts a vehicle T-Harness for using in vehicles, the T-harness having a removable harness portion including a an auxiliary OBD port connector, in accordance with embodiments of the present disclosure.

With reference to FIG. 10, the modified T-harness is comprised of a main harness portion 1000A, and a removable harness portion 1000B.

The main harness portion 1000A comprises a vehicle OBD harness connector 1010, a telematics device harness connector 1030, a telematics device harness segment 1020, an auxiliary harness segment 1040, and a multi-signal receptacle connector 1070. The main harness portion 1000A optionally also has a two-wire receptacle connector 1080 and a two-wire plug connector 1085 on two of the signal lines leaving the vehicle OBD harness connector 1010 and going into the telematics device harness segment 1020.

The vehicle OBD harness connector 1010 is similar to the vehicle OBD harness connector 510 and is configured to connect to a vehicle OBD connector 610. The vehicle OBD harness connector 1010 also contains a splitter for splitting the signals of the vehicle OBD connector 610 into two groups of signals. A first group of signals is routed via the telematics device harness segment 1020 to the telematics device harness connector 1030. A second group of signals is routed via the auxiliary harness segment 1040 to the multi-signal receptacle connector 1070.

The telematics device harness segment 1020 is generally similar to the telematics device harness segment 520.

The telematics device harness connector 1030 is similar to the telematics device harness connector 530, and is configured for connecting a telematics device 200 thereto.

The auxiliary harness segment 1040 is a multi-wire cable which connects the vehicle OBD harness connector 1010 to the multi-signal receptacle connector 1070. Specifically, the auxiliary harness segment 1040 routes the second group of signals of the two groups of signals provided by the splitter of the vehicle OBD harness connector 1010 to the multi-signal receptacle connector 1070. In the depicted embodiment, the auxiliary harness segment 1040 is a multi-wire cable that is comprised of 16 signal lines.

The multi-signal receptacle connector 1070 is an off-the-shelf receptacle connector, such as the 206461 series made by Molex™. In the depicted embodiment, the multi-signal receptacle connector 1070 can accommodate 16 signal lines, similar to the 206461-16000 receptacle made by Molex™.

For some vehicles that have a network connection, such as an Ethernet connection, two of the signals on the vehicle OBD harness connector 1010 are dedicated to the network connection. Such signals need to be routed to the auxiliary OBD harness connector 1050 for use by a proprietary tool or device that may wish to connect to the vehicle via the network. Routing of such network signals to the auxiliary OBD harness connector 1050 may take place when the removable harness portion 1000B is connected to the main harness portion 1000A as will be described below. However, such networking signals should not be routed to a telematics device to prevent signal RF (radio frequency) leakage and/or the potential of shorting the network signal lines to other signal lines in the telematics device that may have different functionality. In such a case, the network connection signals may be prevented from being routed to the auxiliary OBD harness connector 1050 by disconnecting the two-wire plug connector 1085 from the two-wire receptacle connector 1080.

In some embodiments, the networking signals comprise more than two wires. In such cases, the two-wire plug connector 1085 can be replaced by a multi-wire plug connector. Similarly, the two-wire receptacle connector 1080 is replaced with a multi-wire receptacle connector. The two-wire receptacle connector 1080 and the two-wire plug connector 1085 could also have the inverse gender. The two-wire plug connector 1085 could be connected in place of the two-wire receptacle connector 1080 and vice versa.

The removable harness portion 1000B comprises a multi-signal plug connector 1075 configured to mate with the multi-signal receptacle connector 1070, a multi-wire cable 1090, and an auxiliary OBD harness connector 1050.

The multi-signal plug connector 1075 is an off-the-shelf plug connector of the opposite gender of and is sized to fit with the multi-signal receptacle connector 1070. When the multi-signal plug connector 1075 of the removable harness portion 1000B is connected to the multi-signal receptacle connector 1070, this connects the removable harness portion 1000B to the main harness portion 1000A to form the T-harness. In this case, signals routed to the multi-signal receptacle connector 1070 travel through the multi-signal plug connector 1075, the multi-wire cable 1090, and to the auxiliary OBD harness connector 1050.

It should be noted that the multi-signal plug connector 1075 and the multi-signal receptacle connector 1070 could be swapped with the main harness portion 1000A having the multi-signal plug connector 1075 and the removable harness portion having the multi-signal receptacle connector 1070. Thus, the main harness portion can be thought of as having a first multi-signal connector and the removable harness portion having a second multi-signal connector configured to mate with the first multi-signal connector. The two-wire plug connector 1085 and the two-wire receptacle connector 1080 could also be multi-wire connectors instead of two-wire connectors. The two-wire plug connector 1085 could be connected to the telematics device harness segment 1020 and the two-wire receptacle connector could be connected to the vehicle OBD harness connector 1010. Hence the main harness portion 1000A can be thought of as having a third multi-wire connector and a fourth multi-wire connector.

The auxiliary harness connector 1050 has been described above with reference to FIG. 8.

FIG. 11A is a front view of the vehicle OBD harness connector 1010. FIG. 11B is a front view of the multi-signal plug connector 1075. FIG. 11C is a front view of the telematics device harness connector 1030. FIG. 11D is a front view of the auxiliary OBD harness connector 1050. FIG. 11E is a front view of the multi-signal receptacle connector 1070.

FIGS. 12A-12H depict different views of the auxiliary OBD harness connector 1050. The auxiliary OBD harness connector 1050 has at least one locking member for mating with a matching locking structure on a vehicle mounting adapter. In the depicted embodiment, the at least one locking member is in the form of the auxiliary OBD harness connector snaps 1052 formed on opposite sides of the auxiliary OBD harness connector rear portion 1054. The auxiliary OBD harness connector snaps 1052 are angled relative to the sidewall of the auxiliary OBD harness connector rear portion 1054 and are sized for fitting in a compatible cutout on a vehicle mounting adapter for locking the vehicle mounting adapter to the auxiliary OBD harness connector 1050. The auxiliary OBD harness connector snaps 1052 are angled such that a vehicle mounting adapter can slide onto the auxiliary OBD harness connector 1050 from a rear side thereof 1054. The auxiliary OBD harness connector snaps 1052 are configured to flex inwards towards the sidewall of the auxiliary OBD harness connector rear portion 1054 as a structure, such as a rib, of the mounting adapter applies pressure thereon. This facilitates the insertion of the auxiliary OBD harness connector snaps 1052 into matching cutouts on the vehicle mounting adapter.

Figure 13A:
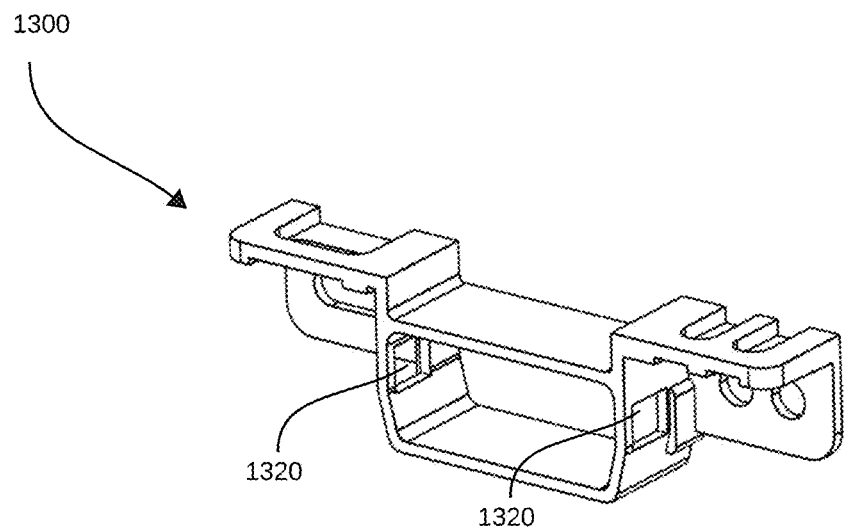
FIG. 13A is a top, front, right side perspective view of a flange mount adapter, typically used by domestic (Ford™, GM™, Chrysler™) vehicles, for coupling to the auxiliary OBD connector of FIGS. 12A-12H.
Figure 13B:
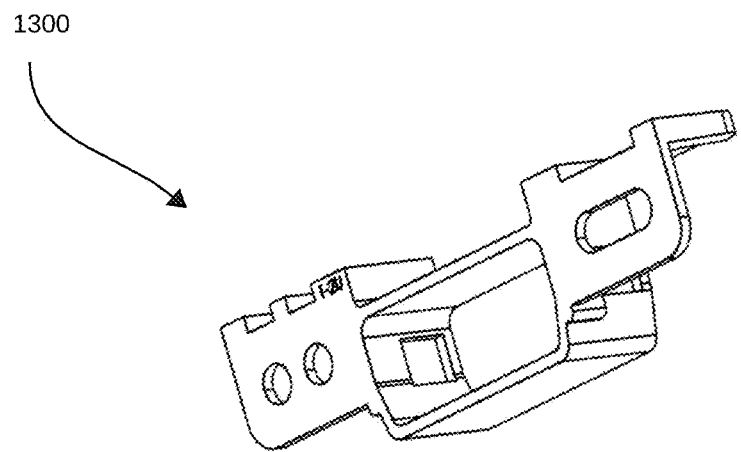
FIG. 13B is a bottom, rear, left perspective view of the adapter of FIG. 13A.
Figure 13D:
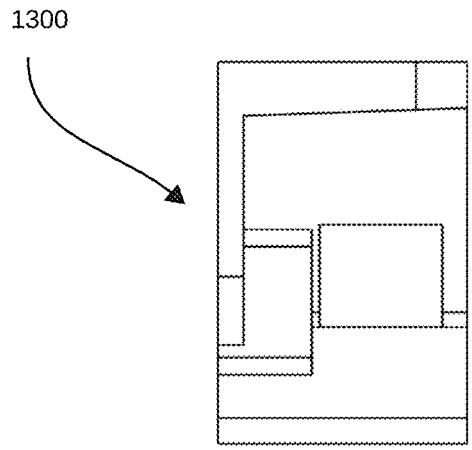
FIG. 13D is a left side elevation view of the adapter of FIG. 13A.
Figure 13C:
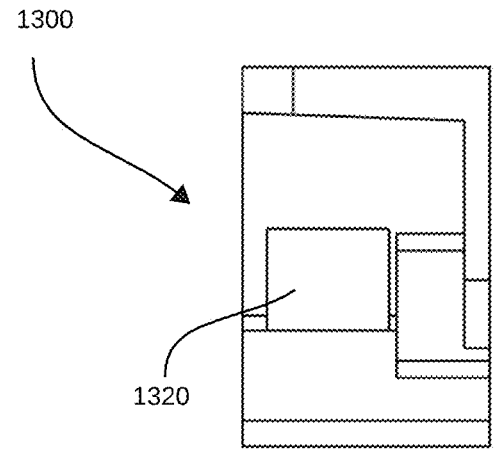
FIG. 13C is a right side elevation view of the adapter of FIG. 13A.
Figure 13E:
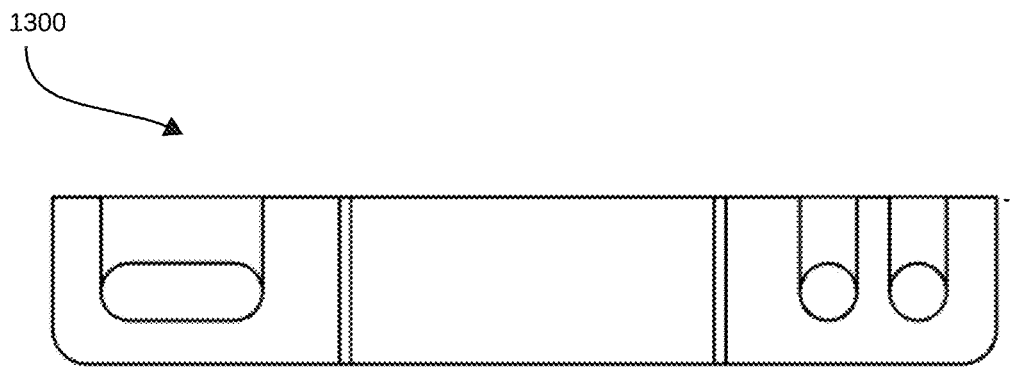
FIG. 13E is a top plan view of the adapter of FIG. 13A.
Figure 13F:
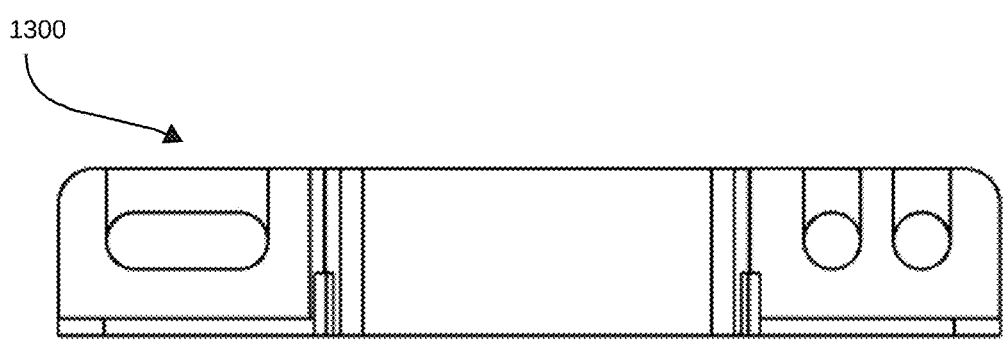
FIG. 13F is a bottom plan view of the adapter of FIG. 13A.
Figure 13G:
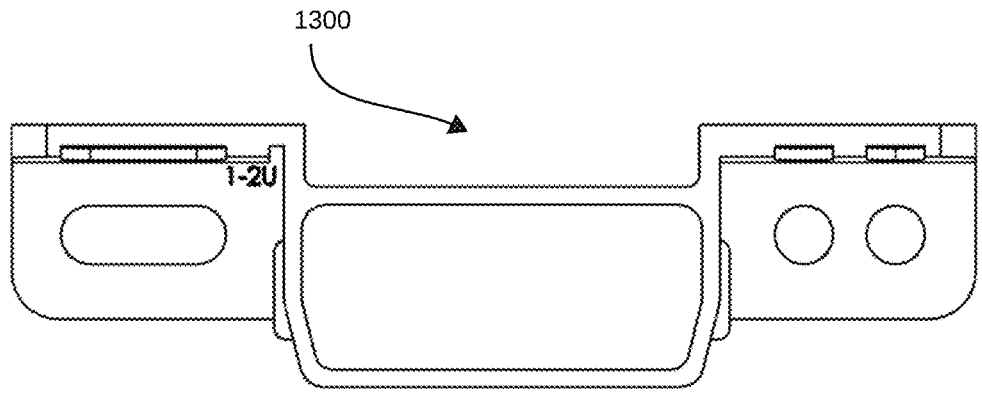
FIG. 13G is a front elevation view of the adapter of FIG. 13A.
Figure 13H:
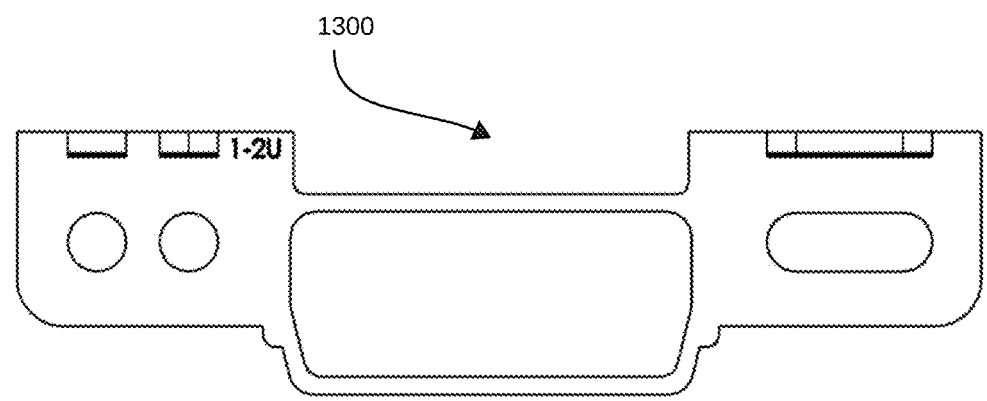
FIG. 13H is a rear elevation view of the adapter of FIG. 13A.
Figure 13I:
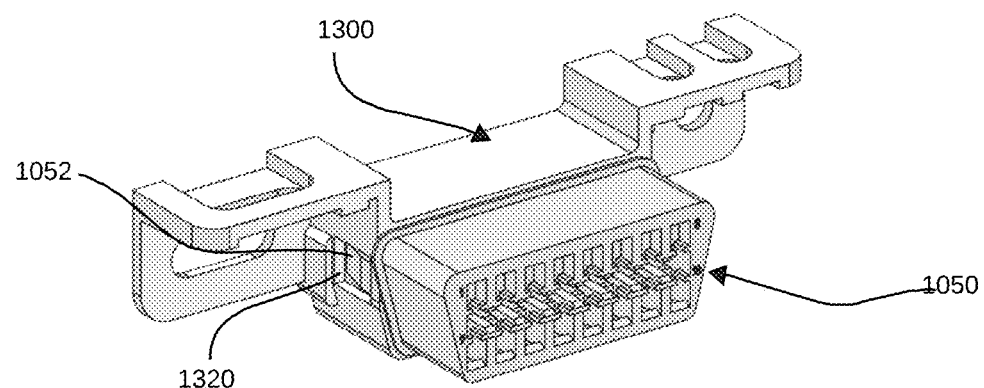
FIG. 13I is a top front left perspective view of the adapter of FIG. 13A-13H coupled to the auxiliary OBD connector of FIGS. 12A-12H.

As an example of a vehicle mounting adapter, we will first consider a flange mount adapter for North American vehicles, depicted in FIGS. 13A-13I. FIGS. 13A-13H depict a flange mount adapter 1300 for use with Ford™, GM™, and Chrysler™ vehicles. The flange mount adapter 1300 has two rectangular cutouts 1320 configured for receiving the auxiliary OBD harness connector snaps 1052. FIG. 13I depicts the flange mount adapter 1300 coupled to the auxiliary OBD harness connector 1050. In FIG. 13I, the auxiliary OBD harness connector snaps 1052 are shown to have snapped into place within the two rectangular cutouts 1320 of the flange mount adapter 1300 in a locking arrangement. The steps for coupling the flange mount adapter 1300 to the auxiliary OBD connector are discussed below with reference to FIGS. 14A-14B. Other cutout shapes are also contemplated as long as they can receive the auxiliary OBD harness connector snaps 1052.

The design of the T-harness 1000 overcomes the problems described above in relation to fitting the various vehicle adapters to the auxiliary OBD harness connector 1050. Specifically, the trapezoidal shape of the front of the auxiliary OBD harness connector 1050 prevents the insertion of the various vehicle adapters to the auxiliary OBD harness connector as shown in FIG. 9. The split design of the T-harness 1000 permits the insertion of the vehicle adapters from the direction of the auxiliary OBD harness connector rear portion 1054. This is demonstrated with reference to FIGS. 14A to 14E which depict the steps of installing the T-harness 1000 in a vehicle.

The first step of installing the T-harness 1000 in a vehicle involves the removal of the vehicle OBD connector 610 from the vehicle mount 620 as shown earlier in FIG. 6A.

Figure 14A:
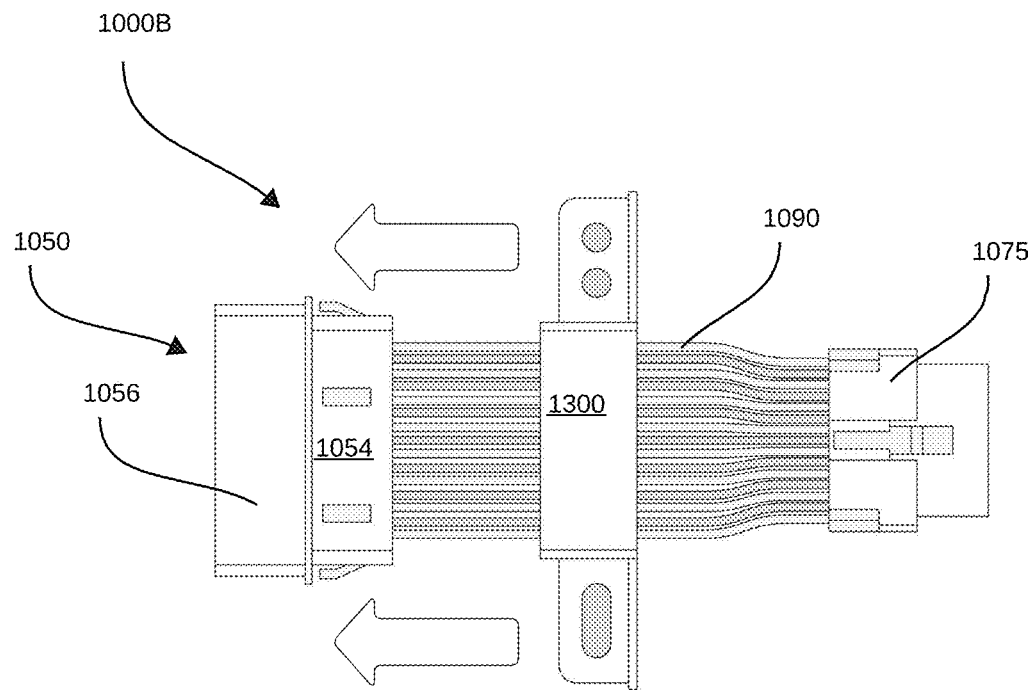
FIG. 14A depicts the insertion of the adapter of FIGS. 13A-13H onto the removable harness portion from FIG. 10 towards the auxiliary OBD connector of FIGS. 12A-12H.

The second step is shown in FIG. 14A. A mounting adapter suitable for the vehicle in which the T-harness 1000 is to be installed is then slipped over the removable harness portion 1000B from the multi-signal plug connector 1075 side, over the multi-wire cable 1090, and towards the auxiliary OBD harness connector 1050 from the direction of the auxiliary OBD harness connector rear portion 1054. In FIGS. 14A-14D, the flange mount adapter 1300 of FIGS. 13A-13I is used. However, any other mounting adapter could be used as appropriate to the vehicle.

Figure 14B:
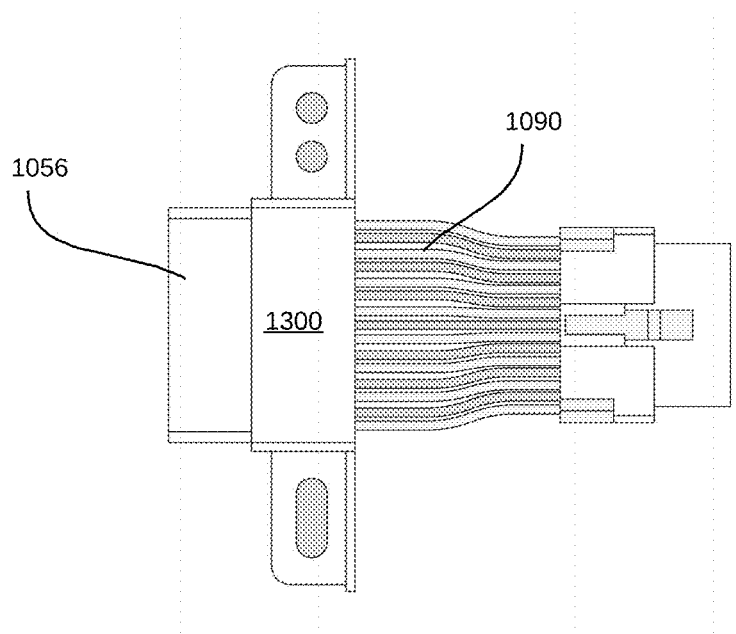
FIG. 14B depicts the removable harness portion with the adapter of FIGS. 13A-13H connected to the auxiliary OBD connector of FIGS. 12A-12H.

FIG. 14B shows the auxiliary OBD harness connector 1050 with the flange mount adapter 1300 locked in place over the auxiliary OBD harness connector rear portion 1054, as described above with reference to FIG. 13I. Specifically the auxiliary OBD harness connector snaps 1052 have snapped into place within the rectangular cutout 1320 of the flange mount adapter 1300 thus locking the flange mount adapter 1300 to the auxiliary OBD harness connector 1050.

Figure 12A:
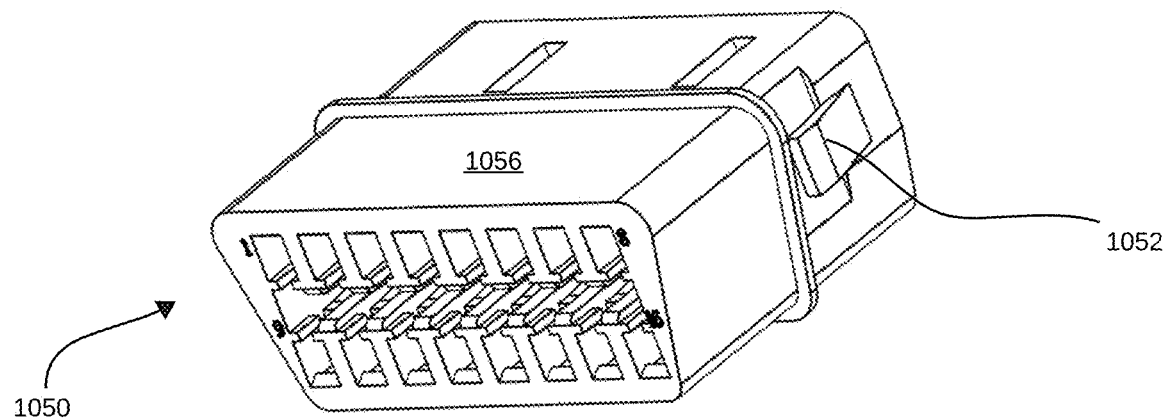
FIGS. 12A-12H depict different views of the auxiliary OBD connector of the T-Harness of FIG. 10.
Figure 12B:
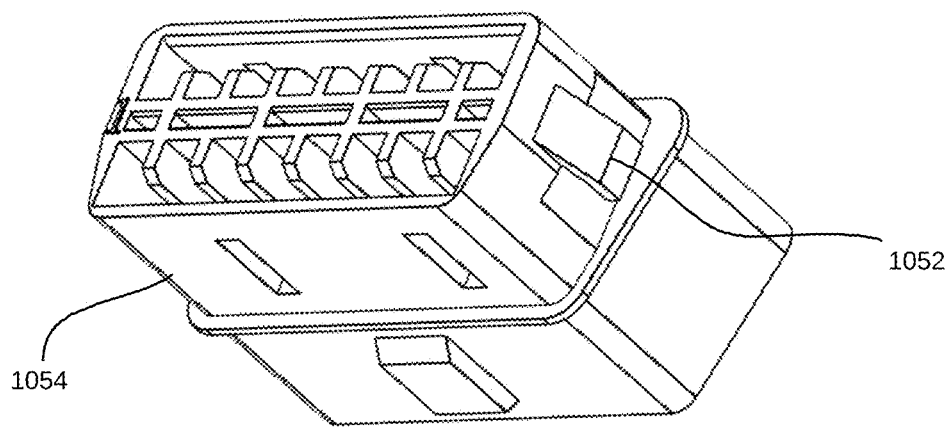
Figure 12C:
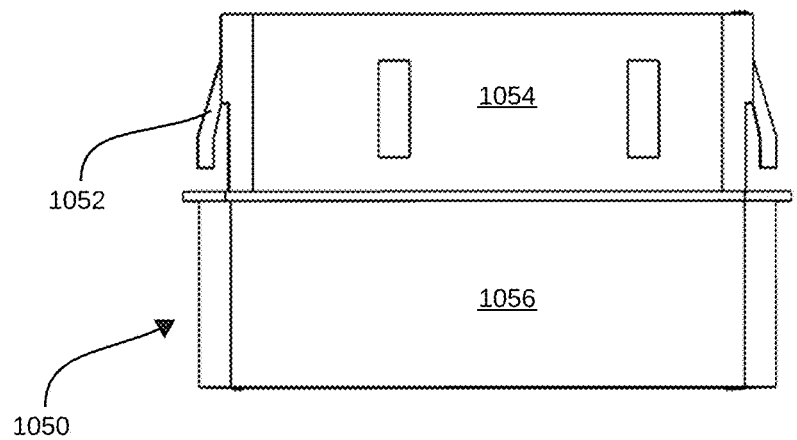
Figure 12D:
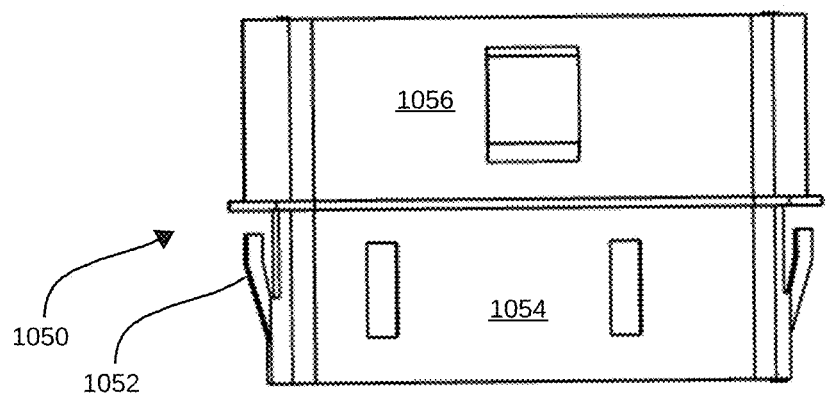
Figure 12E:
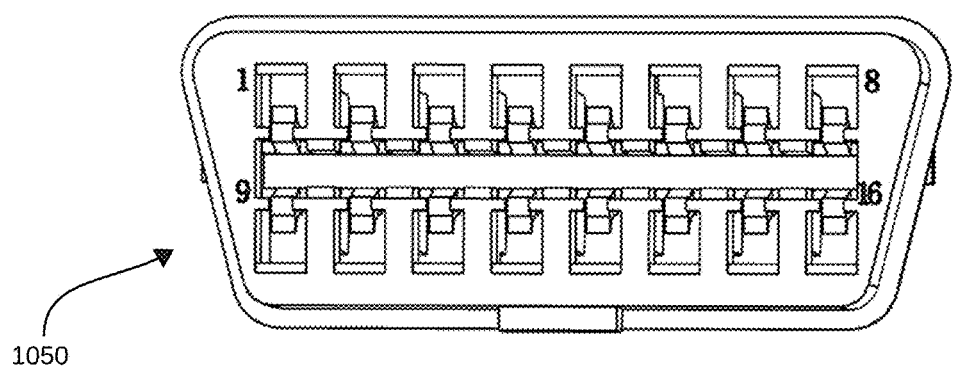
Figure 12F:
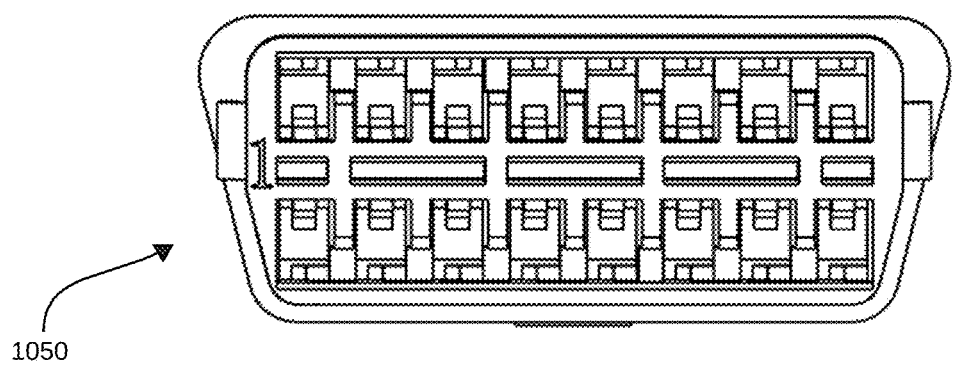
Figure 12G:
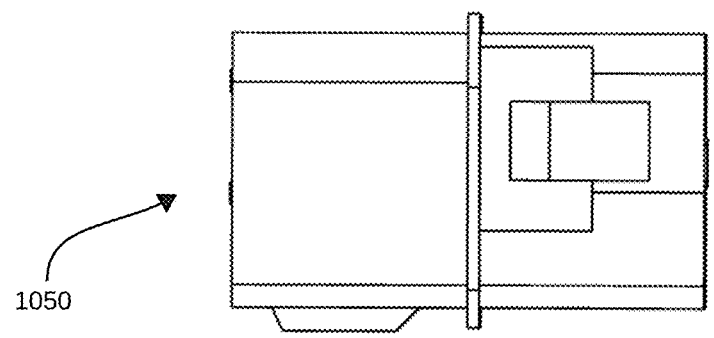
Figure 12H:
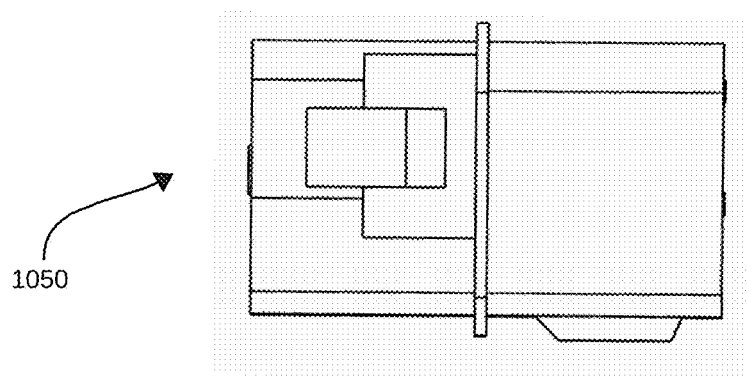
Figure 14C:
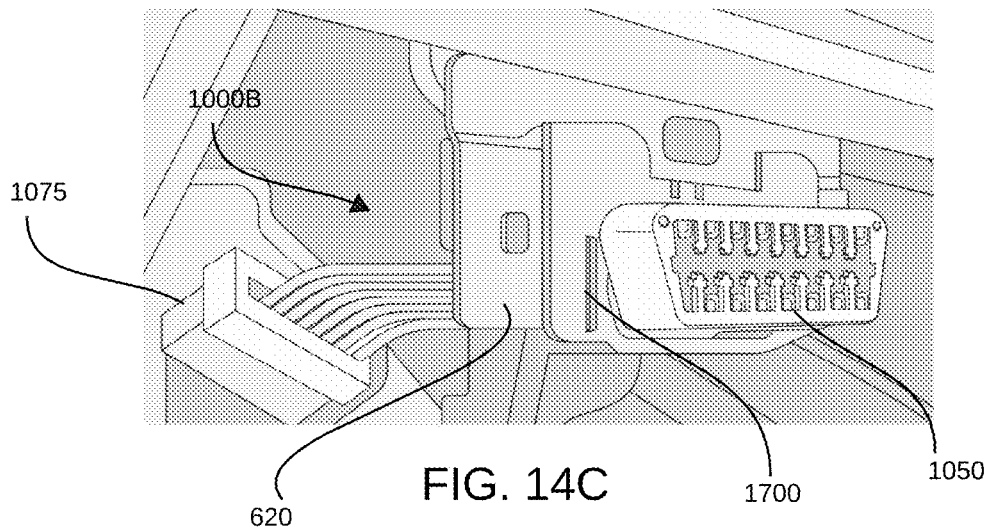
FIG. 14C depicts the removable harness portion with auxiliary OBD connector inserted into a vehicle mount.

The next step is to connect the removable harness portion 1000B to the vehicle mount 620. As discussed above with reference to FIG. 9, the auxiliary OBD harness connector front portion 1056 is too large to fit in the vehicle mount aperture 622 of the vehicle mount 620. However, as best seen in FIG. 12C and FIG. 12D, the auxiliary OBD harness connector 1050 has an auxiliary OBD harness connector rear portion 1054 that has a smaller width than the width of the auxiliary OBD harness connector front portion 1056 thereof. The auxiliary OBD harness connector rear portion 1054 is sized to pass through the vehicle mount aperture 622. As such, to connect the removable harness portion 1000B to the vehicle mount 620, the multi-signal plug connector 1075 is passed through the vehicle mount aperture 622, and the multi-wire cable 1090 is also threaded through the vehicle mount aperture 622. Then the auxiliary OBD harness connector rear portion 1054 and the vehicle mounting adapter connected thereto are fitted in the vehicle mount aperture 622. At this point, the vehicle mount adapter is connected to the vehicle mount 620 by whatever means the vehicle mount and the vehicle mount adapter are designed to use. FIG. 14C depicts the removable harness portion 1000B connected to the vehicle mount 620 at the auxiliary OBD harness connector 1050 and having a slide and lock mount adapter 1700 fitted thereon.

Figure 14D:
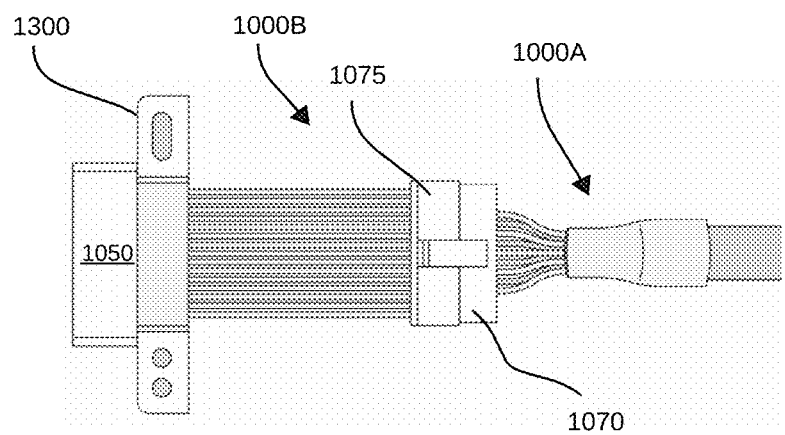
FIG. 14D depicts the connection of the removable harness portion to the T-Harness via the ribbon connectors.

The next step is to connect the main harness portion 1000A to the removable harness portion 1000B, as shown in FIG. 14D. Connecting the main harness portion 1000A to the removable harness portion 1000B comprises connecting the multi-signal plug connector 1075 to the multi-signal receptacle connector 1070.

Figure 14E:
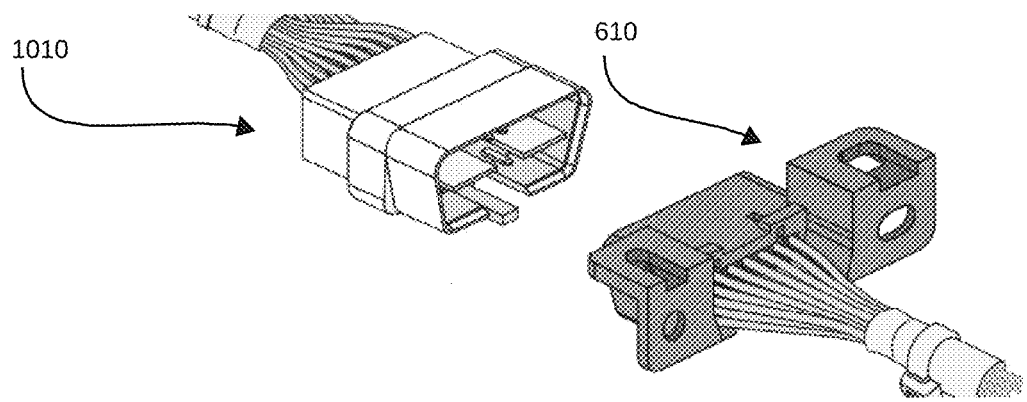
FIG. 14E depicts the connection of the vehicle OBD harness connector to the vehicle OBD connector.

The last step is to connect the vehicle OBD harness connector 1010 to the vehicle OBD connector 610, as shown in FIG. 14E.

Figure 15:
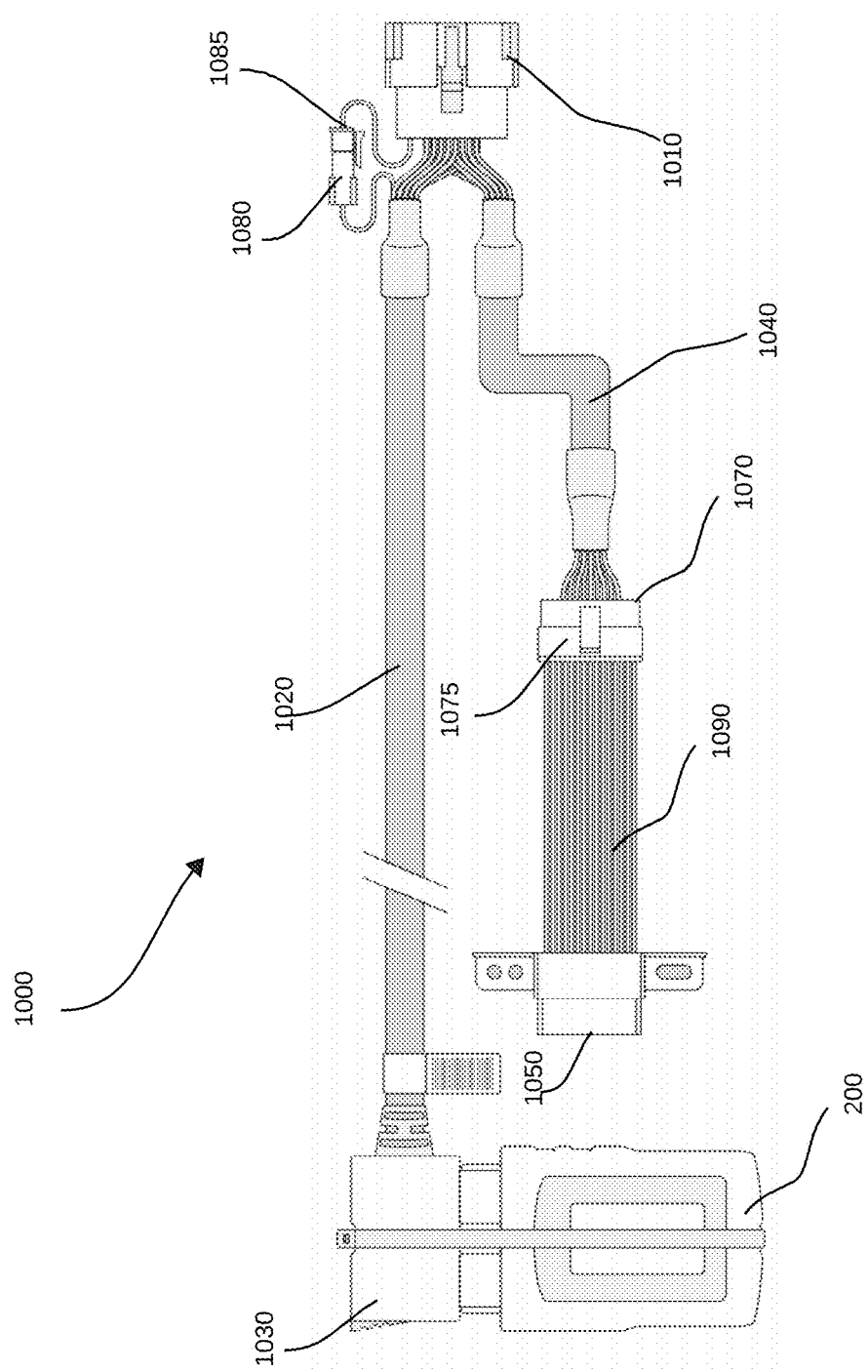
FIG. 15 depicts the T-Harness in a fully assembled mode and having a telematics device connected thereto.

FIG. 15 shows the T-harness 1000 with a telematics device 200 connected to the telematics device harness connector 1030. The main harness portion 1000A and the removable harness portion 1000B are connected to one another, and the auxiliary OBD harness connector 1050 has a flange mounting adapter 1300 that allows the auxiliary OBD harness connector to be mounted to a vehicle mount 620.

Advantageously, the T-harness 1000 replaces the vehicle OBD connector with the auxiliary OBD harness connector 1050 which does not permit any connection thereto in an incorrect orientation. This is owing to the trapezoidal shape of the auxiliary OBD harness connector front portion 1056. Additionally, the removable harness portion 1000B allows for fitting the auxiliary OBD harness connector 1050 and any mounting adapter fitted thereto, to the vehicle mount from the direction of the auxiliary OBD harness connector rear portion 1054 and thus fit in the vehicle mount aperture 622. Furthermore, the installation is made simple as the removable harness portion 1000B is easy to handle due to its small size. As a result, installing the removable harness portion 1000B to the vehicle mount 620 before connecting the main harness portion 1000A makes the installation simple.

For vehicles which have network signal lines, the T-harness 1000 includes the two-wire receptacle connector 1080 and the two-wire plug connector 1085 on some signal lines routed from the vehicle OBD harness connector 1010 to the telematics device harness segment 1020. Accordingly, such network signal lines can be disconnected and not routed to a telematics device connected to the telematics device harness connector 1030. Advantageously, potential for RF leakage or an accidental shorting of such signal lines are averted.

OBD Connector Adapters

As discussed briefly above, the different vehicle mounts require different adapters to connect to the respective vehicle mounts.

Figure 16A:
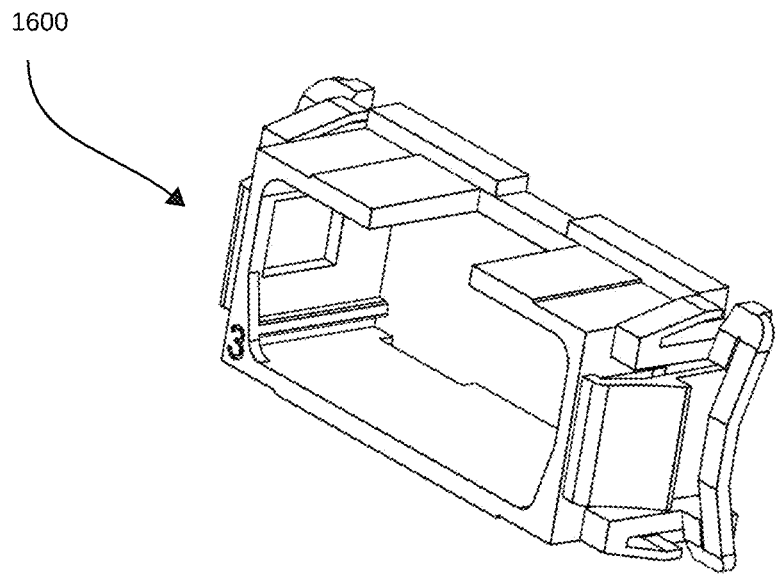
FIG. 16A is a top, front, right side perspective view of a North American snap-in mount adapter, typically used by Chrysler™ vehicles, for coupling to the auxiliary OBD connector of FIGS. 12A-12I.
Figure 16B:
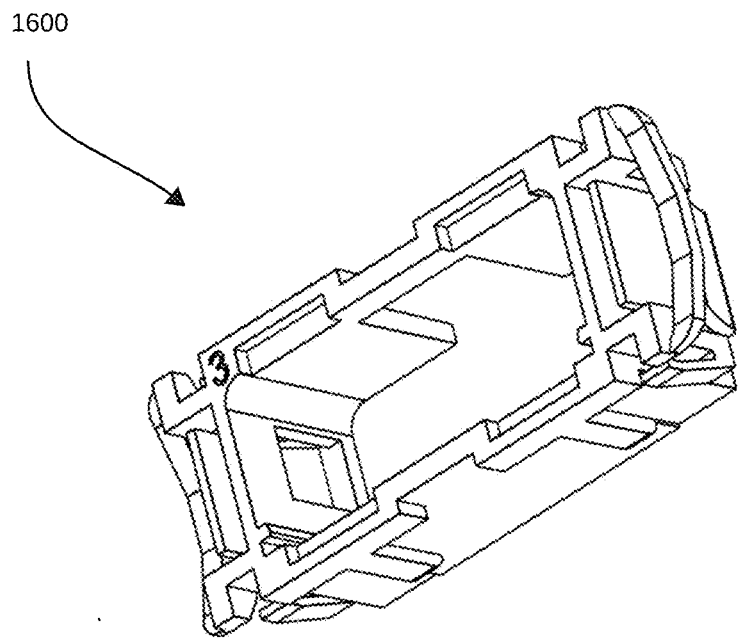
FIG. 16B is a bottom, rear, left perspective view of the adapter of FIG. 16A.
Figure 16C:
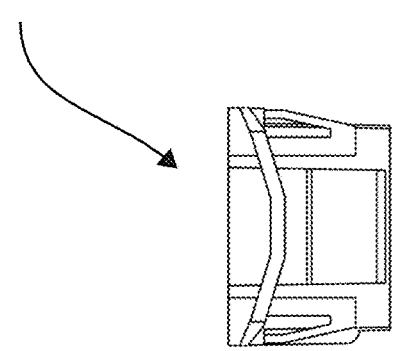
FIG. 16C is a right side elevation view of the adapter of FIG. 16A.
Figure 16D:
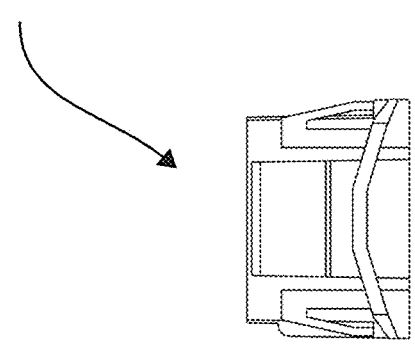
FIG. 16D is a left side elevation view of the adapter of FIG. 16A.
Figure 16E:
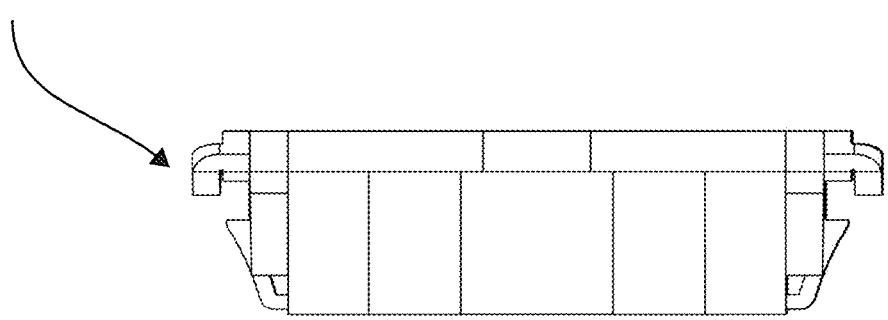
FIG. 16E is a top plan view of the adapter of FIG. 16A.
Figure 16F:
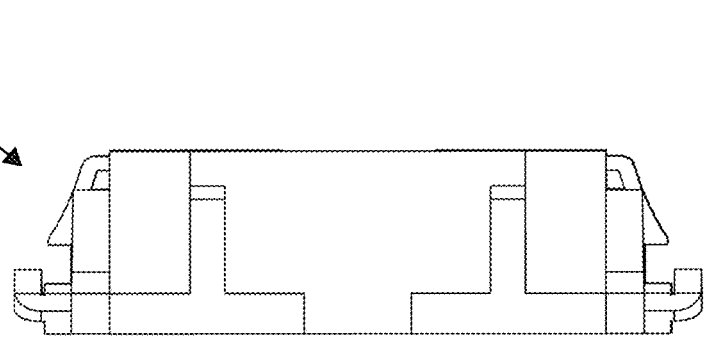
FIG. 16F is a bottom plan view of the adapter of FIG. 16A.
Figure 16G:
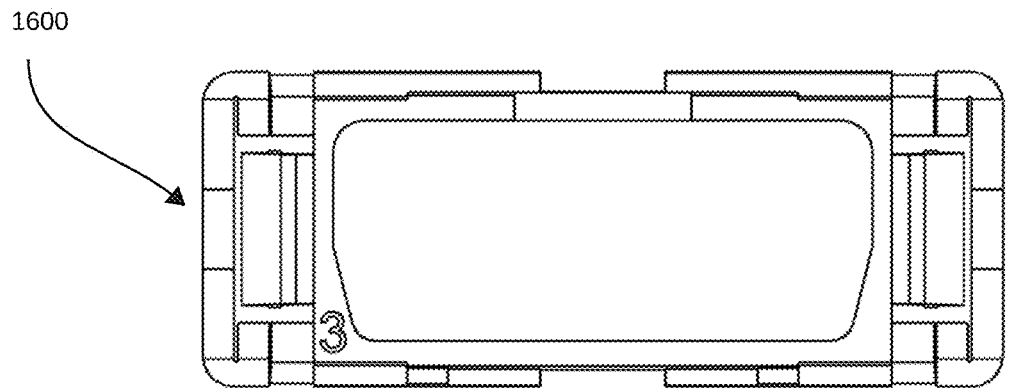
FIG. 16G is a front elevation view of the adapter of FIG. 16A.
Figure 16H:
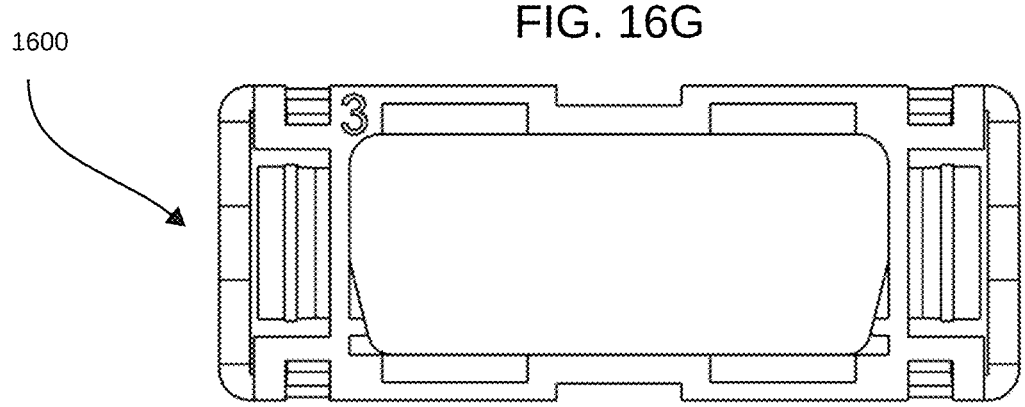
FIG. 16H is a rear elevation view of the adapter of FIG. 16A.
Figure 16I:
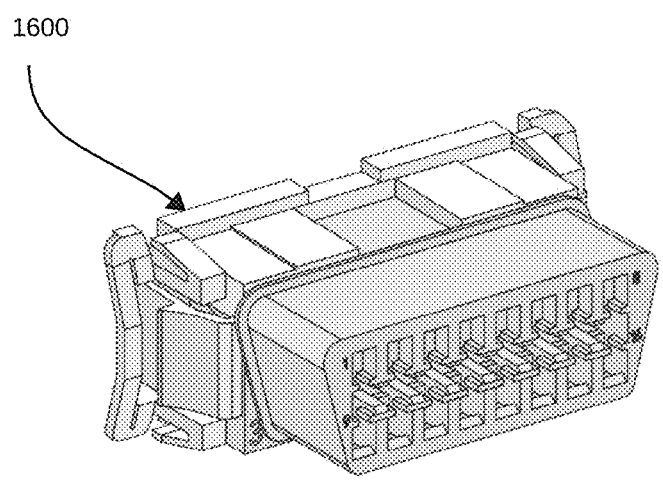
FIG. 16I is a top front left perspective view of the adapter of FIGS. 16A-16H coupled to the auxiliary OBD connector of FIGS. 12A-12H.

FIGS. 16A-16H depict a snap-in mount adapter 1600 for Chrysler™ vehicles. FIG. 16I depicts the snap-in mount adapter 1600 coupled to the auxiliary OBD harness connector 1050.

Figure 17A:
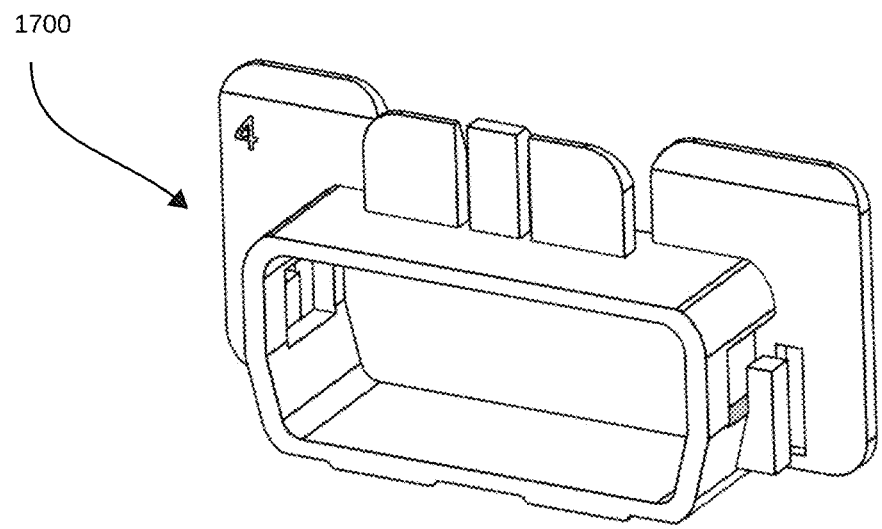
FIG. 17A is a top, front, right side perspective view of a North American slide and lock mount adapter, typically used by Ford™ and GM vehicles, for coupling to the auxiliary OBD connector of FIGS. 12A-12H.
Figure 17B:
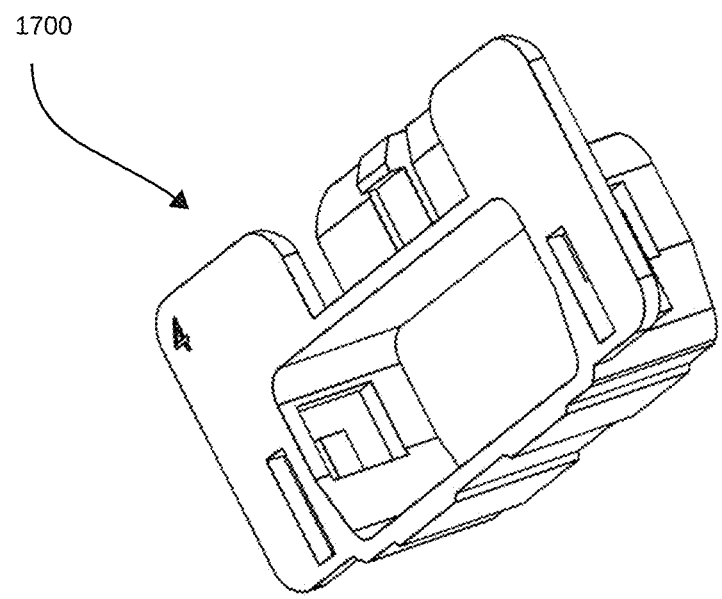
FIG. 17B is a bottom, rear, left perspective view of the adapter of FIG. 17A.
Figure 17G:
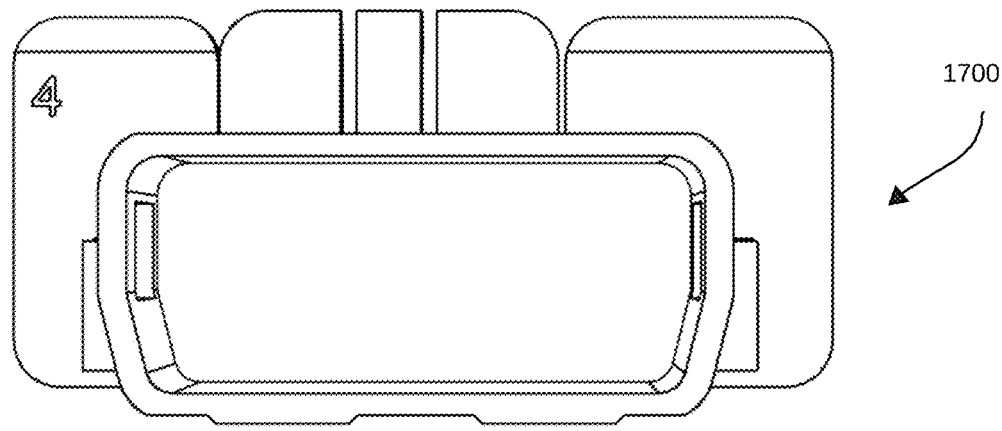
FIG. 17G is a front elevation view of the adapter of FIG. 17A.
Figure 17H:
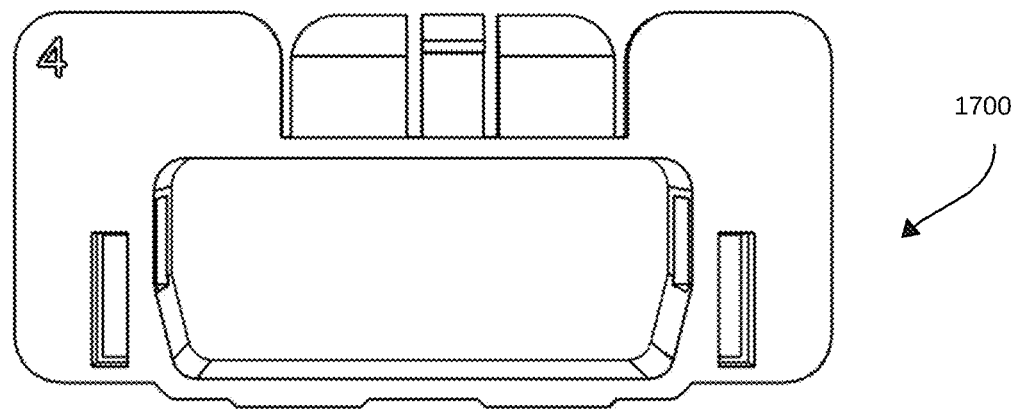
FIG. 17H is a rear elevation view of the adapter of FIG. 17A.
Figure 17I:
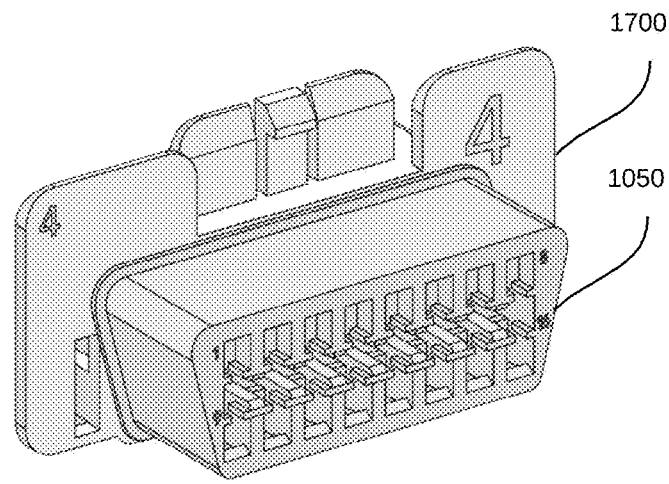
FIG. 17I is a top front left perspective view of the adapter of FIGS. 17A-17H coupled to the auxiliary OBD connector of FIGS. 12A-12H.

FIGS. 17A-17H depict a slide and lock mount adapter 1700 for Ford™ and GM™ vehicles. FIG. 17I depicts the slide and lock mount adapter 1700 coupled to the auxiliary OBD harness connector 1050.

Figure 18A:
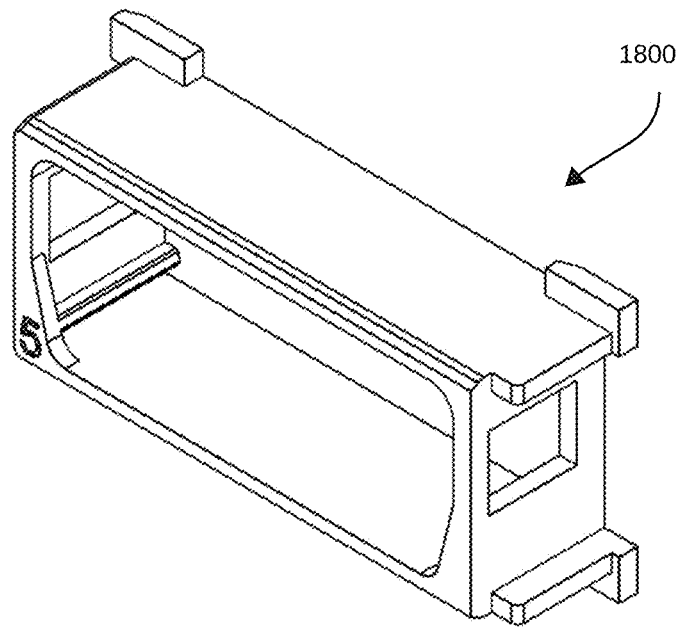
FIG. 18A is a top, front, right side perspective view of a European lock mount adapter, typically used by Mercedes™, BMW™, and Iveco™ vehicles, for coupling to the auxiliary OBD connector of FIGS. 12A-12H.
Figure 18B:
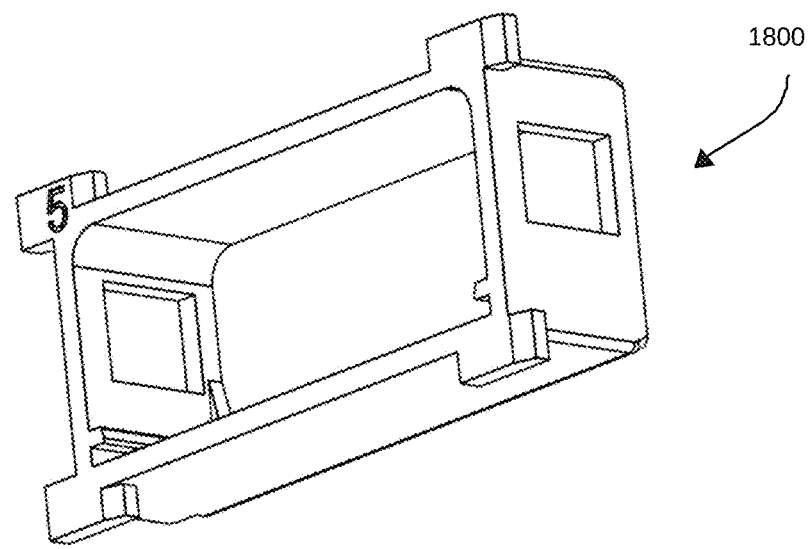
FIG. 18B is a bottom, rear, left perspective view of the adapter of FIG. 18A.
Figure 18D:
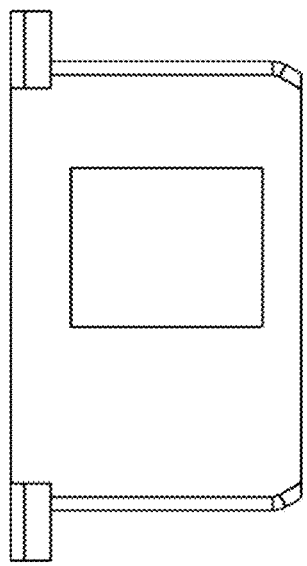
FIG. 18D is a left side elevation view of the adapter of FIG. 18A.
Figure 18C:
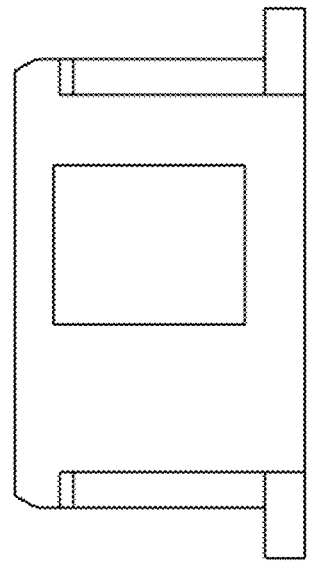
FIG. 18C is a right side elevation view of the adapter of FIG. 18A.
Figure 18E:
FIG. 18E is a top plan view of the adapter of FIG. 18A.
Figure 18F:
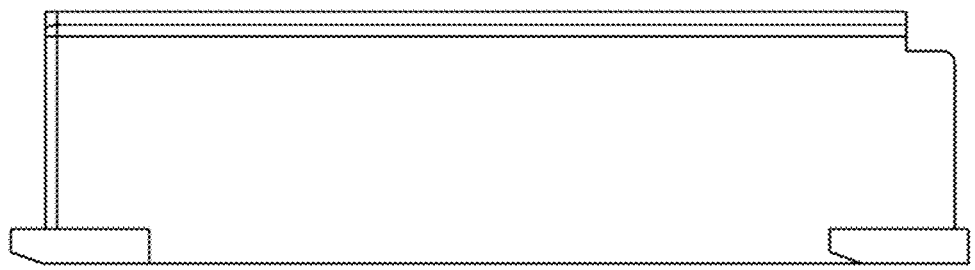
FIG. 18F is a bottom plan view of the adapter of FIG. 18A.
Figure 18G:
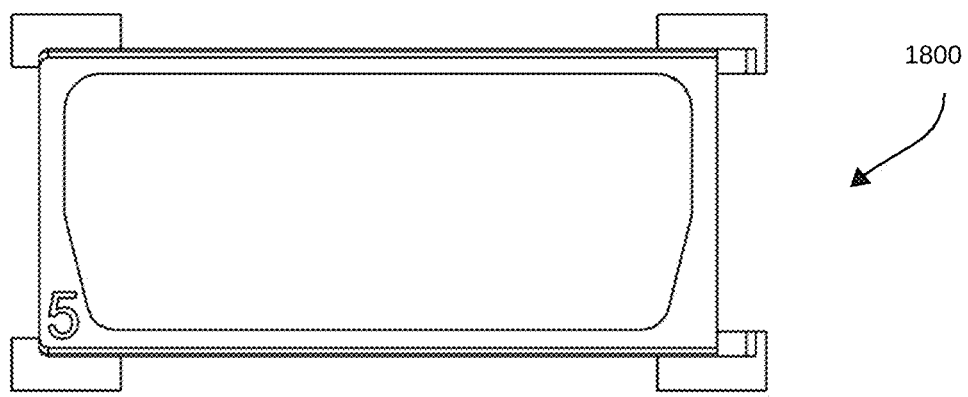
FIG. 18G is a front elevation view of the adapter of FIG. 18A.
Figure 18H:
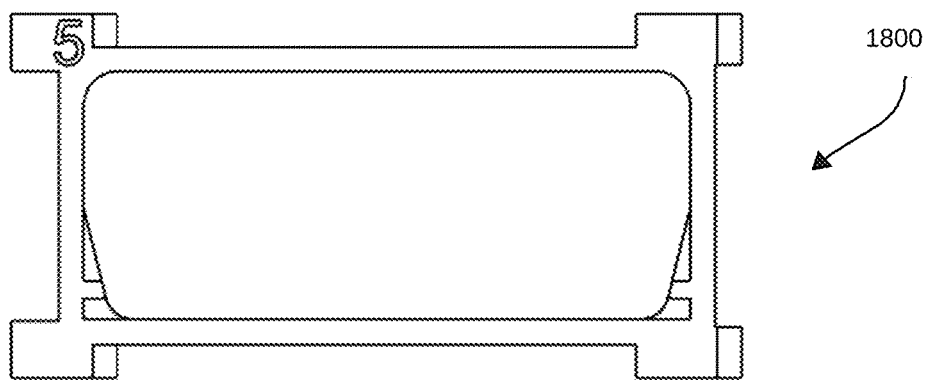
FIG. 18H is a rear elevation view of the adapter of FIG. 18A.
Figure 18I:
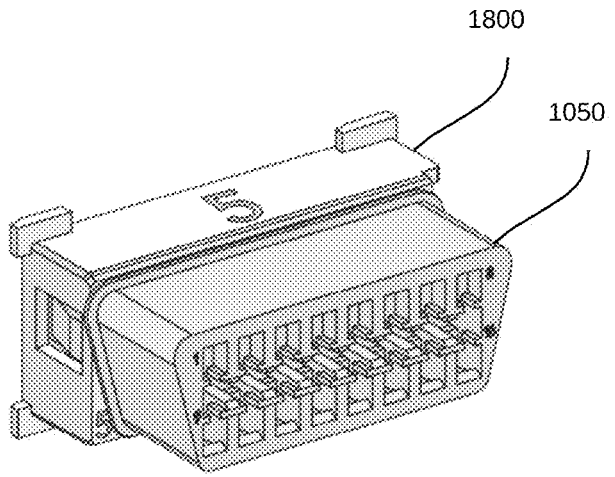
FIG. 18I is a top front left perspective view of the adapter of FIGS. 18A-18H coupled to the auxiliary OBD connector of FIGS. 12A-12H.

FIGS. 18A-18H depict a lock mount adapter 1800 for some European vehicles. FIG. 18I depicts the lock mount adapter 1800 coupled to the auxiliary OBD harness connector 1050.

Figure 19A:
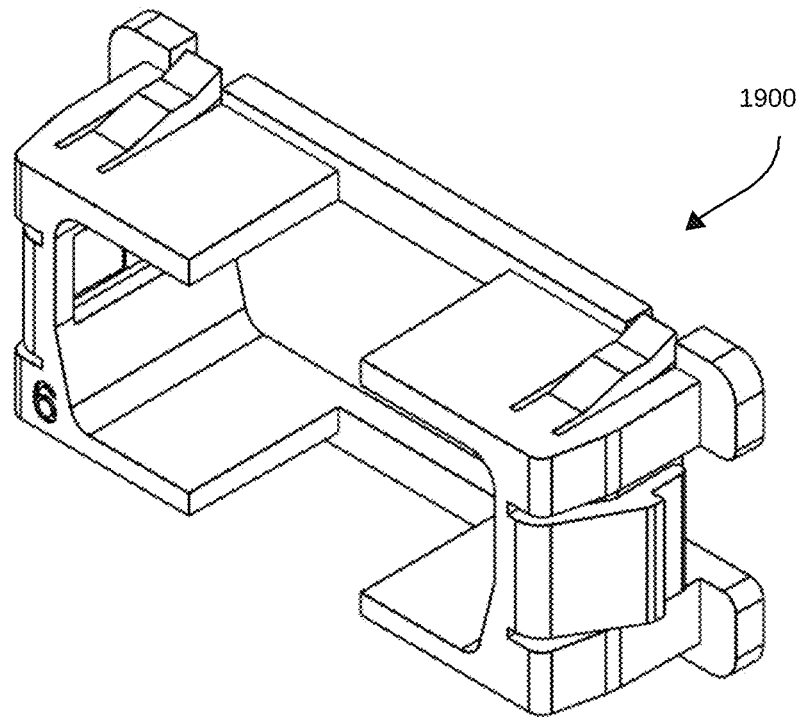
FIG. 19A is a top, front, right side perspective view of an Asian snap-in adapter, typically used by Toyota™, Hyundai™, Kia™, Ford™, and Iveco™ vehicles, for coupling to the auxiliary OBD connector of FIGS. 12A-12H.
Figure 19B:
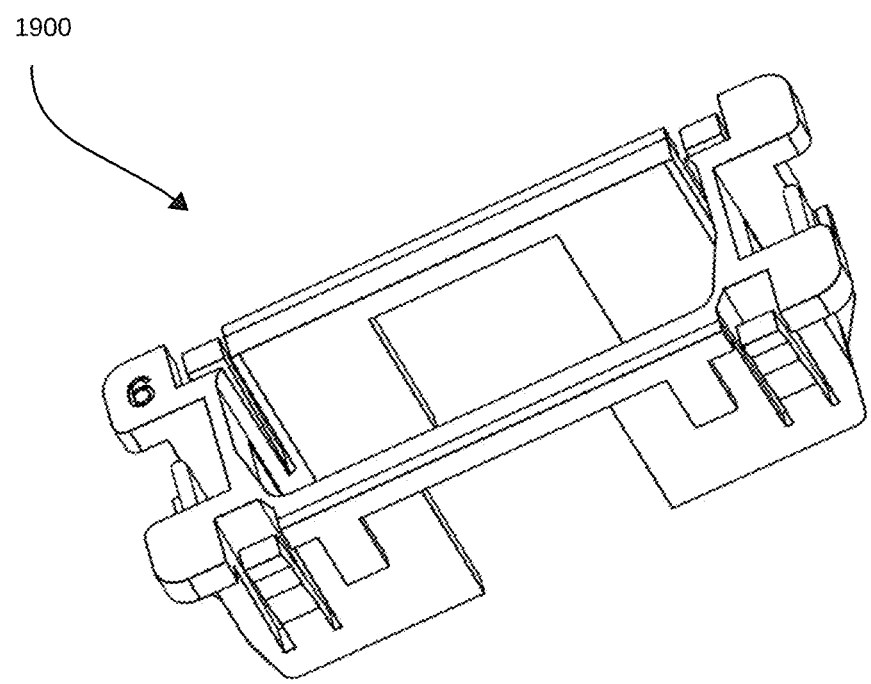
FIG. 19B is a bottom, rear, left perspective view of the adapter of FIG. 19A.
Figure 19D:
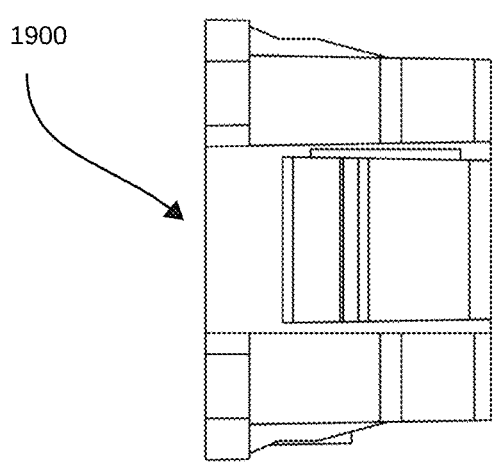
FIG. 19D is a left side elevation view of the adapter of FIG. 19A.
Figure 19C:
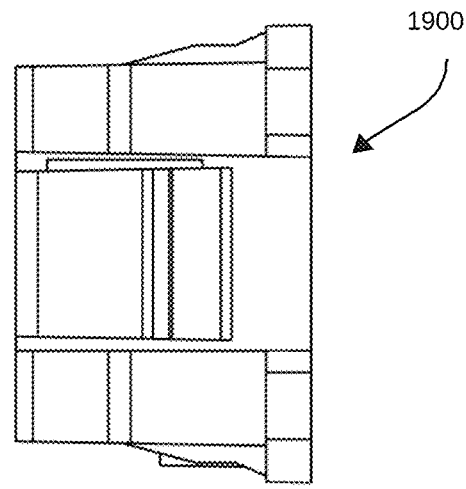
FIG. 19C is a right side elevation view of the adapter of FIG. 19A.
Figure 19E:
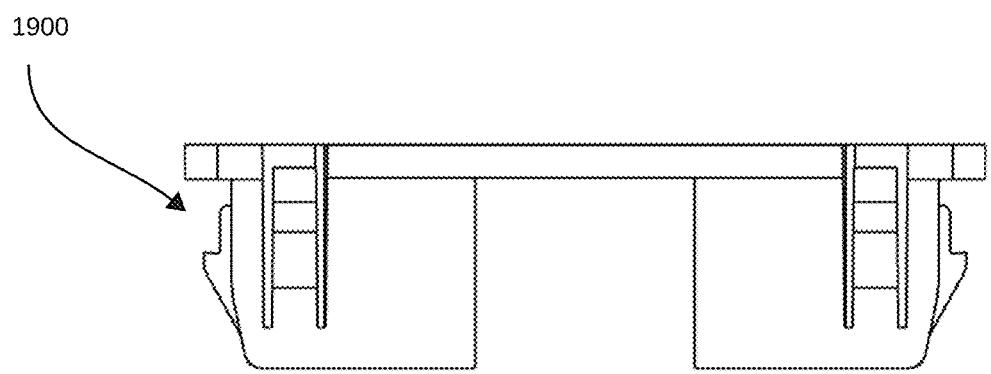
FIG. 19E is a top plan view of the adapter of FIG. 19A.
Figure 19F:
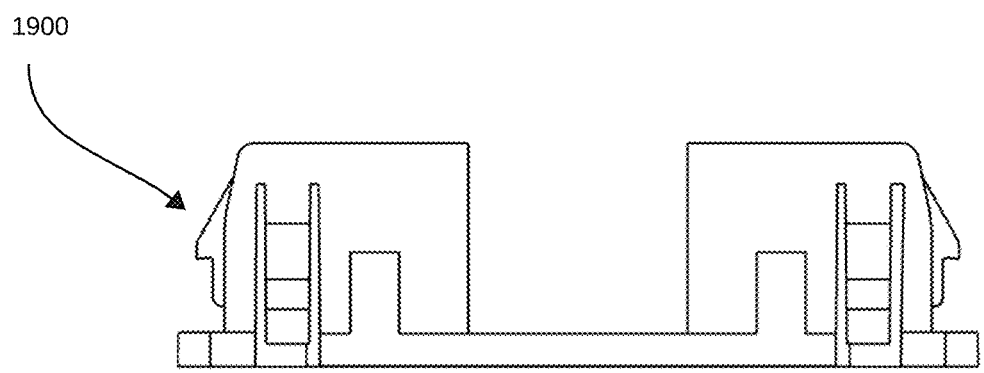
FIG. 19F is a bottom plan view of the adapter of FIG. 19A.
Figure 19G:
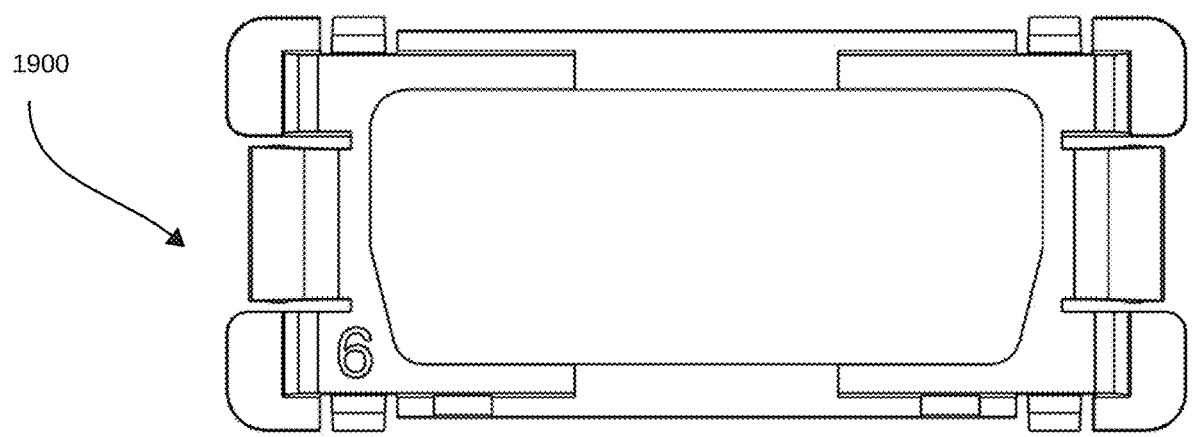
FIG. 19G is a front elevation view of the adapter of FIG. 19A.
Figure 19H:
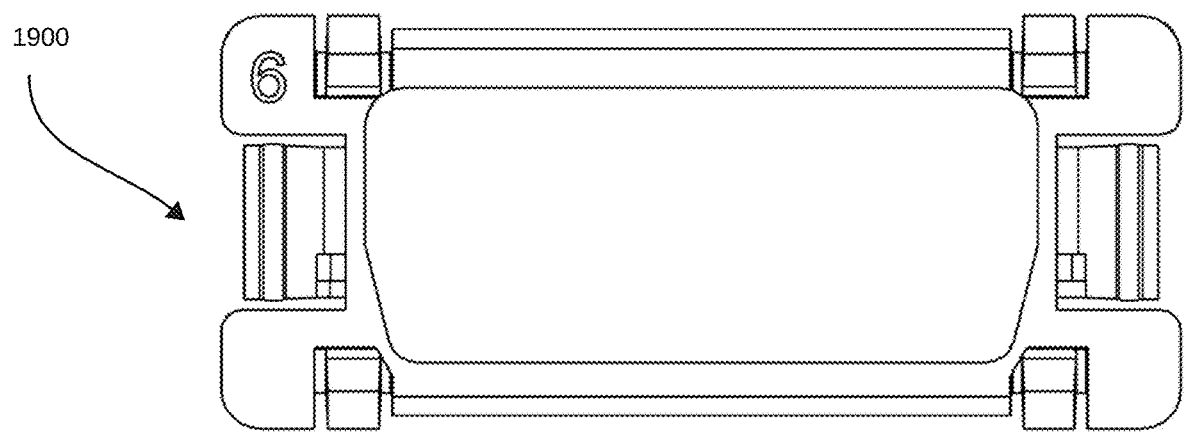
FIG. 19H is a rear elevation view of the adapter of FIG. 19A.
Figure 19I:
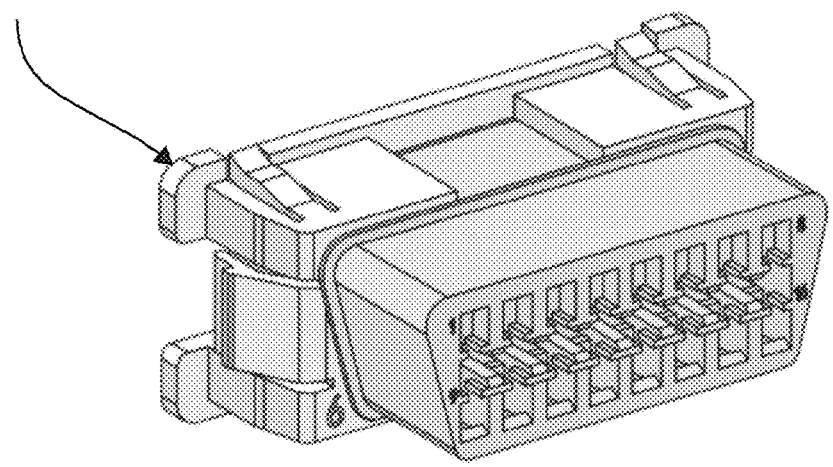
FIG. 19I is a top front left perspective view of the adapter of FIGS. 19A-19H coupled to the auxiliary OBD connector of FIGS. 12A-12H.

FIGS. 19A-19H depict a snap-in adapter 1900. FIG. 19I depicts the snap-in adapter 1900 coupled to the auxiliary OBD harness connector 1050.

Figure 20A:
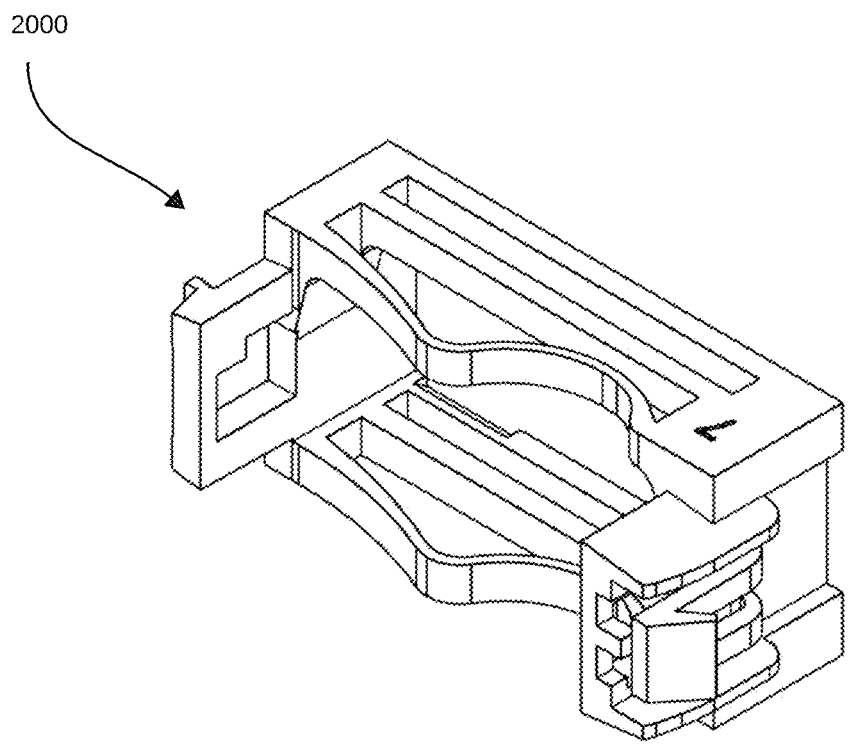
FIG. 20A is a top, front, right side perspective view of a first adapter portion of a European latch and snap adapter, typically used by Fiat™, Citröen™ and Peugeot™ vehicles, for coupling to the auxiliary OBD connector of FIGS. 12A-12H.
Figure 20B:
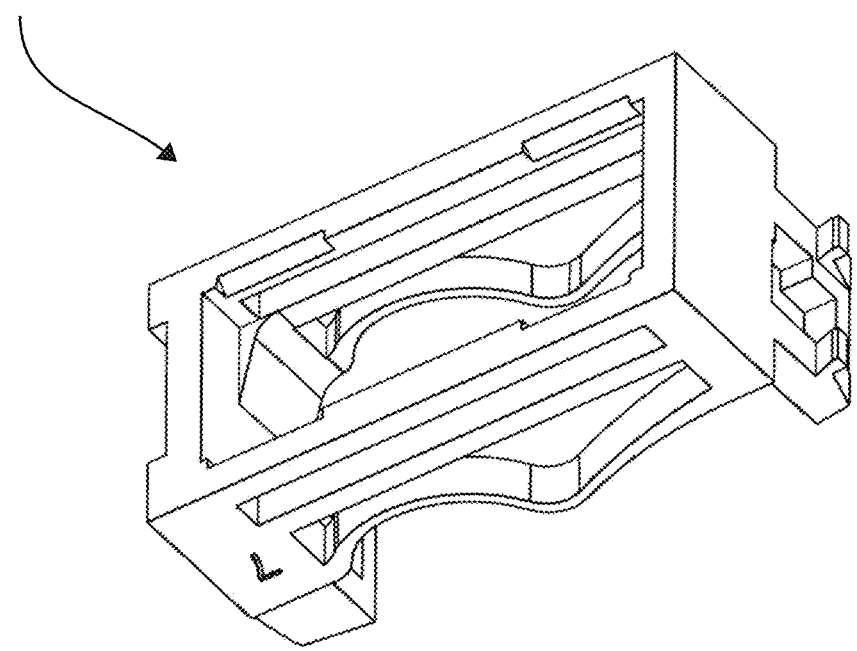
FIG. 20B is a bottom, rear, left perspective view of the first adapter portion of FIG. 20A.
Figure 20G:
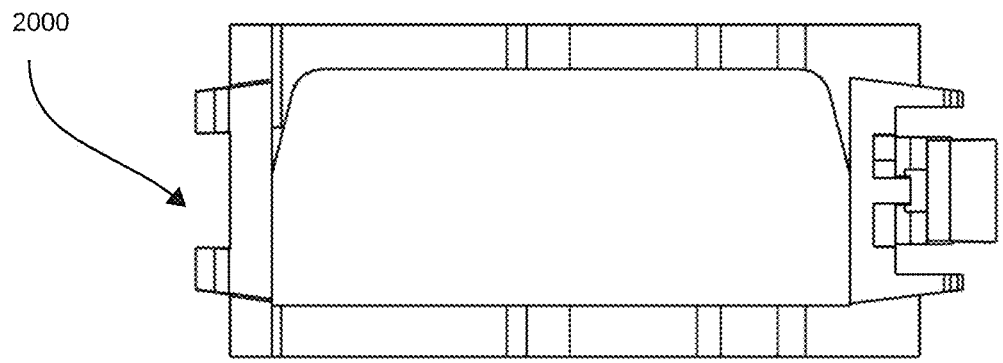
FIG. 20G is a front elevation view of the first adapter portion of FIG. 20A.
Figure 20H:
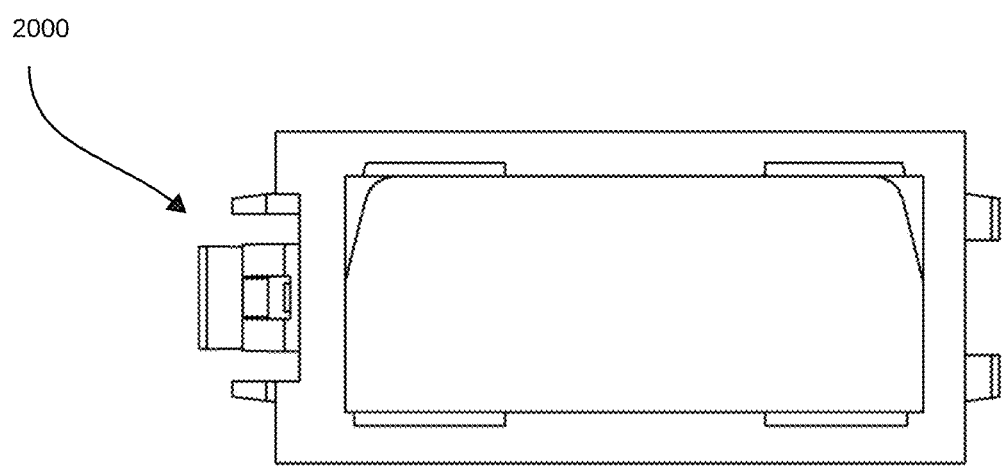
FIG. 20H is a rear elevation view of the first adapter portion of FIG. 20A.
Figure 20I:
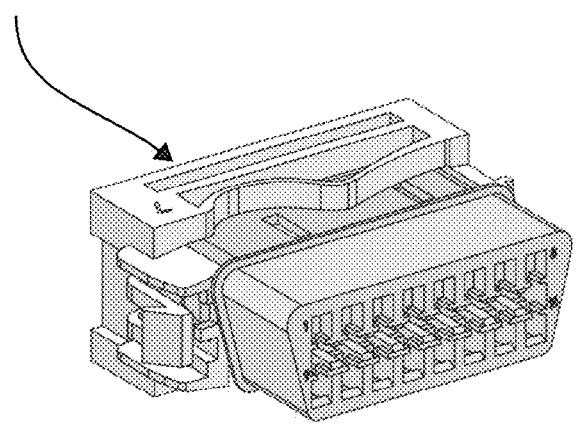
FIG. 20I is a top front left perspective view of the first adapter portion of FIGS. 20A-20H coupled to the auxiliary OBD connector of FIGS. 12A-12H.
Figure 21A:
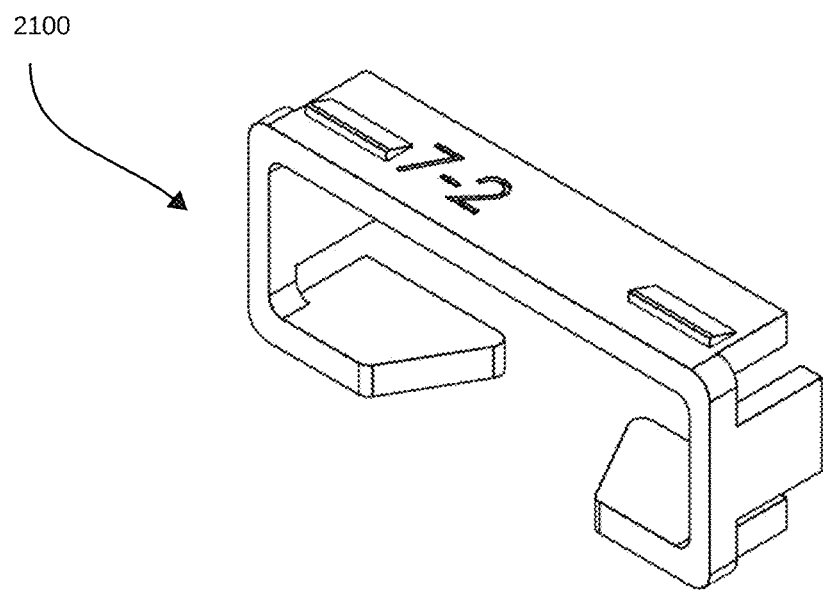
FIG. 21A is a top, front, right side perspective view of a second adapter portion of an adapter, typically used by Fiat™, Citröen™, and Peugeot™ vehicles, for coupling to the auxiliary OBD connector of FIGS. 12A-12H
Figure 21B:
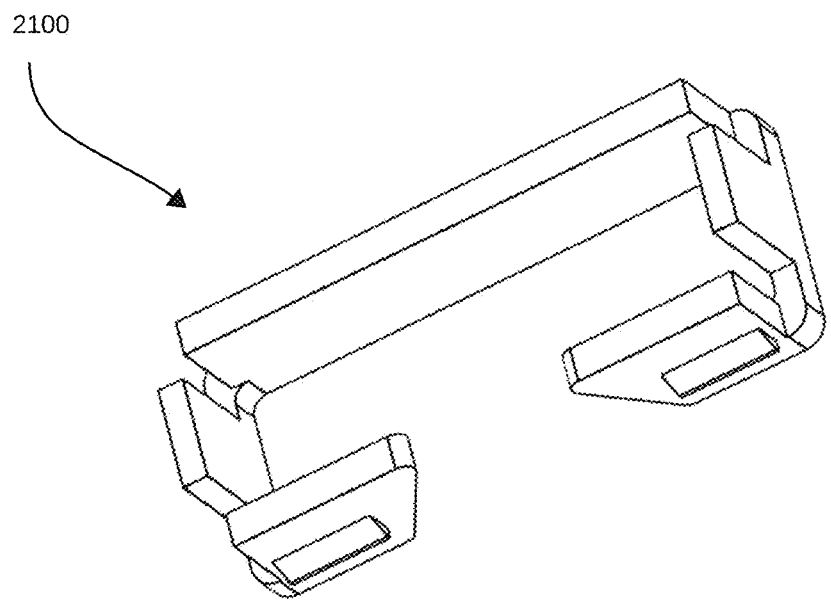
FIG. 21B is a bottom, rear, left perspective view of the second adapter portion of FIG. 21A.
Figure 21D:
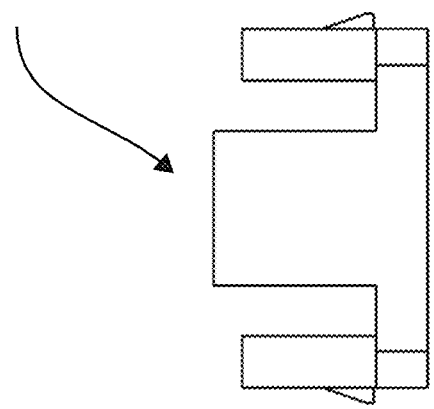
FIG. 21D is a left side elevation view of the second adapter portion of FIG. 21A.
Figure 21C:
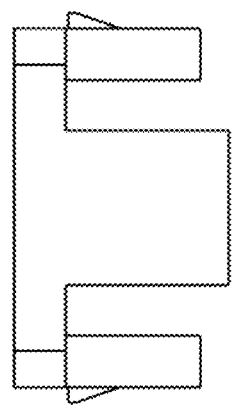
FIG. 21C is a right side elevation view of the second adapter portion of FIG. 21A.
Figure 21E:
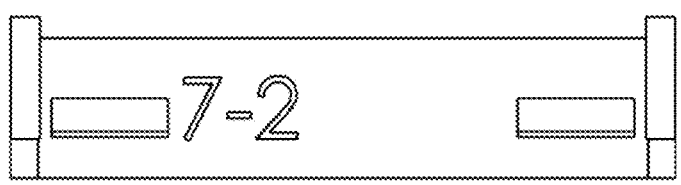
FIG. 21E is a top plan view of the second adapter portion of FIG. 21A.
Figure 21F:
FIG. 21F is a bottom plan view of the second adapter portion of FIG. 21A.
Figure 21G:
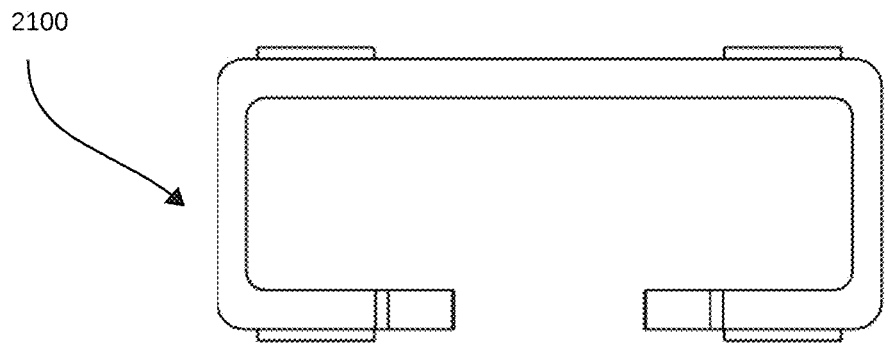
FIG. 21G is a front elevation view of the second adapter portion of FIG. 21A.
Figure 21H:
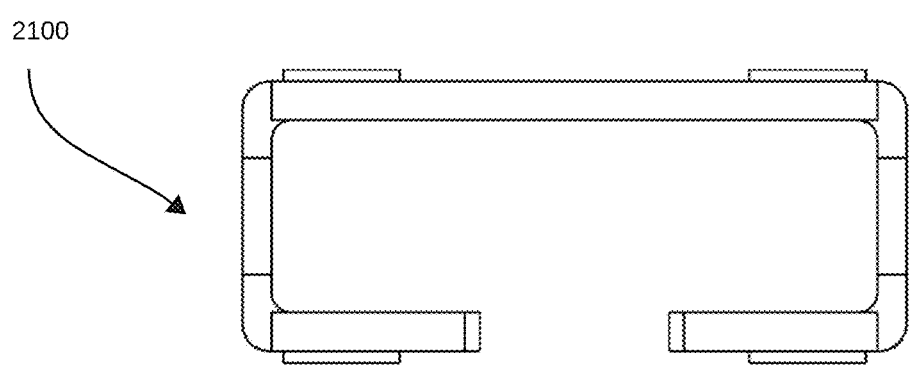
FIG. 21H is a rear elevation view of the second adapter portion of FIG. 21A.

FIGS. 20A-20H depict a first adapter portion 2000 of a latch and snap adapter, typically used by Fiat™, Citröen™, and Peugeot™ vehicles, for coupling to the auxiliary OBD connector of FIGS. 12A-12H. FIG. 20I depicts the first adapter portion of the latch and snap adapter coupled with the auxiliary OBD harness connector 1050.

FIGS. 21A-21H depict a second adapter portion 2100 of a latch and snap adapter typically used by Fiat™, Citröen™, and Peugeot™ vehicles.

Figure 22A:
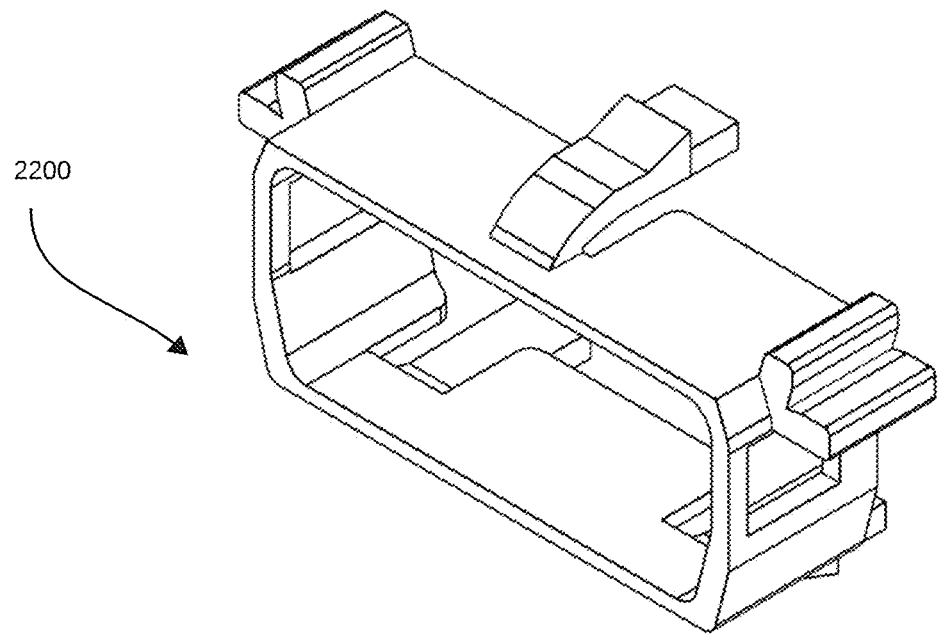
FIG. 22A is a top, front, right side perspective view of a snap-in adapter, typically used by Volkswagen™ and Audi™ vehicles, for coupling to the auxiliary OBD connector of FIGS. 12A-12H.
Figure 22B:
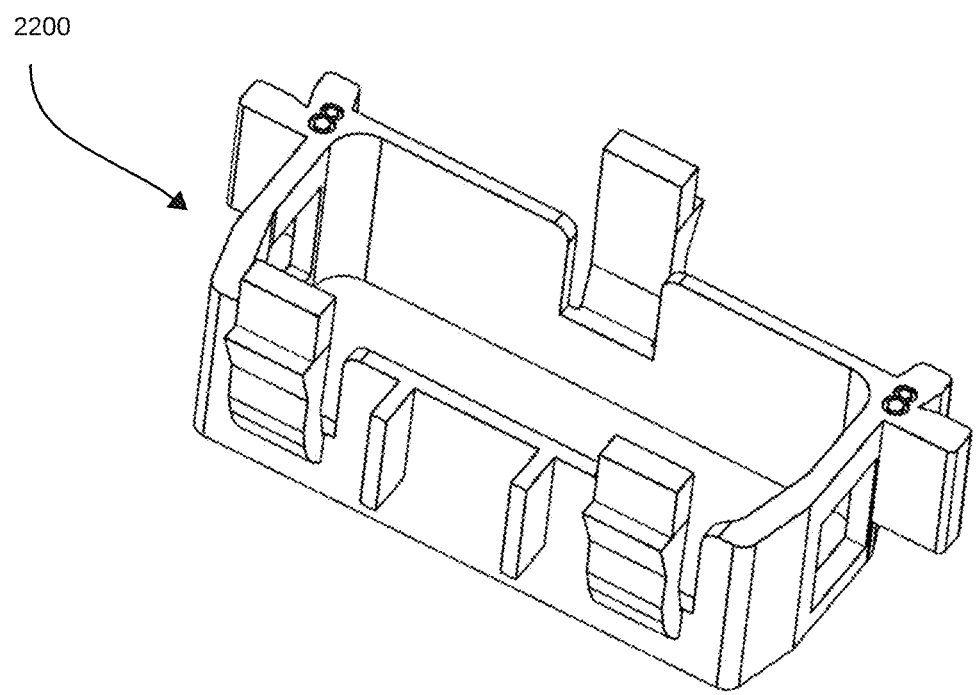
FIG. 22B is a bottom, rear, left perspective view of the adapter of FIG. 22A.
Figure 22D:
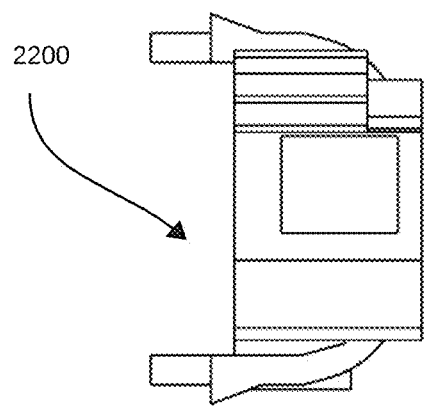
FIG. 22D is a left side elevation view of the adapter of FIG. 22A.
Figure 22C:
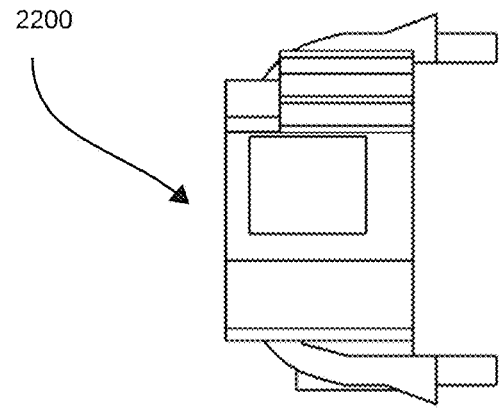
FIG. 22C is a right side elevation view of the adapter of FIG. 22A.
Figure 22E:
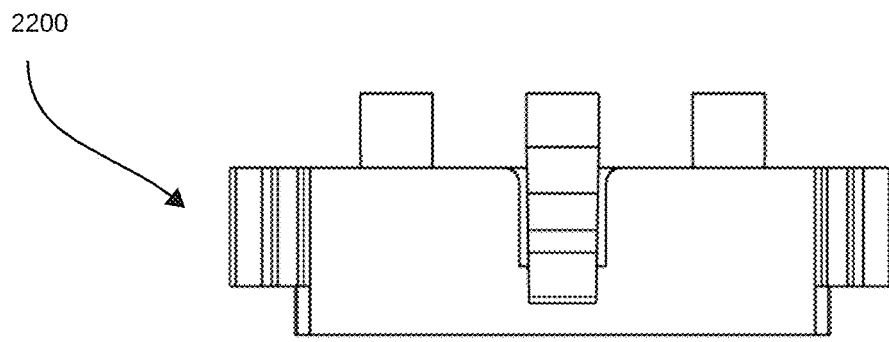
FIG. 22E is a top plan view of the adapter of FIG. 22A.
Figure 22F:
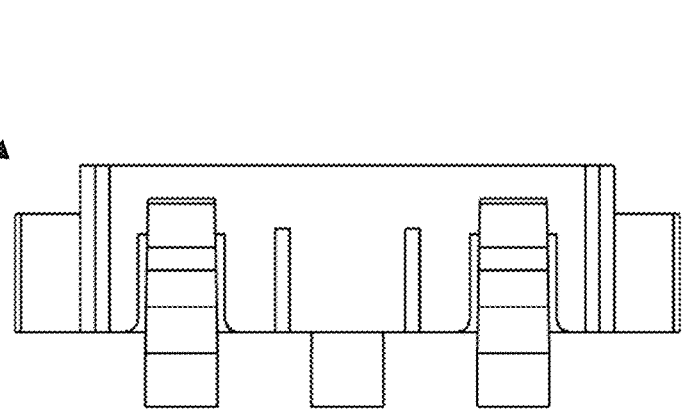
FIG. 22F is a bottom plan view of the adapter of FIG. 22A.
Figure 22G:
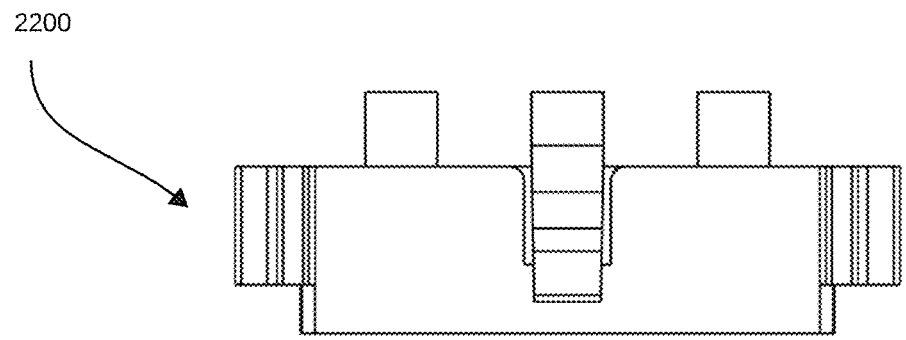
FIG. 22G is a front elevation view of the adapter of FIG. 22A.
Figure 22H:
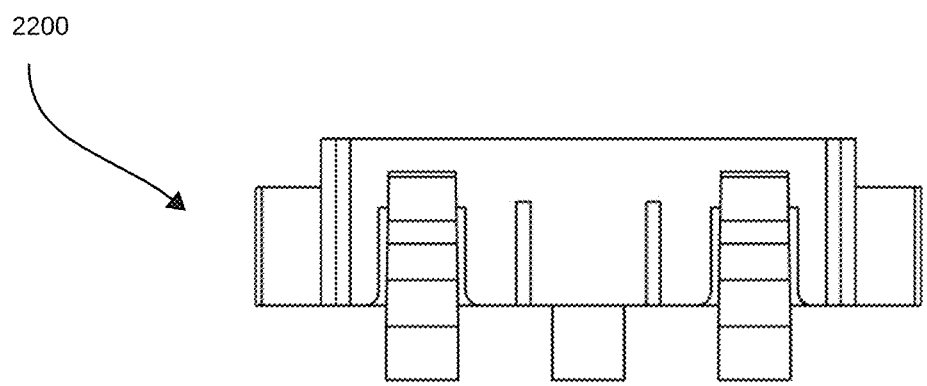
FIG. 22H is a rear elevation view of the adapter of FIG. 22A.
Figure 22I:
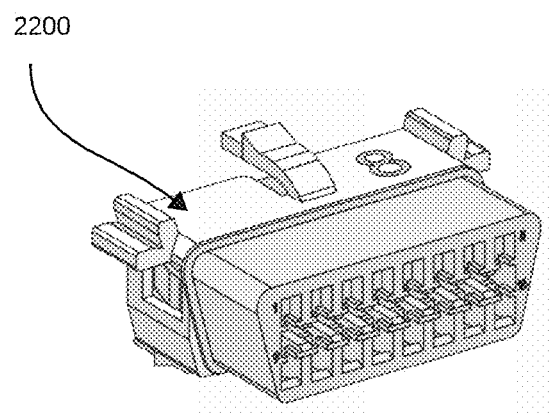
FIG. 22I is a top front left perspective view of the adapter of FIGS. 22A-22H coupled to the auxiliary OBD connector of FIGS. 12A-12H.

FIGS. 22A-22H depict a snap-in adapter 2200, typically used by Volkswagen™ and Audi™ vehicles. FIG. 22I depicts the snap-in adapter 2200 coupled to the auxiliary OBD harness connector 1050.

Figure 23A:
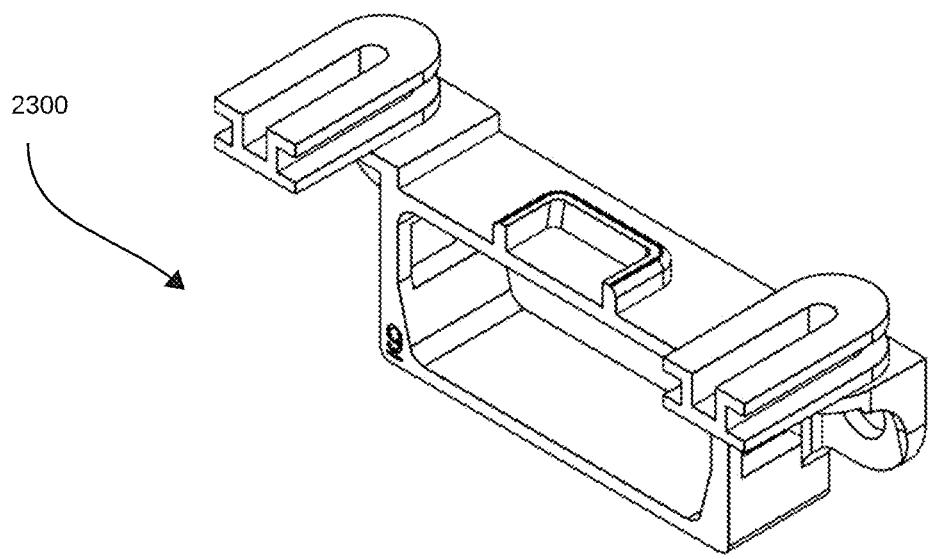
FIG. 23A is a top, front, right side perspective view of a slide and lock adapter, typically used by BMW™ vehicles, for coupling to the auxiliary OBD connector of FIGS. 12A-12H.
Figure 23B:
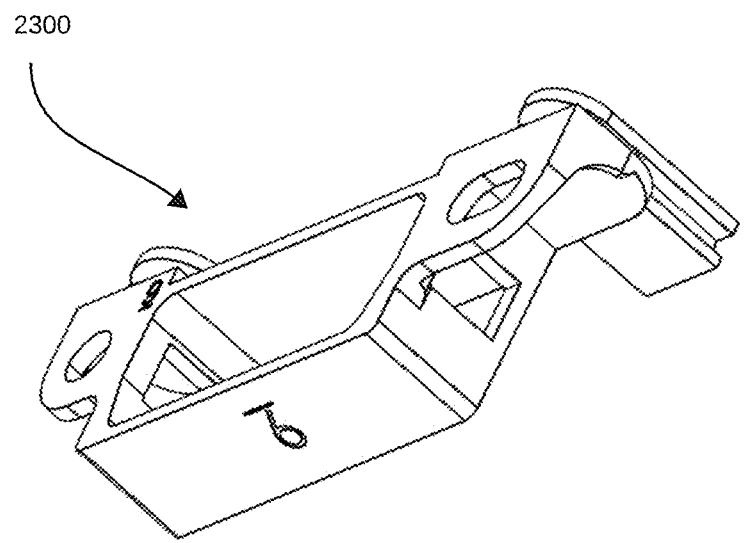
FIG. 23B is a bottom, rear, left perspective view of the adapter of FIG. 23A.
Figure 23D:
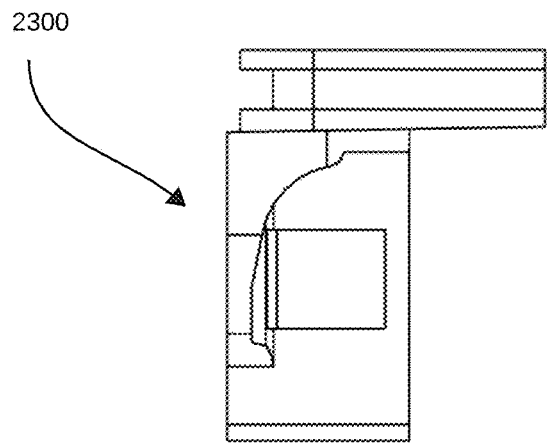
FIG. 23D is a left side elevation view of the adapter of FIG. 23A.
Figure 23C:
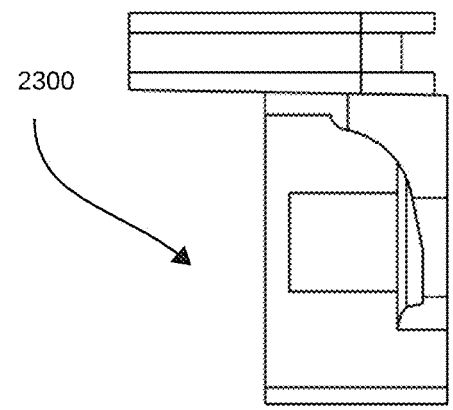
FIG. 23C is a right side elevation view of the adapter of FIG. 23A.
Figure 23E:
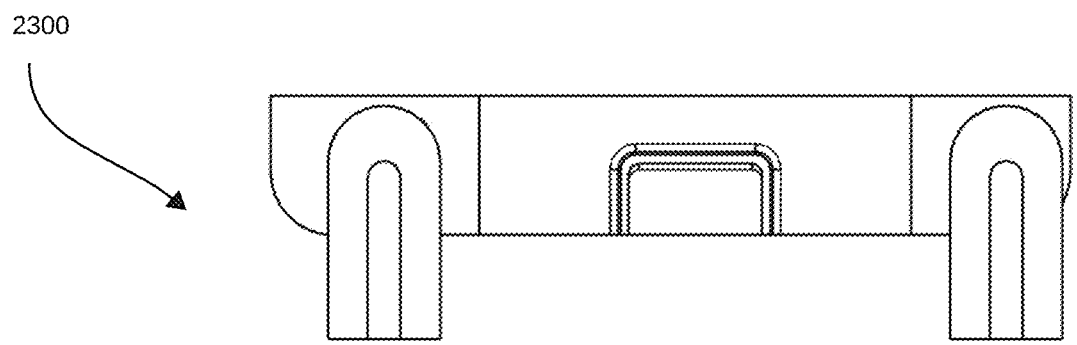
FIG. 23E is a top plan view of the adapter of FIG. 23A.
Figure 23F:
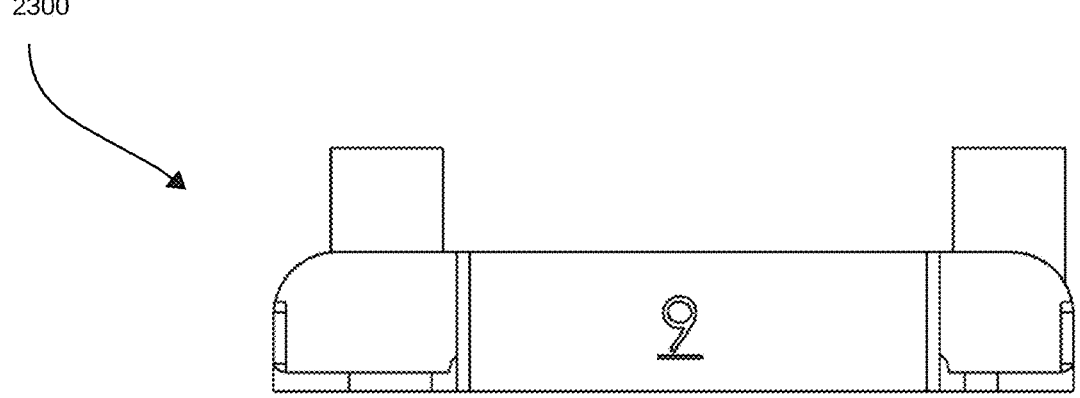
FIG. 23F is a bottom plan view of the adapter of FIG. 23A.
Figure 23G:
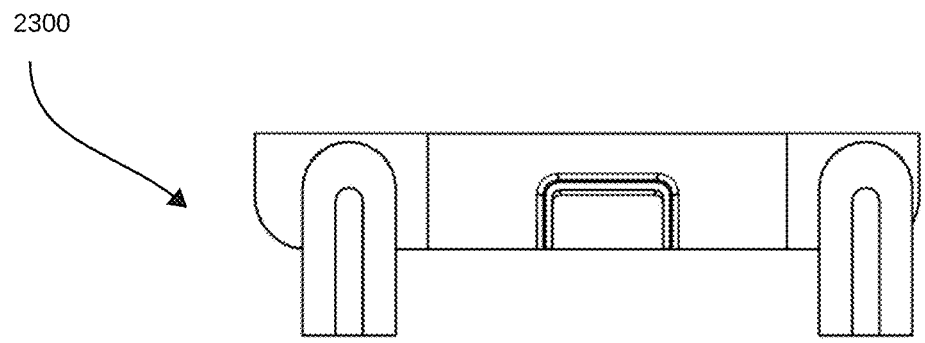
FIG. 23G is a front elevation view of the adapter of FIG. 23A.
Figure 23H:
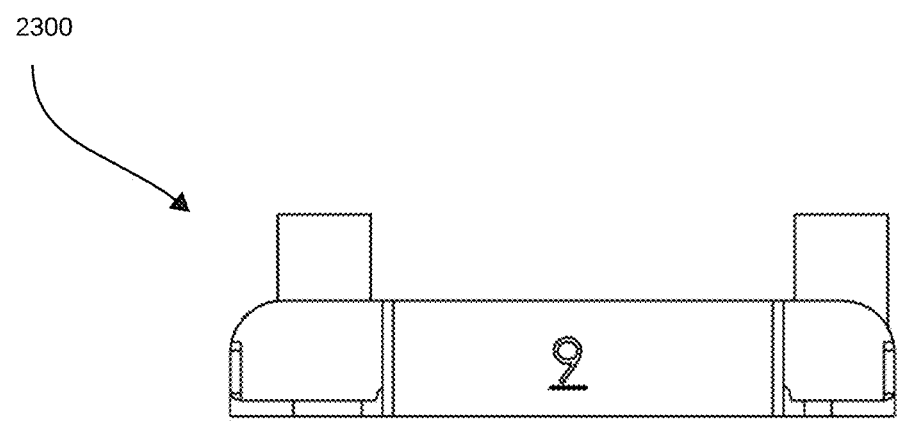
FIG. 23H is a rear elevation view of the adapter of FIG. 23A.
Figure 23I:
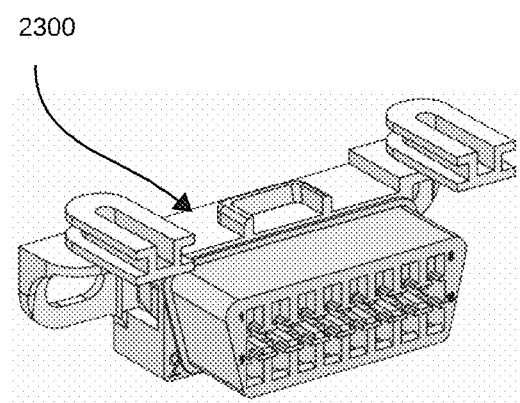
FIG. 23I is a top front left perspective view of the adapter of FIGS. 23A-23H coupled to the auxiliary OBD connector of FIGS. 12A-12H.

FIGS. 23A-23H depict a slide and lock adapter 2300, typically used by BMW™ vehicles. FIG. 23I depicts the slide and lock adapter 2300 coupled to the auxiliary OBD harness connector 1050.

Figure 24A:
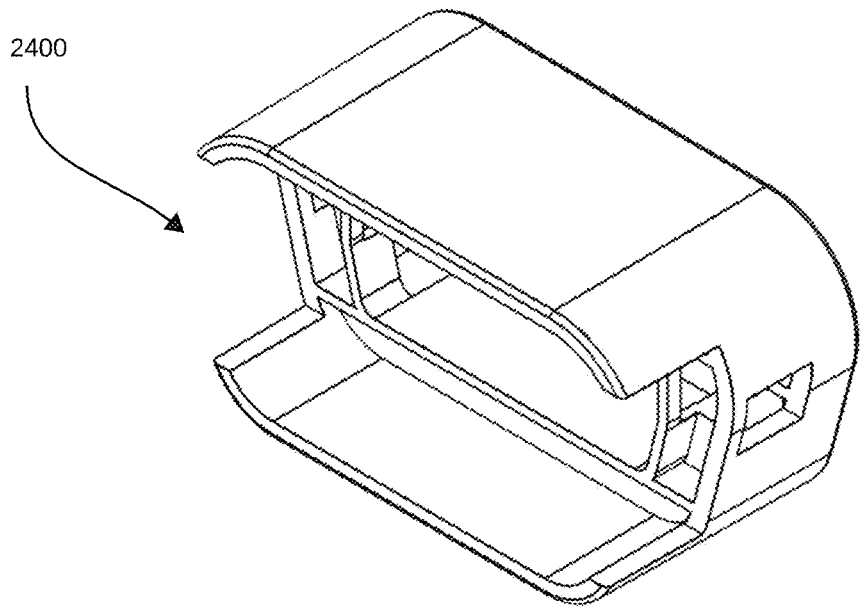
FIG. 24A is a top, front, right side perspective view of a round snap-in adapter, typically used by some Ford™ vehicles, for coupling to the auxiliary OBD connector of FIGS. 12A-12H.
Figure 24B:
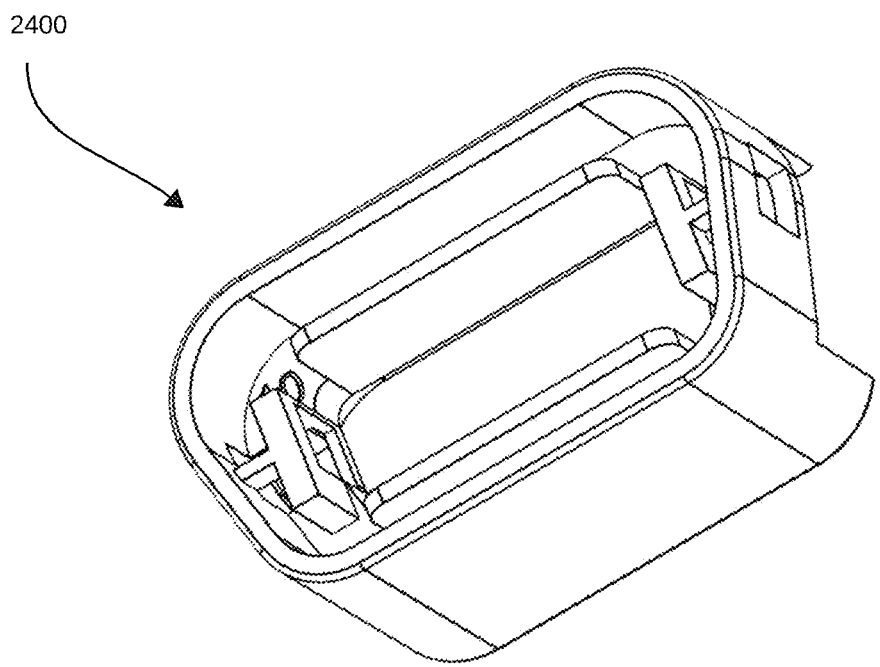
FIG. 24B is a bottom, rear, left perspective view of the adapter of FIG. 24A.
Figure 24D:
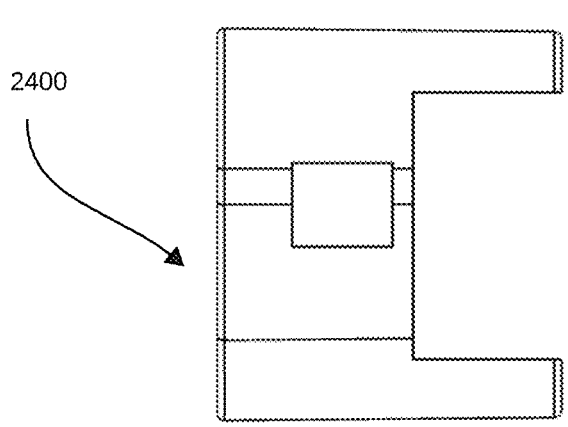
FIG. 24D is a left side elevation view of the adapter of FIG. 22A.
Figure 24C:
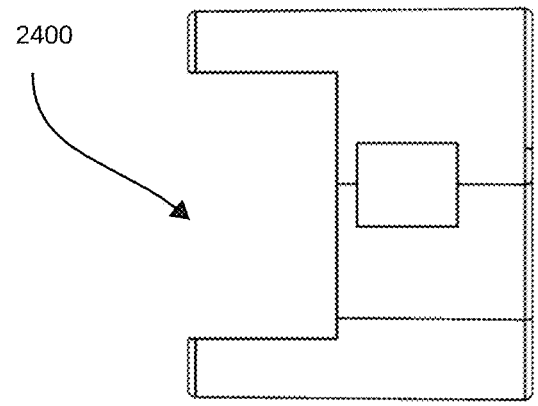
FIG. 24C is a right side elevation view of the adapter of FIG. 24A.
Figure 24E:
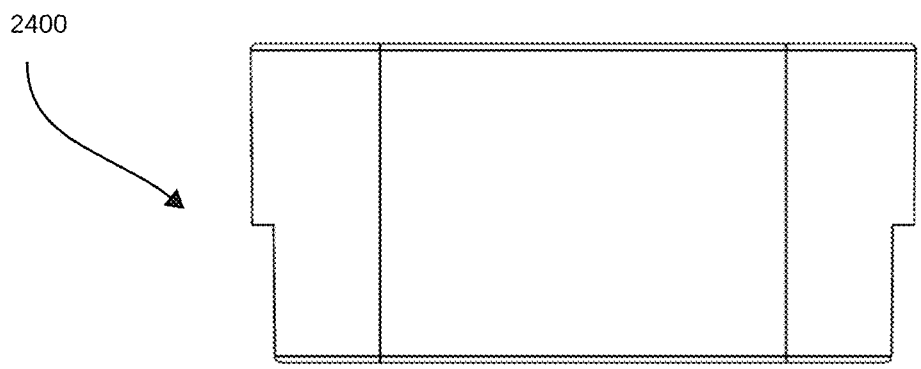
FIG. 24E is a top plan view of the adapter of FIG. 24A.
Figure 24F:
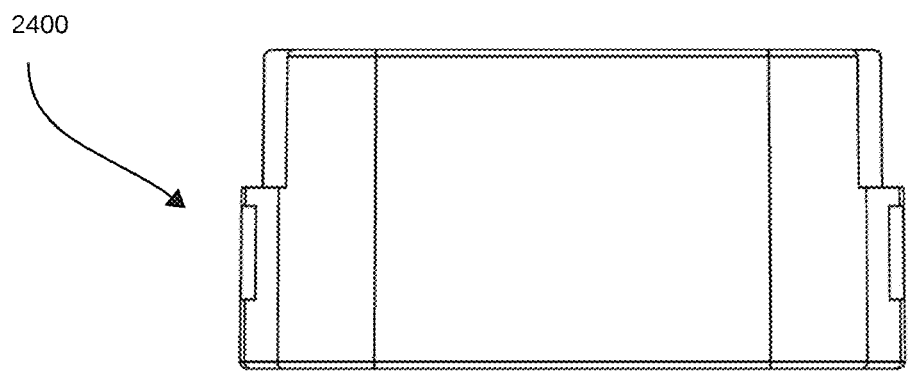
FIG. 24F is a bottom plan view of the adapter of FIG. 24A.
Figure 24G:
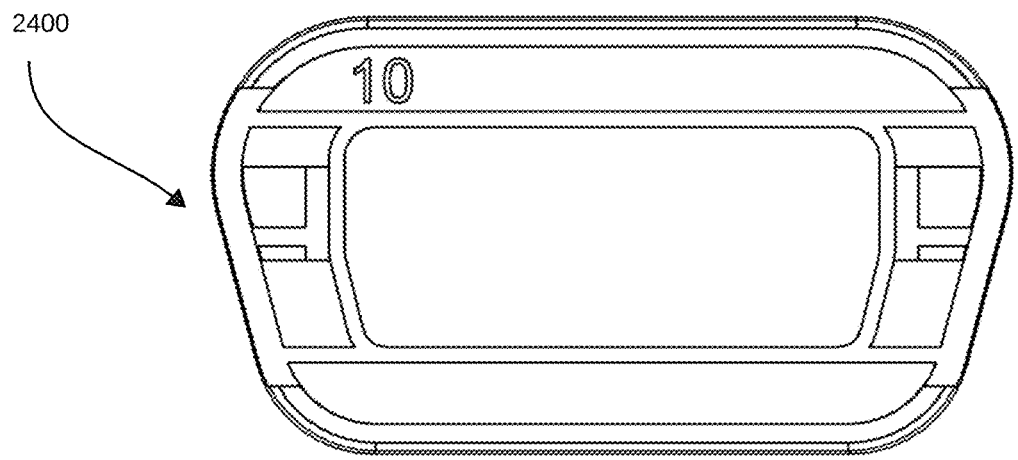
FIG. 24G is a front elevation view of the adapter of FIG. 24A.
Figure 24H:
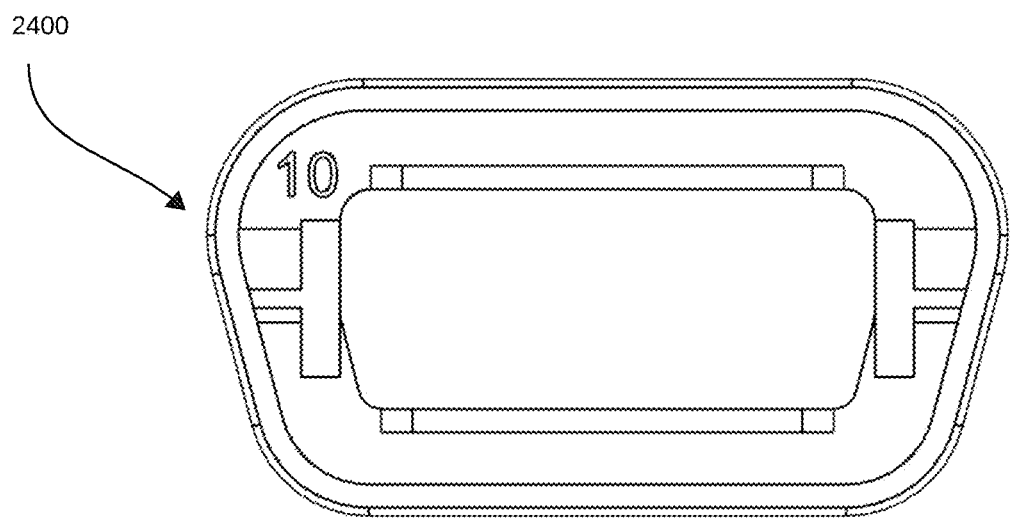
FIG. 24H is a rear elevation view of the adapter of FIG. 24A.
Figure 24I:
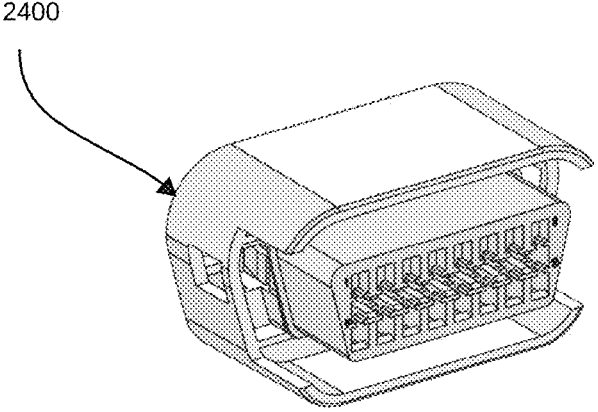
FIG. 24I is a top front left perspective view of the adapter of FIGS. 24A-24H coupled to the auxiliary OBD connector of FIGS. 12A-12H.

FIGS. 24A-24H depict a round snap-in adapter 2400, typically used by some Ford™ vehicles. FIG. 24I depicts the round snap-in adapter 2400 coupled to the auxiliary OBD harness connector 1050.

Figure 25A:
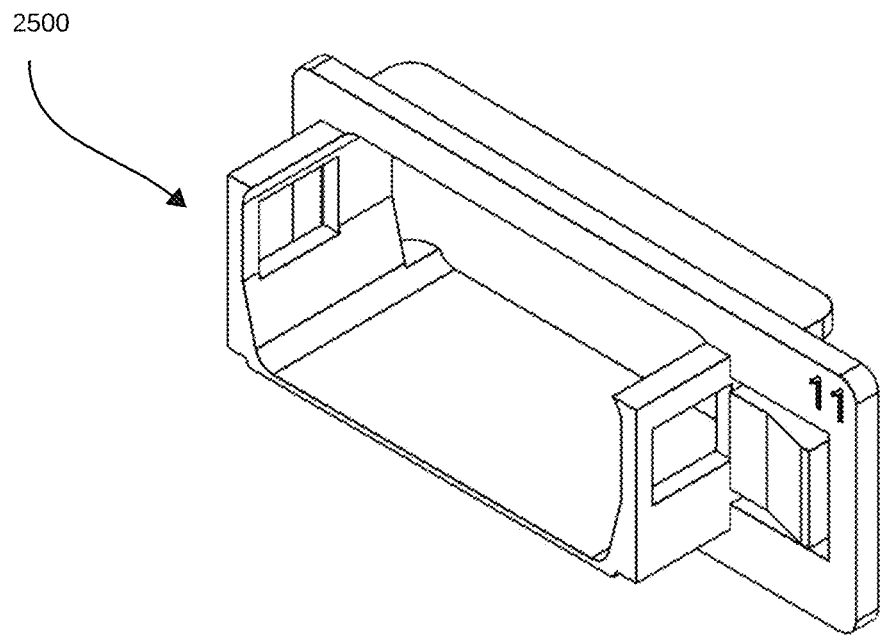
FIG. 25A is a top, front, right side perspective view of a slide and lock adapter, typically used by MAN™ and DAF™ vehicles, for coupling to the auxiliary OBD connector of FIGS. 12A-12H.
Figure 25B:
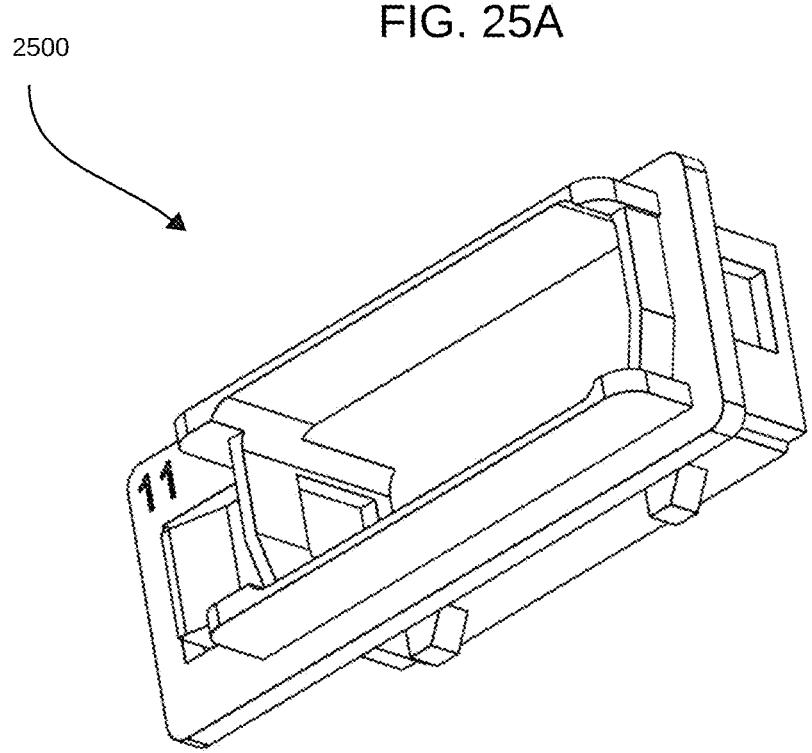
FIG. 25B is a bottom, rear, left perspective view of the adapter of FIG. 25A.
Figure 25D:
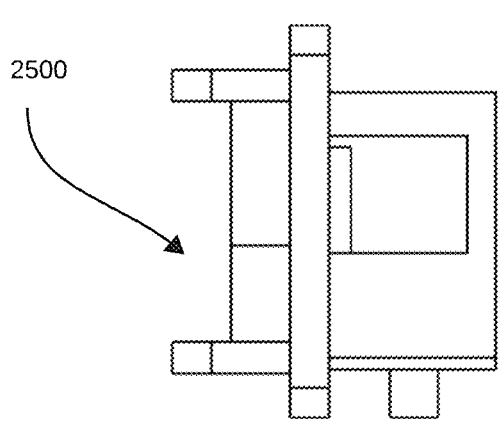
Figure 25C:
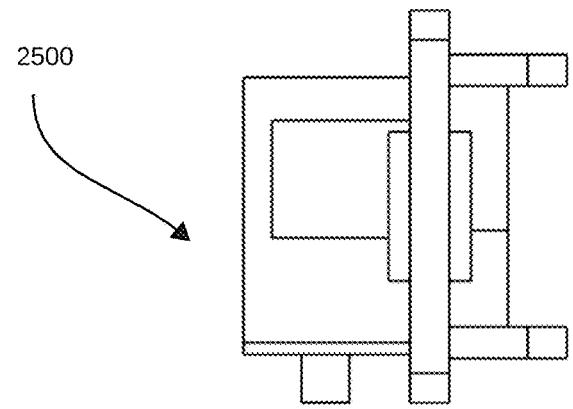
Figure 25E:
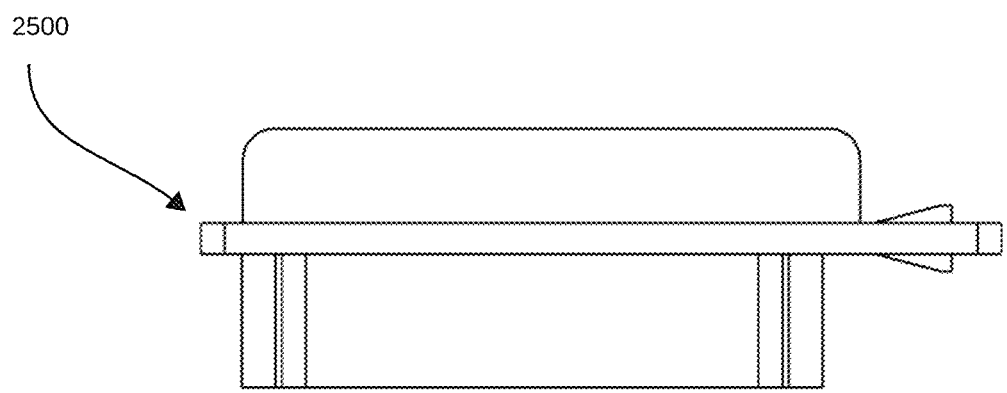
Figure 25F:
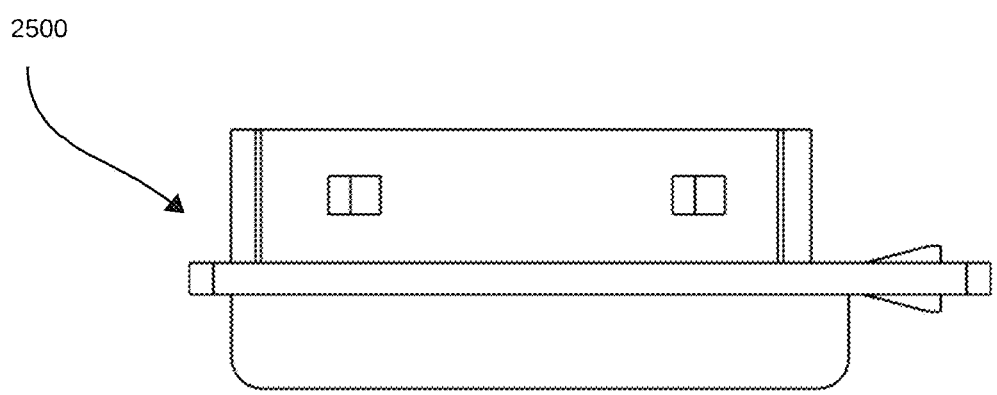
Figure 25G:
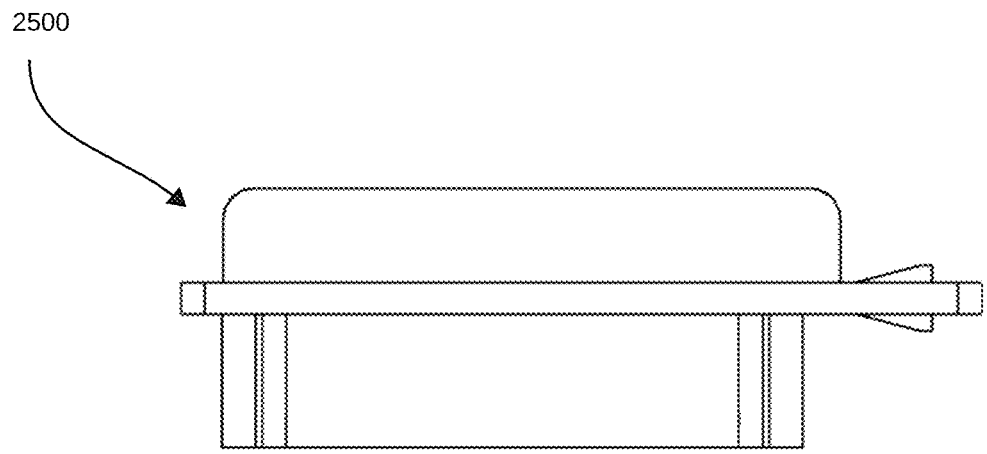
Figure 25H:
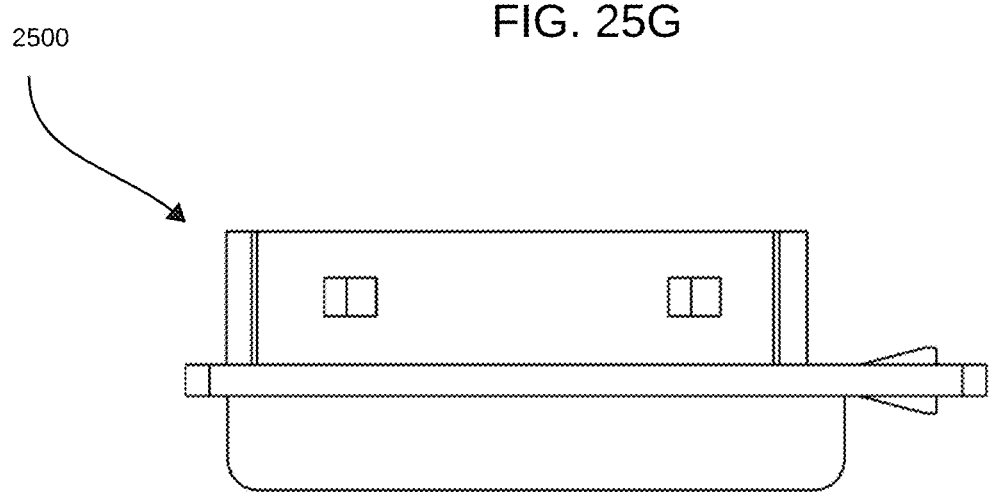
Figure 25I:
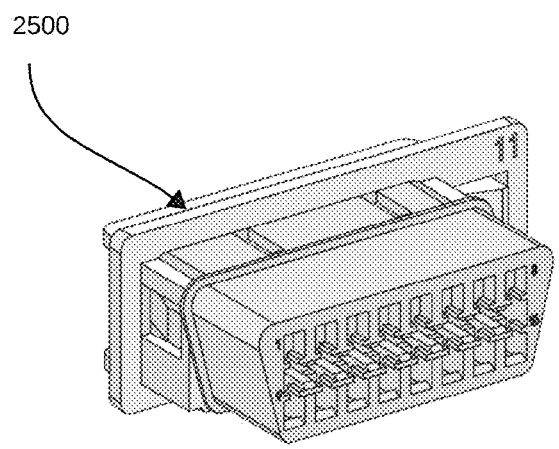

FIGS. 25A-25H depict a slide and lock adapter 2500, typically used by MAN™ and DAF™ vehicles. FIG. 25I depicts the slide and lock adapter 2500 coupled to the auxiliary OBD harness connector 1050.

FIGS. 26A-26H depict a slide mount adapter 2600, typically used by Volvo™ vehicles. FIG. 26I depicts the slide mount adapter 2600 coupled to the auxiliary OBD harness connector 1050.

FIGS. 27A-27H depict a slide mount adapter 2700, typically used by heavy duty Volvo™ vehicles. FIG. 27I depicts the slide mount adapter 2700 coupled to the auxiliary OBD harness connector 1050.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A T-harness for use in vehicles having an On-Board Diagnostic (OBD) port, the T-harness comprising:
    a main harness portion including:
        a vehicle OBD harness connector including a splitter;
        a telematics device harness connector;

a telematics device harness segment connecting the vehicle OBD connector to the telematics device harness connector;

a first multi-signal connector;

an auxiliary harness segment connecting the vehicle OBD connector to the first multi-signal connector;

a removable harness portion including:
  an auxiliary OBD harness connector;
  a second multi-signal connector configured for mating with the first multi-signal connector; and
  a multi-wire cable connecting the second multi-signal connector to the auxiliary OBD harness connector.

2. The T-harness of claim 1, wherein the first multi-signal connector comprises a multi-signal receptacle connector and the second multi-signal connector comprises a multi-signal plug connector.

3. The T-harness of claim 1, wherein the first multi-signal connector comprises a multi-signal plug connector and the second multi-signal connector comprises a multi-signal receptacle connector.

4. The T-harness of claim 1, wherein the auxiliary OBD harness connector comprises an auxiliary OBD harness connector front portion and an auxiliary OBD harness connector rear portion.

5. The T-harness of claim 4, wherein the auxiliary OBD harness connector front portion is trapezoidal in shape thus preventing connecting a device connector to the auxiliary OBD harness connector except in one correct orientation.

6. The T-harness of claim 4, wherein the auxiliary OBD harness connector rear portion has a smaller width than a width of the auxiliary OBD harness connector front portion thus permitting insertion of the auxiliary OBD harness connector rear portion in a vehicle mount aperture.

7. The T-harness of claim 1, wherein the splitter splits signals of the vehicle OBD harness connector into:
  a first plurality of signal lines routed to the telematics device harness connector via the telematics device harness segment; and
  a second plurality of signal lines routed to the first multi-signal connector via the auxiliary harness segment.

8. The T-harness of claim 1, further comprising:
  a third multi-signal connector connected to a first plurality of signal lines in the vehicle OBD harness connector; and
  a fourth multi-signal connector, suitable for mating with the third multi-signal connector, the second multi-signal connector connected to a second plurality of signal lines in the telematics device harness segment.

9. The T-harness of claim 8, wherein the first plurality of signal lines in the vehicle OBD harness connector correspond to networking signal lines.

10. The T-harness of claim 8, wherein the third multi-signal connector comprises a multi-signal plug connector and the fourth multi-signal connector comprises a multi-signal receptacle connector.

11. The T-harness of claim 8, wherein the third multi-signal connector comprises a multi-signal receptacle connector and the fourth multi-signal connector comprises a multi-signal plug connector.

12. A method of installing a T-harness in a vehicle having an OBD port including a vehicle OBD connector connected to a vehicle mount, the method comprising:
  disconnecting the vehicle OBD connector from the vehicle mount;
  connecting a mounting adapter to an auxiliary OBD harness connector of the T-harness at an auxiliary OBD harness connector rear portion;
  connecting the auxiliary OBD harness connector to the vehicle mount at the auxiliary OBD harness connector rear portion;
  connecting a removable harness portion of the T-harness to a main harness portion of the T-harness; and
  connecting the vehicle OBD connector to a vehicle OBD harness connector of the T-harness.

13. The method of claim 12, wherein connecting the mounting adapter to the auxiliary OBD harness connector at the auxiliary OBD harness connector rear portion comprises sliding the mounting adapter over the auxiliary OBD harness connector until at least one locking member of the auxiliary OBD harness connector mates with at least one locking structure of the mounting adapter.

14. The method of claim 13, wherein:
  the at least one locking member comprises at least one snap formed on at least one sidewall of the auxiliary OBD harness connector; and
  the at least one locking structure of the mounting adapter comprises at least one cutout on at least one sidewall of the mounting adapter, the at least one cutout sized and shaped for receiving the at least one snap in a locking arrangement.

15. The method of claim 12, wherein connecting the removable harness portion to the main harness portion comprises connecting a first multi-signal connector of the main harness portion to a second multi-signal connector of the removable harness portion.

16. The method of claim 15, wherein the first multi-signal connector comprises a multi-signal plug connector and the second multi-signal connector comprises a multi-signal receptacle connector.

17. The method of claim 15, wherein the second multi-signal connector comprises a multi-signal plug connector and the first multi-signal connector comprises a multi-signal receptacle connector.

18. The method of claim 12, further comprising disconnecting a third multi-signal connector connected to a telematics device harness segment of the T-harness from a fourth multi-signal connector connected to the vehicle OBD connector of the T-harness.

19. The method of claim 12, further comprising connecting a telematics device to a telematics device harness connector of the T-harness.

* * * * *